United States Patent
Haws

(10) Patent No.: US 10,295,197 B2
(45) Date of Patent: May 21, 2019

(54) HOT WATER ENERGY CONSERVATION

(71) Applicant: Spencer Kim Haws, Richland, WA (US)

(72) Inventor: Spencer Kim Haws, Richland, WA (US)

(*) Notice: Subject to any disclaimer, the term of this patent is extended or adjusted under 35 U.S.C. 154(b) by 529 days.

(21) Appl. No.: 14/752,612

(22) Filed: Jun. 26, 2015

(65) Prior Publication Data
US 2015/0377497 A1    Dec. 31, 2015

Related U.S. Application Data

(60) Provisional application No. 62/019,332, filed on Jun. 30, 2014.

(51) Int. Cl.
*F24D 17/00* (2006.01)
*F24H 1/20* (2006.01)
(Continued)

(52) U.S. Cl.
CPC .......... *F24D 17/0078* (2013.01); *E03B 7/045* (2013.01); *F24D 17/001* (2013.01); *F24D 17/0005* (2013.01); *F24D 17/0031* (2013.01); *F24D 17/0084* (2013.01); *F24D 17/0089* (2013.01); *F24D 19/1051* (2013.01); *F24D 19/1063* (2013.01); *F24H 1/201* (2013.01); *F24H 1/202* (2013.01); *F24H 1/203* (2013.01); *F24H 9/124* (2013.01); *F24H 9/126* (2013.01); *E03C 2001/005* (2013.01); *F28D 2020/0069* (2013.01); *Y10T 137/6497* (2015.04); *Y10T 137/85954* (2015.04)

(58) Field of Classification Search
CPC ....... Y10T 137/6497; Y10T 137/85954; F24D 17/0078; F24D 17/0005; F24D 17/001; F24D 17/0084; F24D 17/0031; E03C 2001/005; F24H 1/201; F24H 1/202; F24H 1/203; F24H 9/126; E03B 7/045
See application file for complete search history.

(56) References Cited

U.S. PATENT DOCUMENTS 2,838,073 A    6/1958    DiMattia et al.
2,918,090 A    12/1959    DeWitt
(Continued)

FOREIGN PATENT DOCUMENTS

CN    201306795      9/2009
FR    2947615 A1     1/2011
(Continued)

OTHER PUBLICATIONS

Cuta, Frank M., "Hot Water Saver—Documenting the Correspondence Between Our Two Calculations of Energy Savings", Battelle Study Final Report, Apr. 22, 1985, 5 pages.
(Continued)

*Primary Examiner* — Atif H Chaudry

(57) ABSTRACT

The concepts relate to reducing energy loss associated with hot water systems. One example can monitor hot water use in a system. Upon completion of the hot water use, the example can recover some of the hot water from hot water lines into a water heater that heated the hot water. The method can also deliver the recovered hot water to the water heater in a manner that affects operation of a heating element of the water heater.

10 Claims, 58 Drawing Sheets

(51) Int. Cl.
    *E03B 7/04* (2006.01)
    *F24D 19/10* (2006.01)
    *E03C 1/00* (2006.01)
    *F24H 9/12* (2006.01)
    *F28D 20/00* (2006.01)

(56) References Cited

U.S. PATENT DOCUMENTS

| | | | |
|---|---|---|---|
| 3,847,307 A | 11/1974 | Hosek | |
| 4,181,156 A | 1/1980 | Zahid | |
| 4,210,125 A * | 7/1980 | Fender | F24D 19/1042 |
| | | | 126/587 |
| 4,321,943 A | 3/1982 | Haws | |
| 4,450,829 A | 5/1984 | Morita et al. | |
| 4,518,007 A | 5/1985 | Haws | |
| 4,606,325 A | 8/1986 | Lujan, Jr. | |
| 4,628,902 A | 12/1986 | Comber | |
| 4,672,990 A | 6/1987 | Robillard | |
| 4,682,581 A * | 7/1987 | Laing | F24D 17/0084 |
| | | | 122/13.3 |
| 4,697,614 A | 10/1987 | Powers | |
| 4,798,224 A | 1/1989 | Haws | |
| 4,930,551 A | 6/1990 | Haws | |
| 4,945,942 A | 8/1990 | Lund | |
| 5,042,524 A | 8/1991 | Lund | |
| 5,205,318 A | 4/1993 | Massaro et al. | |
| 5,261,443 A | 11/1993 | Walsh | |
| 5,277,219 A | 1/1994 | Lund | |
| 5,323,803 A | 6/1994 | Blumenauer | |
| 5,347,956 A | 9/1994 | Hughes | |
| 5,351,712 A | 10/1994 | Houlihan | |
| 5,385,168 A | 1/1995 | Lund | |
| 5,452,740 A | 9/1995 | Bowman | |
| 5,555,997 A | 9/1996 | Nogles | |
| 5,584,316 A | 12/1996 | Lund | |
| 5,586,572 A | 12/1996 | Lund | |
| 5,596,952 A | 1/1997 | Lannes et al. | |
| 5,606,996 A | 3/1997 | Sugimura | |
| 5,775,372 A | 7/1998 | Houlihan | |
| 5,799,827 A | 9/1998 | D'Andrade | |
| 5,806,511 A | 9/1998 | Hart | |
| 5,819,785 A | 10/1998 | Bardini | |
| 5,823,177 A | 10/1998 | Whitehead | |
| 5,829,475 A | 11/1998 | Acker | |
| 5,860,452 A | 1/1999 | Ellis | |
| 5,887,616 A | 3/1999 | Ikeda et al. | |
| 6,039,067 A | 3/2000 | Houlihan | |
| 6,347,748 B1 | 2/2002 | Lyons | |
| 6,418,969 B1 | 7/2002 | Bertagna | |
| 6,536,464 B1 | 3/2003 | Lum et al. | |
| 6,588,377 B1 | 7/2003 | Leary et al. | |
| 6,745,723 B1 | 6/2004 | Hicks et al. | |
| 6,920,844 B1 | 7/2005 | Ismert | |
| 6,935,357 B2 | 8/2005 | Taylor et al. | |
| 6,962,162 B2 | 11/2005 | Acker | |
| 7,073,528 B2 | 7/2006 | Kempf et al. | |
| 7,077,155 B2 | 7/2006 | Giammaria | |
| 7,140,382 B2 | 11/2006 | Kempf et al. | |
| 7,198,059 B2 | 4/2007 | Kempf et al. | |
| 7,287,707 B2 | 10/2007 | Kempf et al. | |
| 7,475,703 B2 | 1/2009 | Kempf et al. | |
| 7,487,923 B2 | 2/2009 | Willsford et al. | |
| 7,634,976 B2 * | 12/2009 | Gordon | F24H 9/124 |
| | | | 122/14.3 |
| 7,648,078 B2 | 1/2010 | Kempf et al. | |
| 7,690,395 B2 | 4/2010 | Jonte et al. | |
| 7,740,182 B2 | 6/2010 | Lum | |
| 7,779,857 B2 | 8/2010 | Acker | |
| 8,534,310 B1 | 9/2013 | Ziehm | |
| 9,513,641 B1 | 12/2016 | Haws | |
| 9,879,658 B2 | 1/2018 | Graves et al. | |
| 2003/0032854 A1 | 2/2003 | Palmer | |
| 2005/0001046 A1 * | 1/2005 | Laing | F24D 19/1051 |
| | | | 237/19 |
| 2005/0034774 A1 | 2/2005 | Lombari et al. | |
| 2006/0022062 A1 * | 2/2006 | Morris | F24D 17/0078 |
| | | | 237/19 |
| 2006/0144455 A1 | 7/2006 | Meyers et al. | |
| 2007/0114297 A1 | 5/2007 | Burningham | |
| 2008/0035303 A1 | 2/2008 | Fuller | |
| 2008/0230126 A1 | 9/2008 | Acker | |
| 2008/0272116 A1 | 11/2008 | Martucci et al. | |
| 2010/0096018 A1 * | 4/2010 | Wylie | F24D 17/0078 |
| | | | 137/2 |
| 2011/0139269 A1 | 6/2011 | Rogers | |
| 2012/0097746 A1 | 4/2012 | Haws | |
| 2012/0118414 A1 | 5/2012 | McMurtry | |
| 2013/0228233 A1 | 9/2013 | Haws | |
| 2013/0327790 A1 | 12/2013 | Ryan | |
| 2016/0003485 A1 | 1/2016 | Haws | |
| 2017/0059186 A1 | 3/2017 | Haws | |

FOREIGN PATENT DOCUMENTS

| | | |
|---|---|---|
| GB | 2145205 A | 3/1985 |
| JP | 06347095 A | 12/1994 |
| WO | 2010/103521 | 9/2010 |

OTHER PUBLICATIONS

Skumatz, Lisa A. and Frank M. Cuta, "Assessment of Savings and Operating Characteristics of the Hot Water Saver: Residential Test Analysis", Battelle Study, Dec. 31, 1983, 48 pages.
Notice of Incomplete Reply dated Dec. 1, 2011 from U.S. Appl. No. 13/276,635, 2 pages.
Response filed Dec. 5, 2011 to Notice of Incomplete Reply dated Dec. 1, 2011 from U.S. Appl. No. 13/276,635, 4 pages.
Requirement for Restriction/Election dated Jun. 3, 2014 from U.S. Appl. No. 13/276,635, 6 pages.
Response filed Jul. 10, 2014 to Requirement for Restriction/Election dated Jun. 3, 2014 from U.S. Appl. No. 13/276,635, 9 pages.
Non-Final Office Action dated Aug. 13, 2014 from U.S. Appl. No. 13/276,635, 7 pages.
Response filed Nov. 12, 2014 to Non-Final Office Action dated Aug. 13, 2014 from U.S. Appl. No. 13/276,635, 8 pages.
Non-Final Office Action dated Dec. 29, 2014 from U.S. Appl. No. 13/276,635, 6 pages.
Applicant Initiated Interview Summary dated Feb. 11, 2015 from U.S. Appl. No. 13/276,635, 3 pages.
Response filed Mar. 17, 2015 to Non-Final Office Action dated Dec. 29, 2014 from U.S. Appl. No. 13/276,635, 9 pages.
Final Office Action dated Apr. 28, 2015 from U.S. Appl. No. 13/276,635, 10 pages.
Response filed Jul. 23, 2015 to Final Office Action dated Apr. 28, 2015 from U.S. Appl. No. 13/276,635, 11 pages.
Non-Final Office Action dated Aug. 5, 2015 from U.S. Appl. No. 13/276,635, 7 pages.
Response filed Dec. 4, 2015 to Non-Final Office Action dated Aug. 5, 2015 from U.S. Appl. No. 13/276,635, 8 pages.
Notice of Allowance dated Feb. 8, 2016 from U.S. Appl. No. 13/276,635, 15 pages.
International Search Report and Written Opinion dated Mar. 5, 2013 from PCT Patent Application No. PCT/US2011/056896, 18 pages.
International Preliminary Report on Patentability dated Apr. 23, 2013 and transmitted May 2, 2013 from PCT Patent Application No. PCT/US2011/056896, 11 pages.
Notice of Division of Application dated Jun. 1, 2015 from China Patent Application No. 201180043700.3, 2 pages.
First Office Action dated Oct. 29, 2015 from China Patent Application No. 201180043700.3, 14 pages.
U.S. Appl. No. 61/405,359 titled "Hot Water Recovery", filed Oct. 21, 2010 by inventor Spencer Kim Haws, 31 pages.
Non-Final Office Action dated Jul. 14, 2015 from U.S. Appl. No. 13/864,943, 7 pages.
Response filed Jul. 24, 2015 to Non-Final Office Action dated Jul. 14, 2015 from U.S. Appl. No. 13/864,943, 6 pages.
Notice of Allowance dated Aug. 10, 2015 from U.S. Appl. No. 13/864,943, 16 pages.

(56) References Cited

OTHER PUBLICATIONS

Corrected Notice of Allowability dated Oct. 2, 2015 from U.S. Appl. No. 13/864,943, 7 pages.
Requirement for Restriction/Election dated Jun. 11, 2015 from U.S. Appl. No. 13/912,078, 7 pages.
Response filed Jul. 16, 2015 to Requirement for Restriction/Election dated Jun. 11, 2015 from U.S. Appl. No. 13/912,078, 7 pages.
Non-Final Office Action dated Aug. 3, 2015 from U.S. Appl. No. 13/912,078, 10 pages.
Response Filed Dec. 3, 2015 to the Non-Final Office Action dated Aug. 3, 2015 from U.S. Appl. No. 13/912,078, 12 pages.
Final Office Action dated Dec. 22, 2015 from U.S. Appl. No. 13/912,078, 15 pages.
U.S. Appl. No. 61/637,173 titled "Hot Water Recovery," filed Apr. 23, 2012 by inventor Spencer Kim Haws, 118 pages.
U.S. Appl. No. 61/657,477 titled "Hot Water Recovery Apparatus," filed Jun. 8, 2012 by inventor Spencer Kim Haws, 19 pages.
Utility U.S. Appl. No. 13/912,078 titled "Hot Water Recovery Apparatus", filed Jun. 6, 2013 by inventor Spencer Kim Haws, 56 pages.
U.S. Appl. No. 62/019,332 titled "Hot Water Recovery Apparatus," filed Jun. 30, 2014 by inventor Spencer Kim Haws, 110 pages.
Preliminary Amendment filed Oct. 29, 2015 from U.S. Appl. No. 14/851,451, 5 pages.
After Final Consideration Program Request and Response filed Mar. 22, 2016 to the Final Office Action dated Dec. 22, 2015 from U.S. Appl. No. 13/912,078, 11 pages.
After Final Consideration Program Decision and Notice of Allowance dated Mar. 30, 2016 from U.S. Appl. No. 13/912,078, 18 pages.
International Search Report and Written Opinion dated Nov. 30, 2015 from PCT Patent Application No. PCT/US2015/038160, 13 pages.
Requirement for Restriction/Election dated May 23, 2016 from U.S. Appl. No. 14/210,068, 6 pages.
Response filed Jul. 25, 2016 to the Requirement for Restriction/Election dated May 23, 2016 from U.S. Appl. No. 14/210,068, 9 pages.
Notice of Allowance dated Aug. 22, 2016 from U.S. Appl. No. 14/210,068, 37 pages.
Corrected Notice of Allowability dated Sep. 6, 2016 from U.S. Appl. No. 14/210,068, 6 pages.
U.S. Appl. No. 61/782,024 titled "Hot Water Recovery," filed Mar. 14, 2013 by inventor Spencer Kim Haws, 193 pages.
U.S. Appl. No. 61/878,563 titled "Hot Water Recovery," filed Sep. 16, 2013 by inventor Spencer Kim Haws, 208 pages.
International Preliminary Report on Patentability dated Jan. 12, 2017 from PCT Patent Application No. PCT/US2015/038160, 10 pages.
Preliminary Amendment filed Oct. 26, 2016 from U.S. Appl. No. 15/297,830, 6 pages.
Non-Final Office Action dated Aug. 1, 2017 from U.S. Appl. No. 14/851,451, 10 pages.
U.S. Appl. No. 61/384,206 titled "Automatic Hot Water Recovery Apparatus", filed Sep. 7, 2010 by Inventor Spencer Kim Haws, 10 pages.
Notice on Grant of Patent Right for Invention dated Jul. 11, 2016 from China Patent Application No. 201180043700.3, 4 pages.
Corrected Notice of Allowability dated Mar. 9, 2016 from U.S. Appl. No. 13/276,635, 6 pages.
Response filed Oct. 25, 2017 to the Non-Final Office Action dated Aug. 1, 2017 from U.S. Appl. No. 14/851,451, 7 pages.
Final Office Action dated Nov. 13, 2017 from U.S. Appl. No. 14/851,451, 12 pages.
Response filed Mar. 9, 2018 from U.S. Appl. No. 14/851,451, 6 pages.
Non-Final Office Action dated Mar. 29, 2018 from U.S. Appl. No. 14/851,451, 11 pages.
Non-Final Office Action dated Jun. 7, 2018 from U.S. Appl. No. 15/297,830, 41 pages.
Response filed Aug. 28, 2018 to the Non-Final Office Action dated Mar. 29, 2018 from U.S. Appl. No. 14/851,451, 8 pages.
Non-Final Office Action dated Nov. 14, 2018 from U.S. Appl. No. 14/851,451, 9 pages.

\* cited by examiner

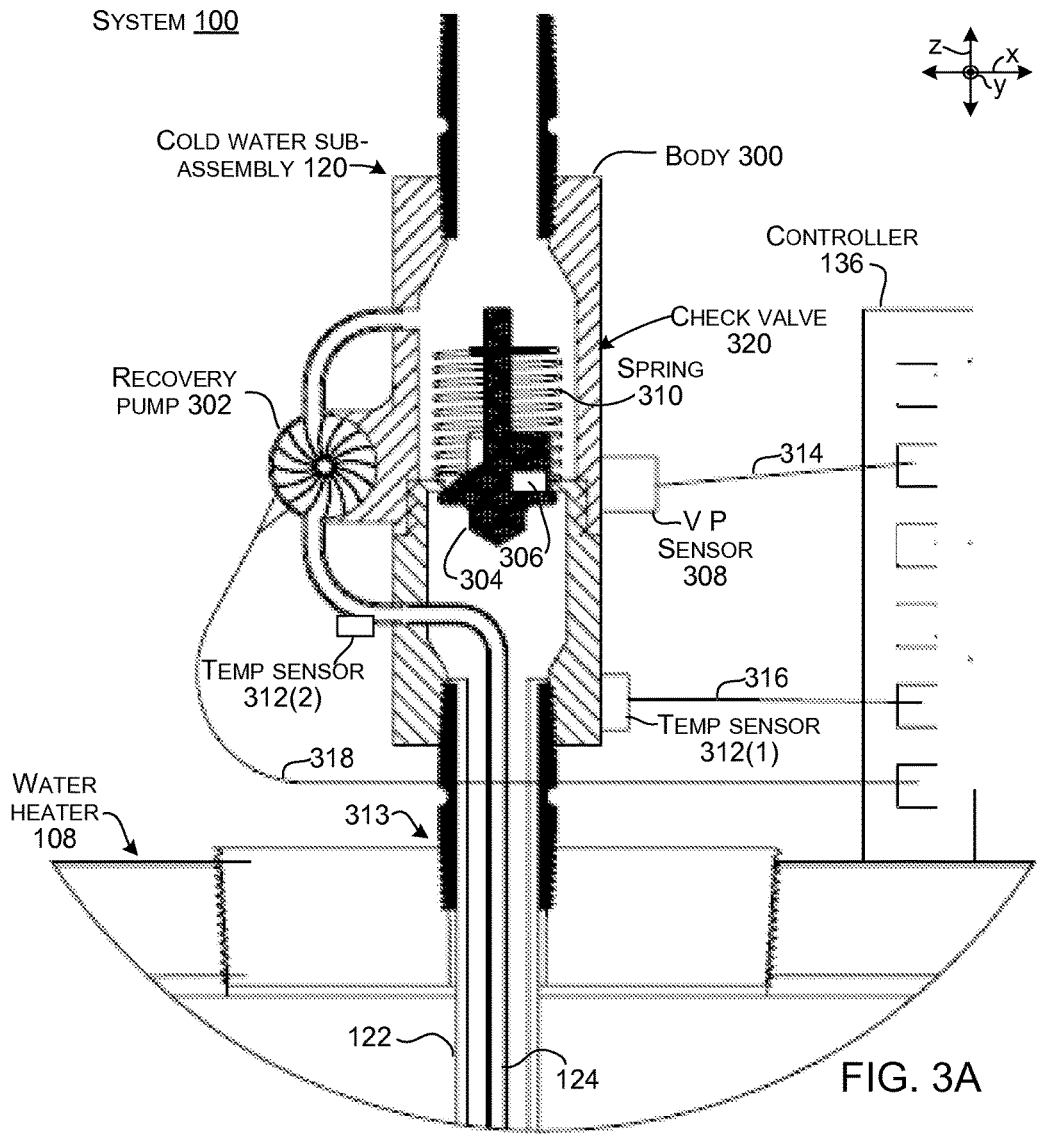
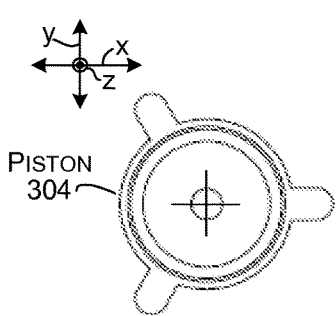
FIG. 3B
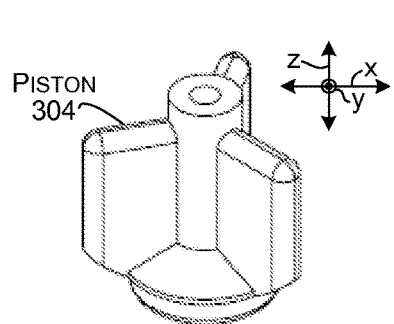
FIG. 3C
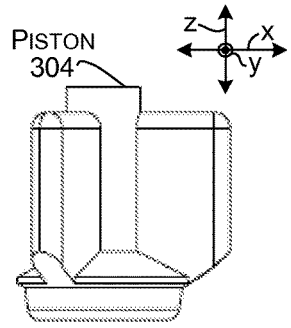
FIG. 3D

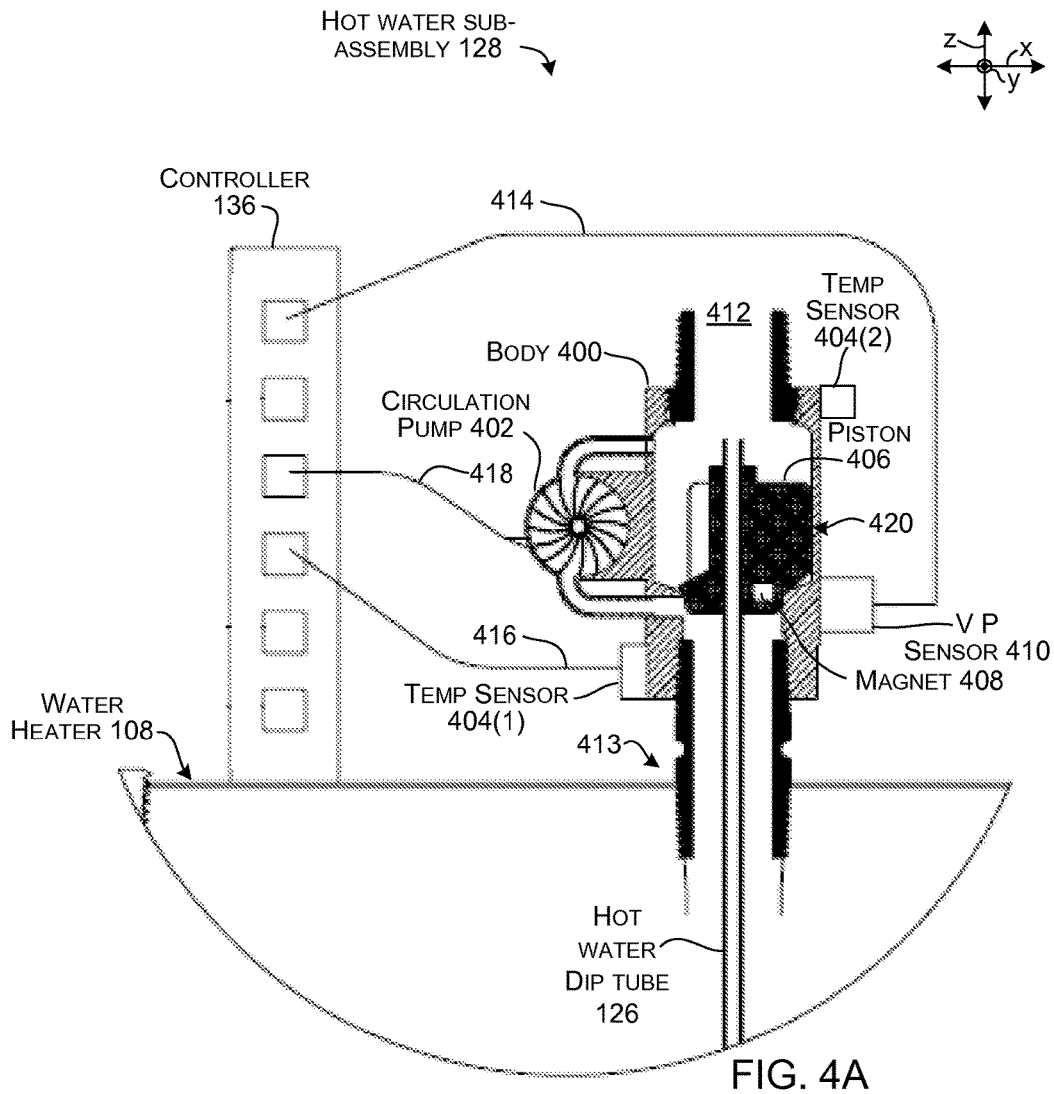
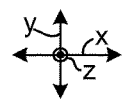
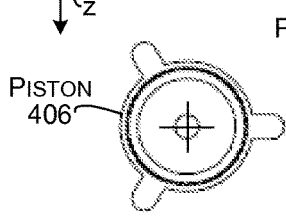
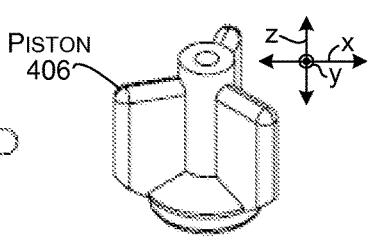
FIG. 4A
FIG. 4B　　FIG. 4C　　FIG. 4D

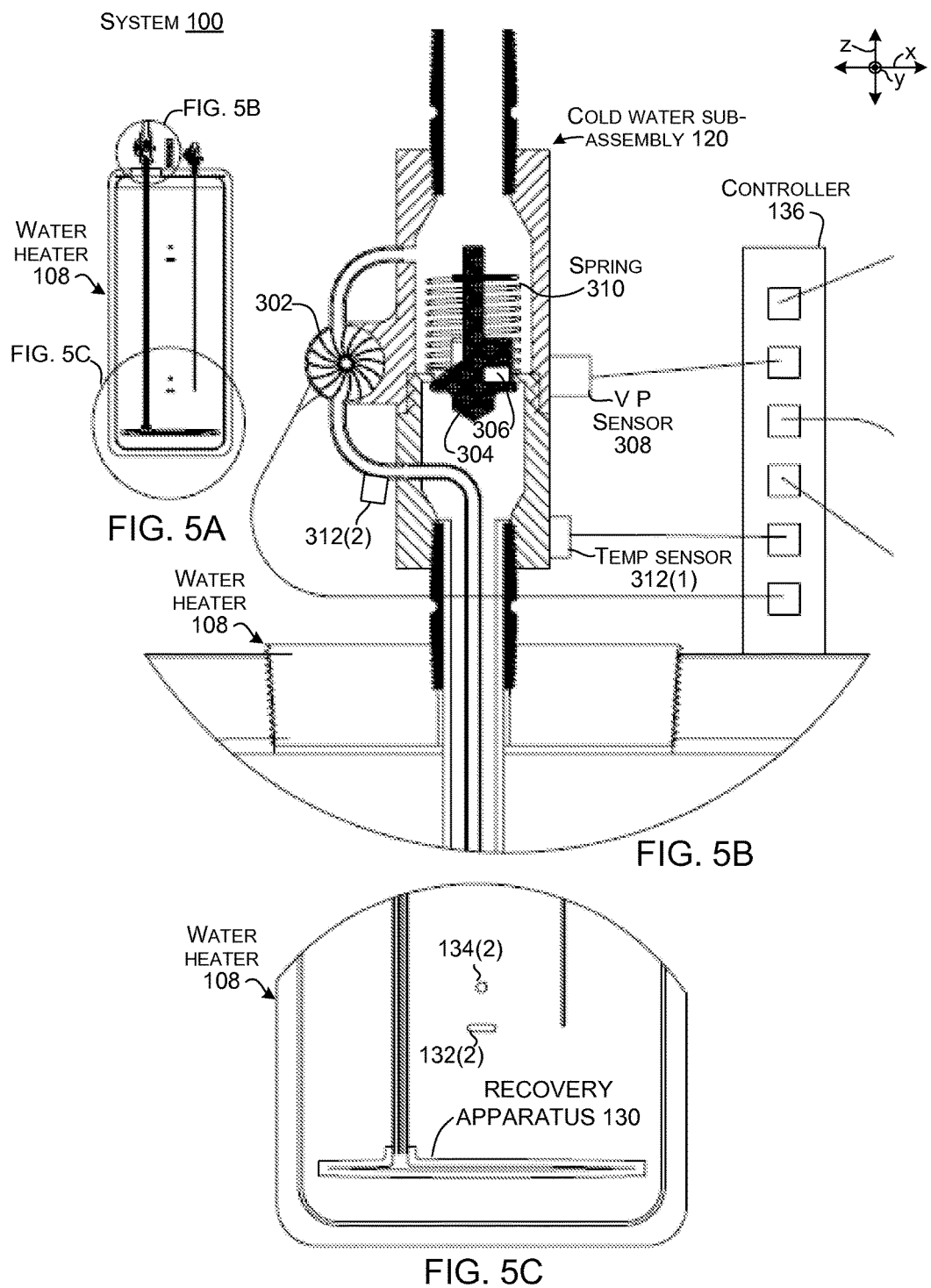

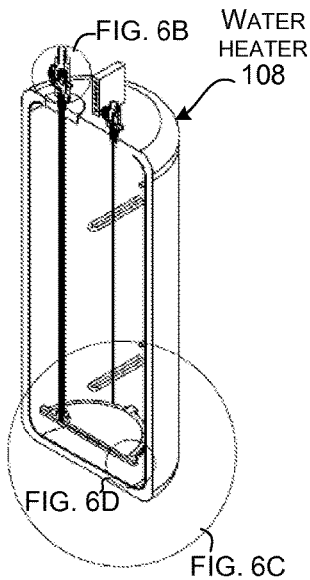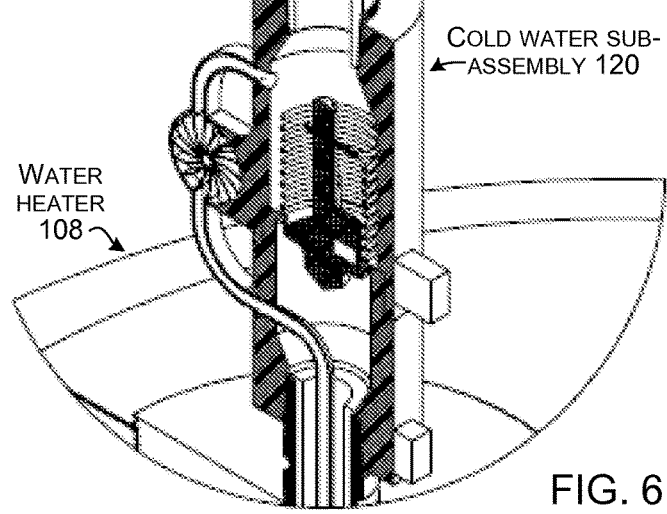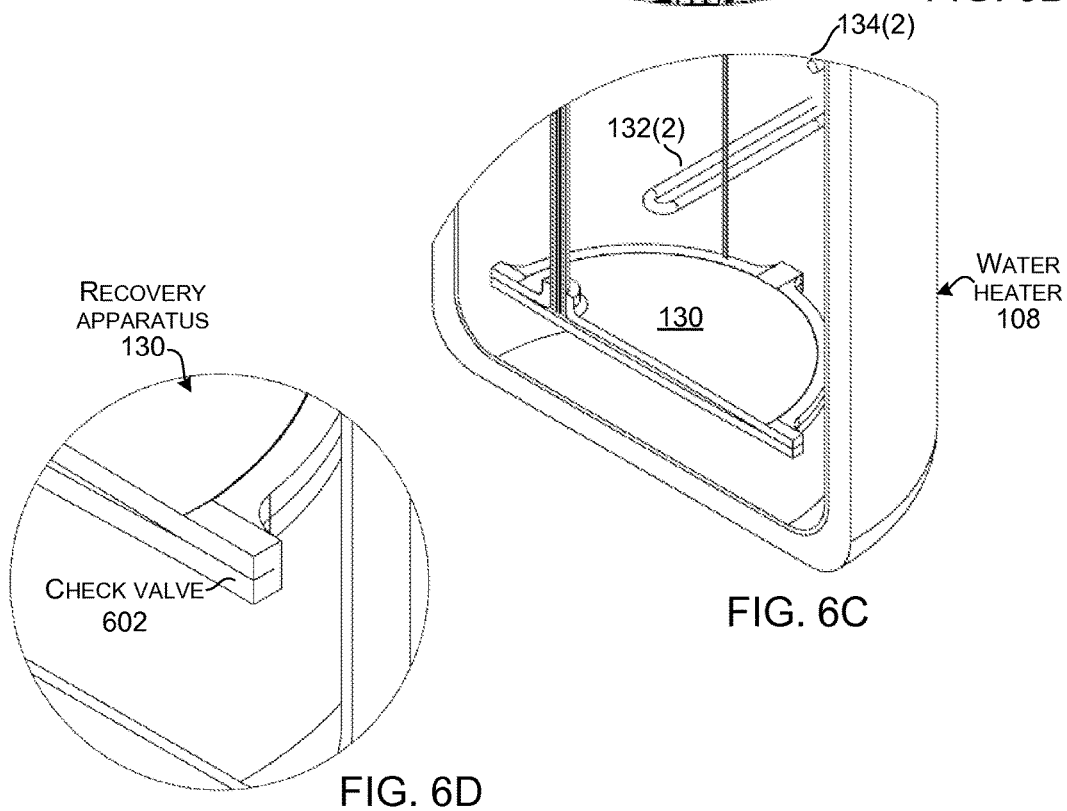

SYSTEM 100

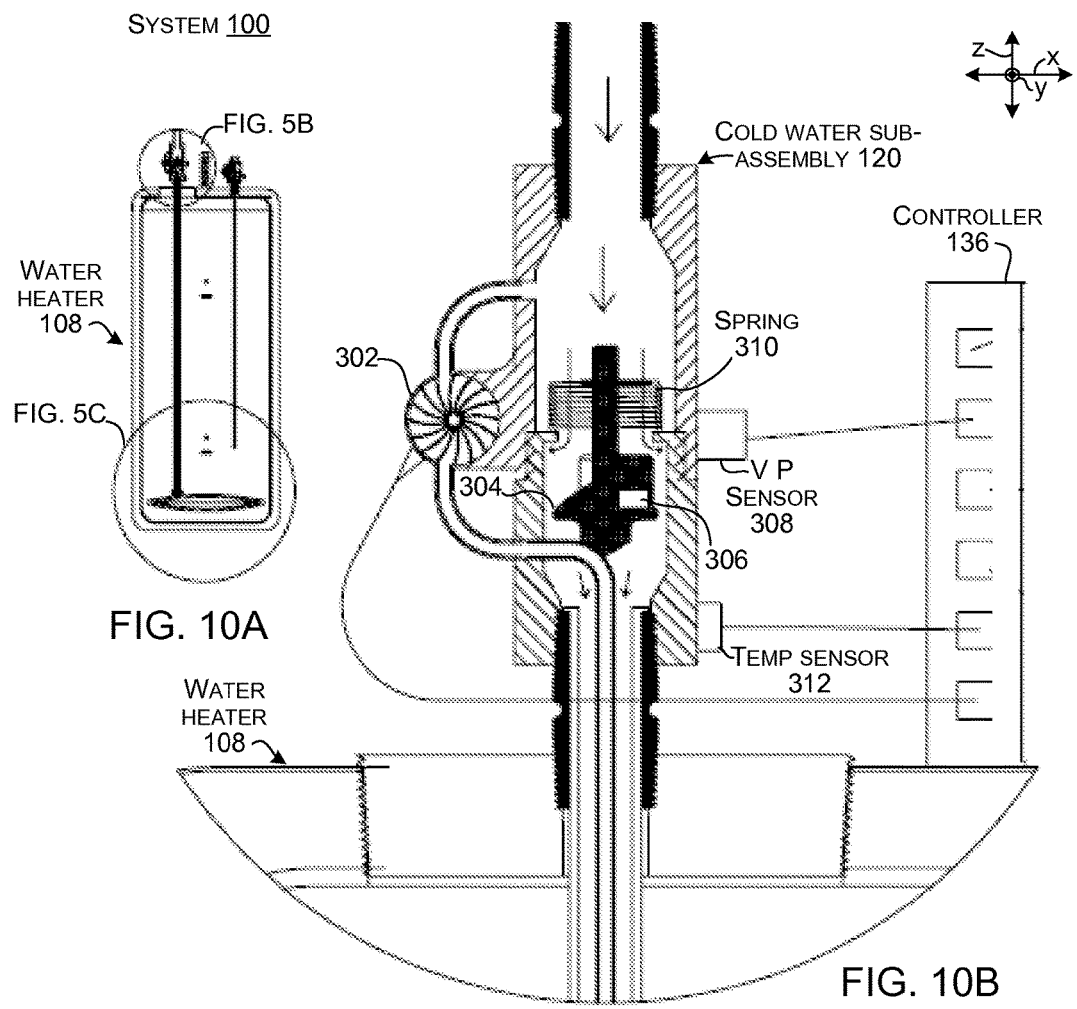
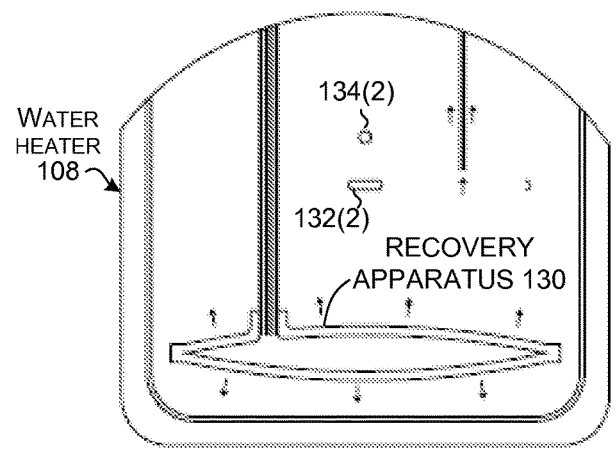

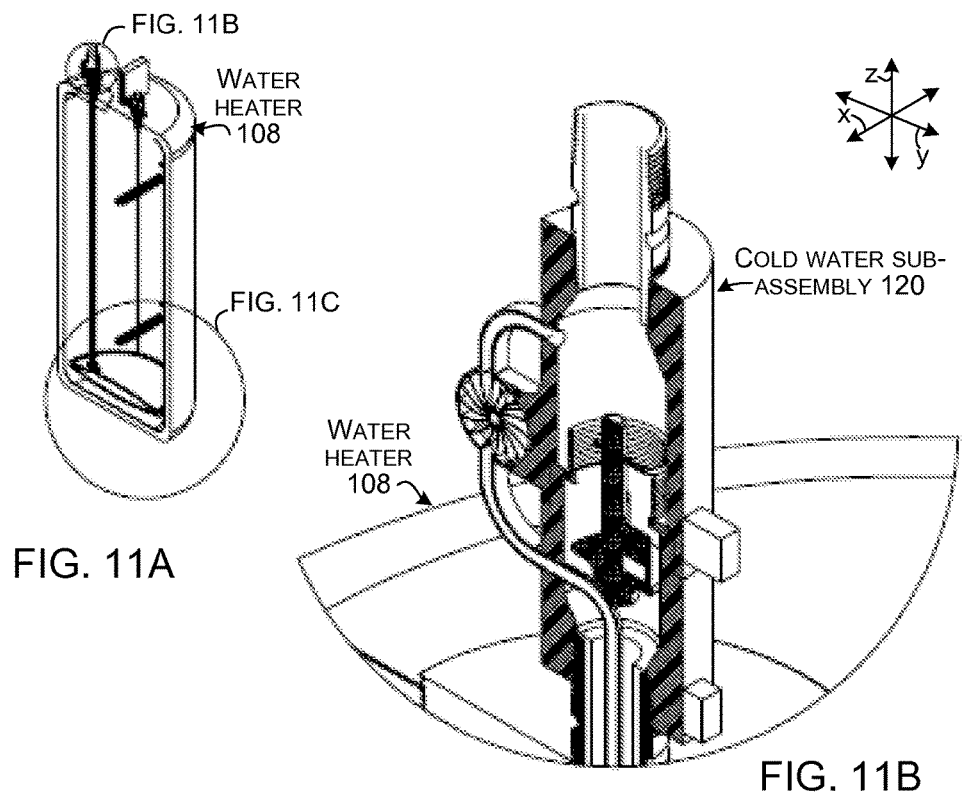
FIG. 11A
FIG. 11B
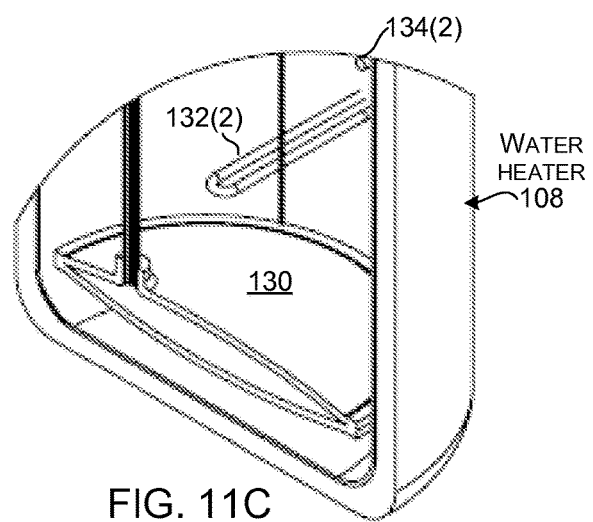
FIG. 11C

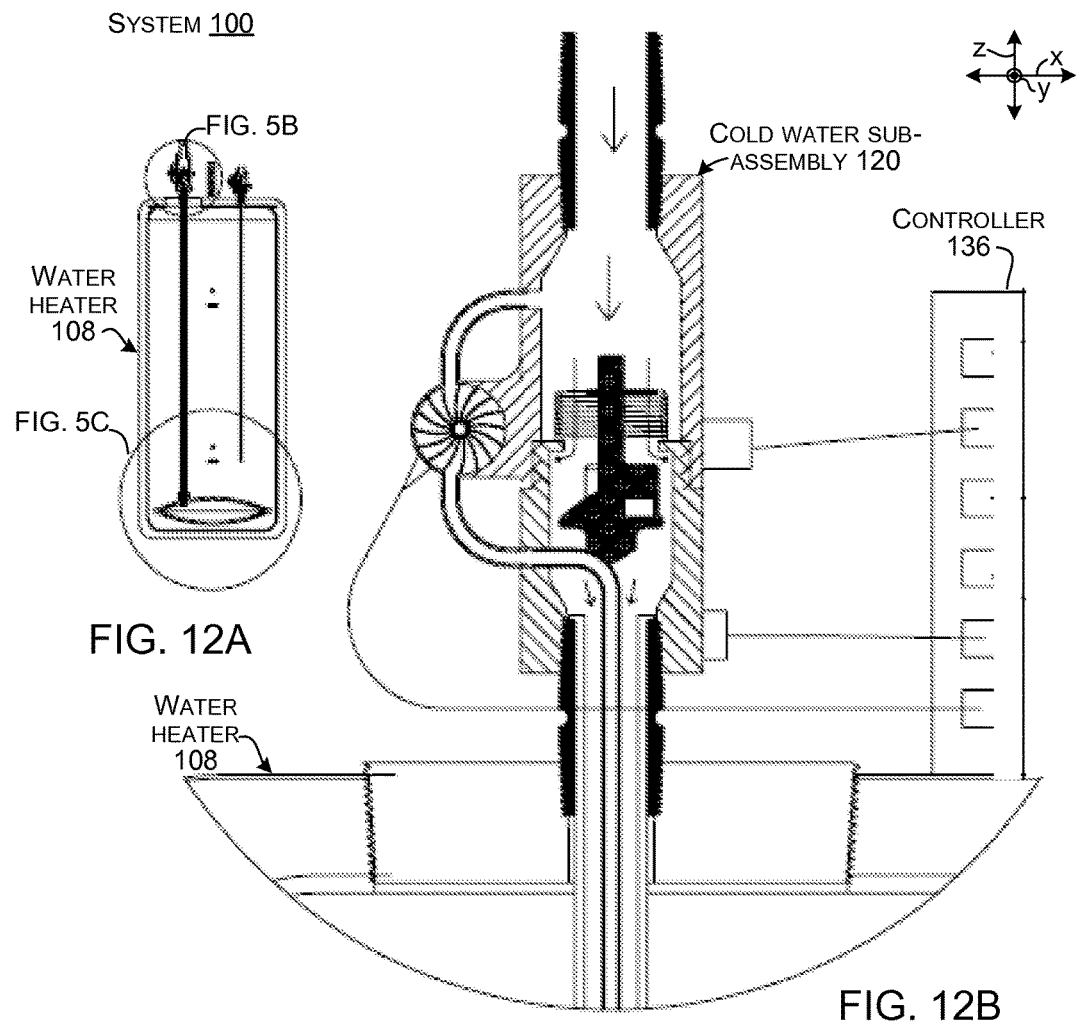
FIG. 12A
FIG. 12B
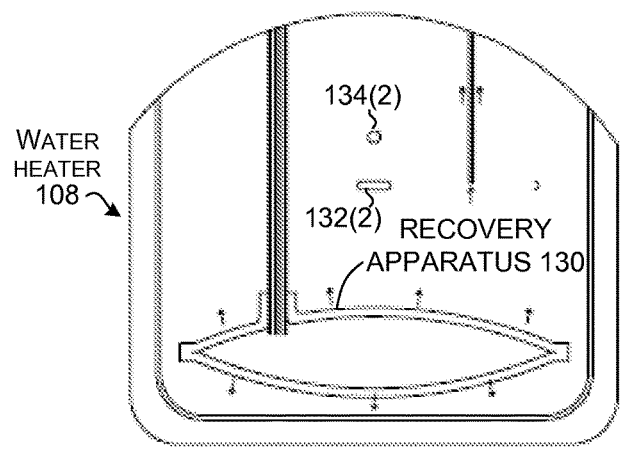
FIG. 12C

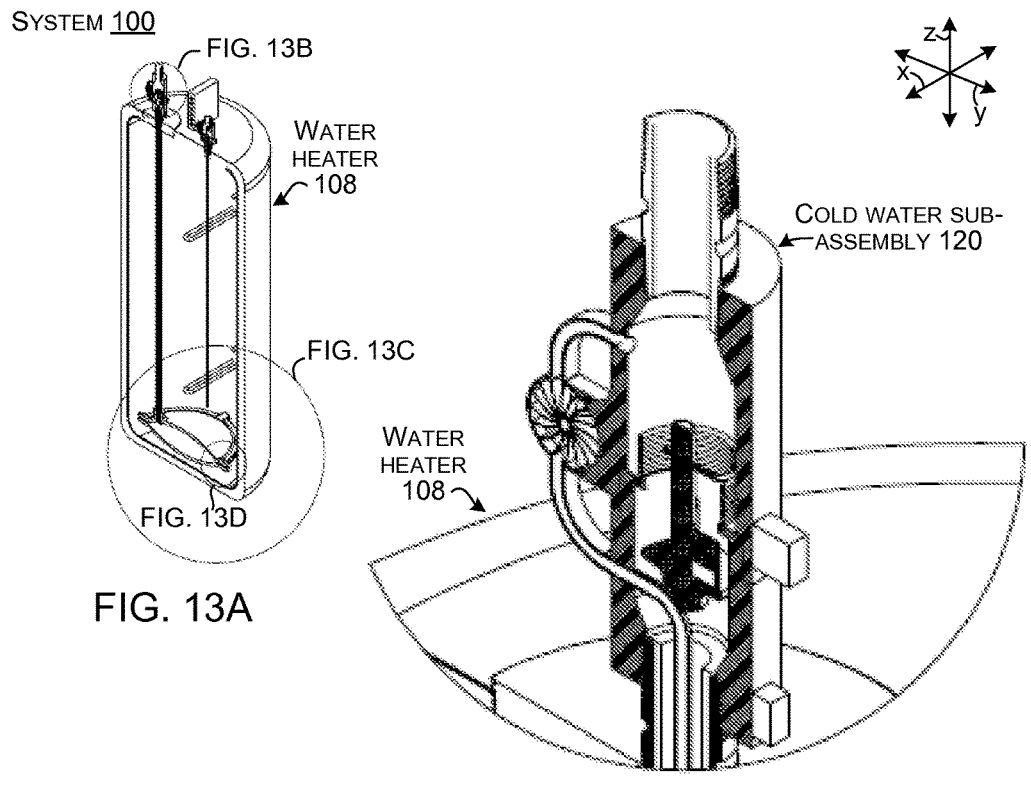
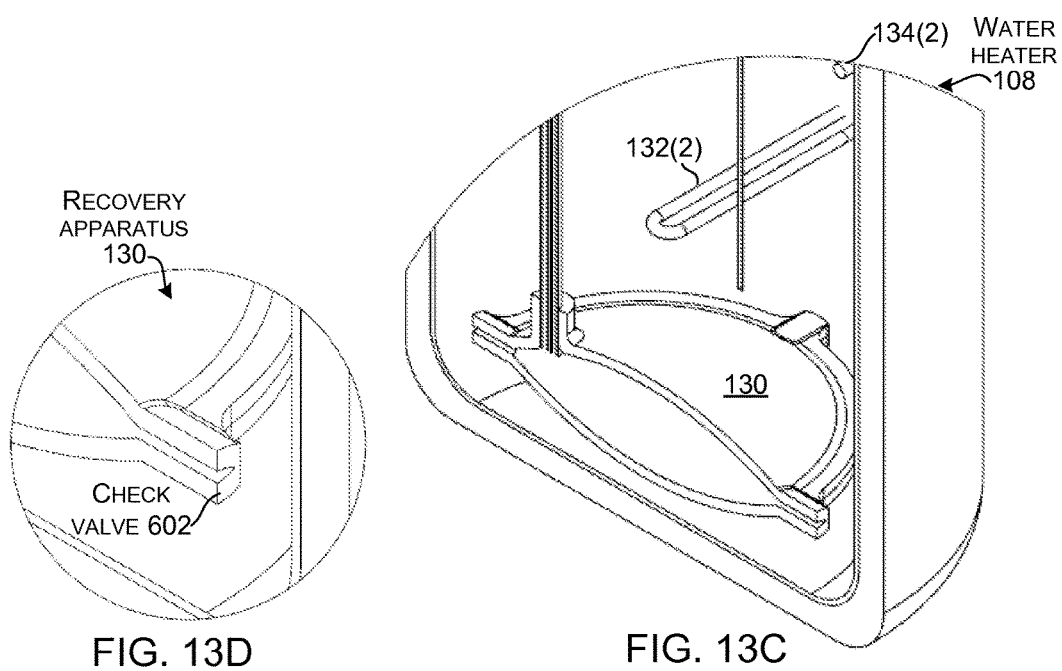
FIG. 13A
FIG. 13B
FIG. 13C
FIG. 13D

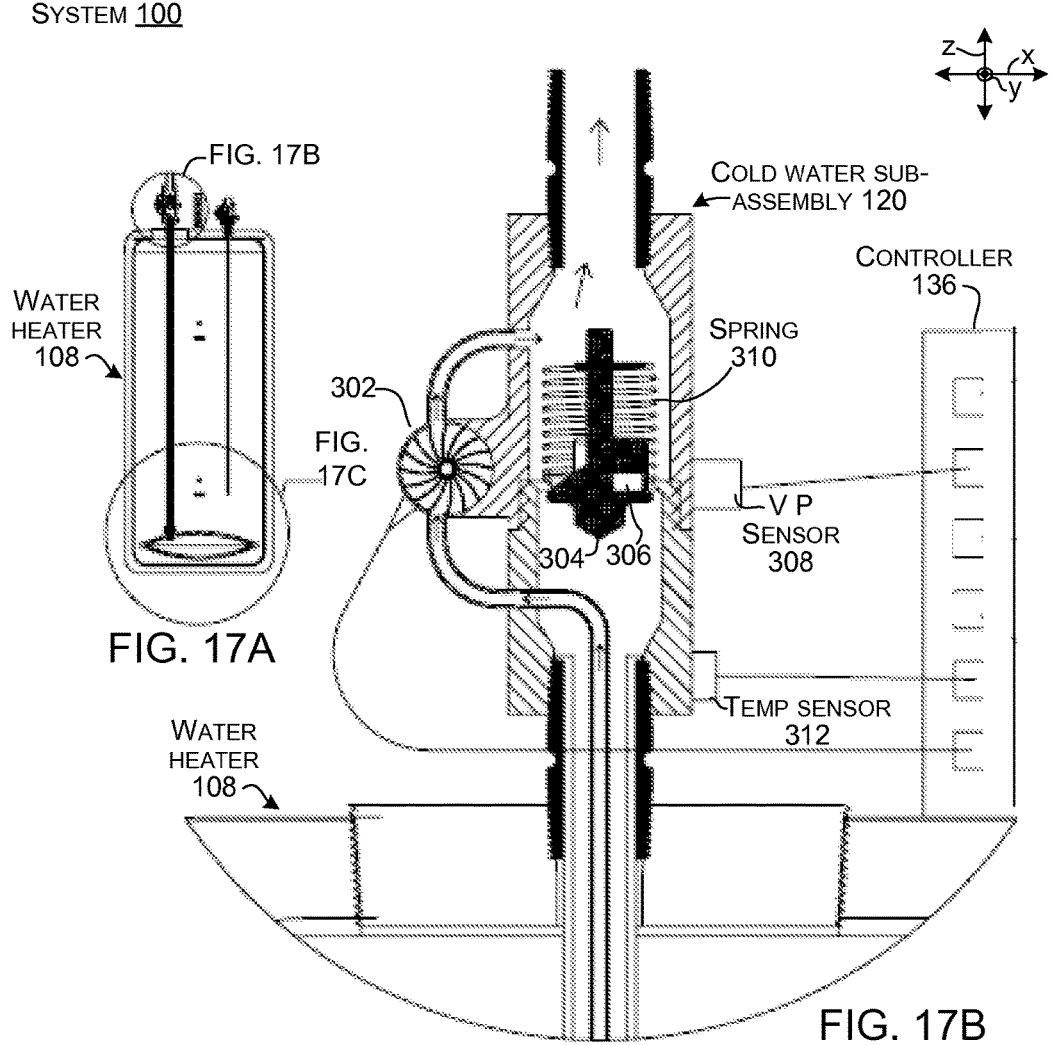
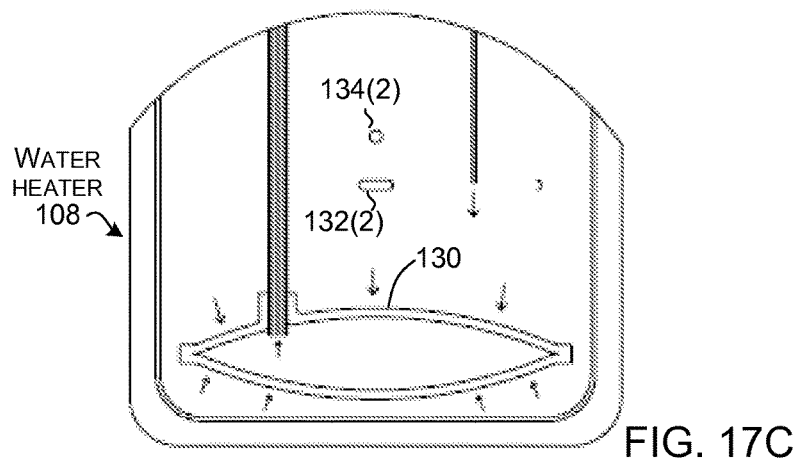

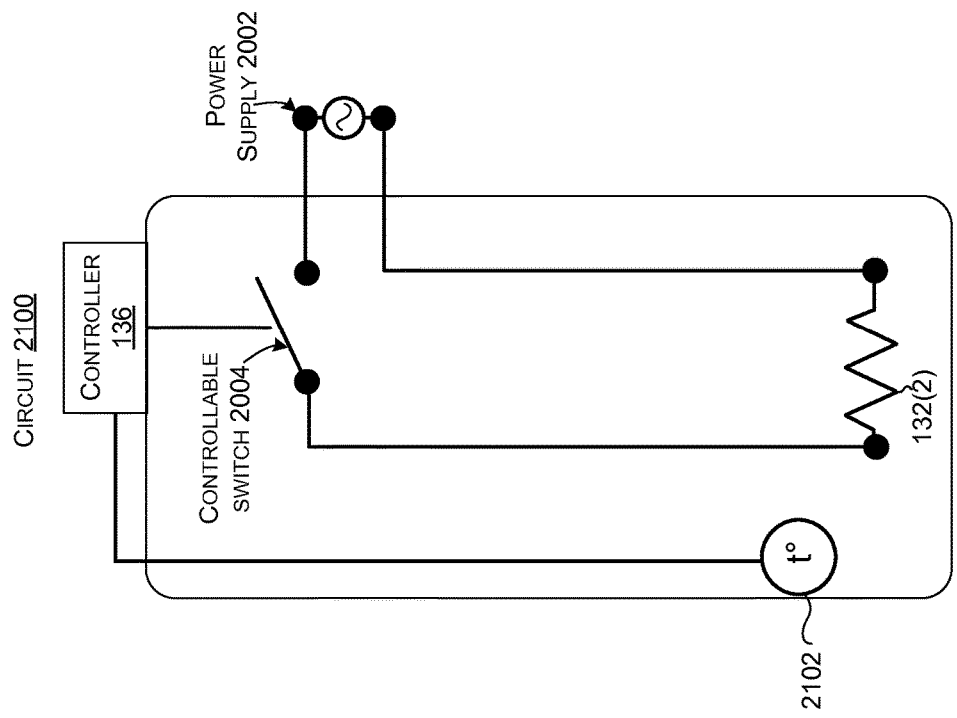
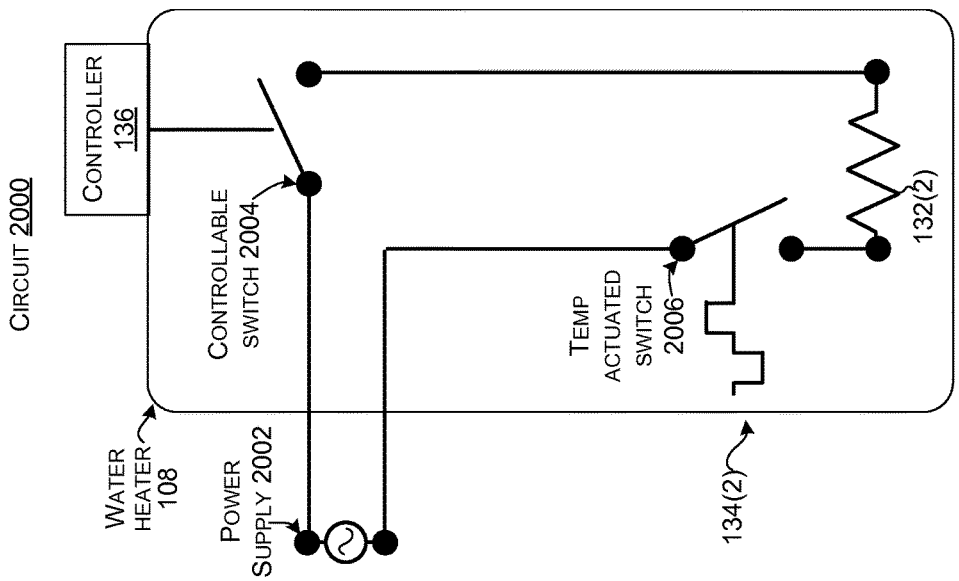
FIG. 21
FIG. 20

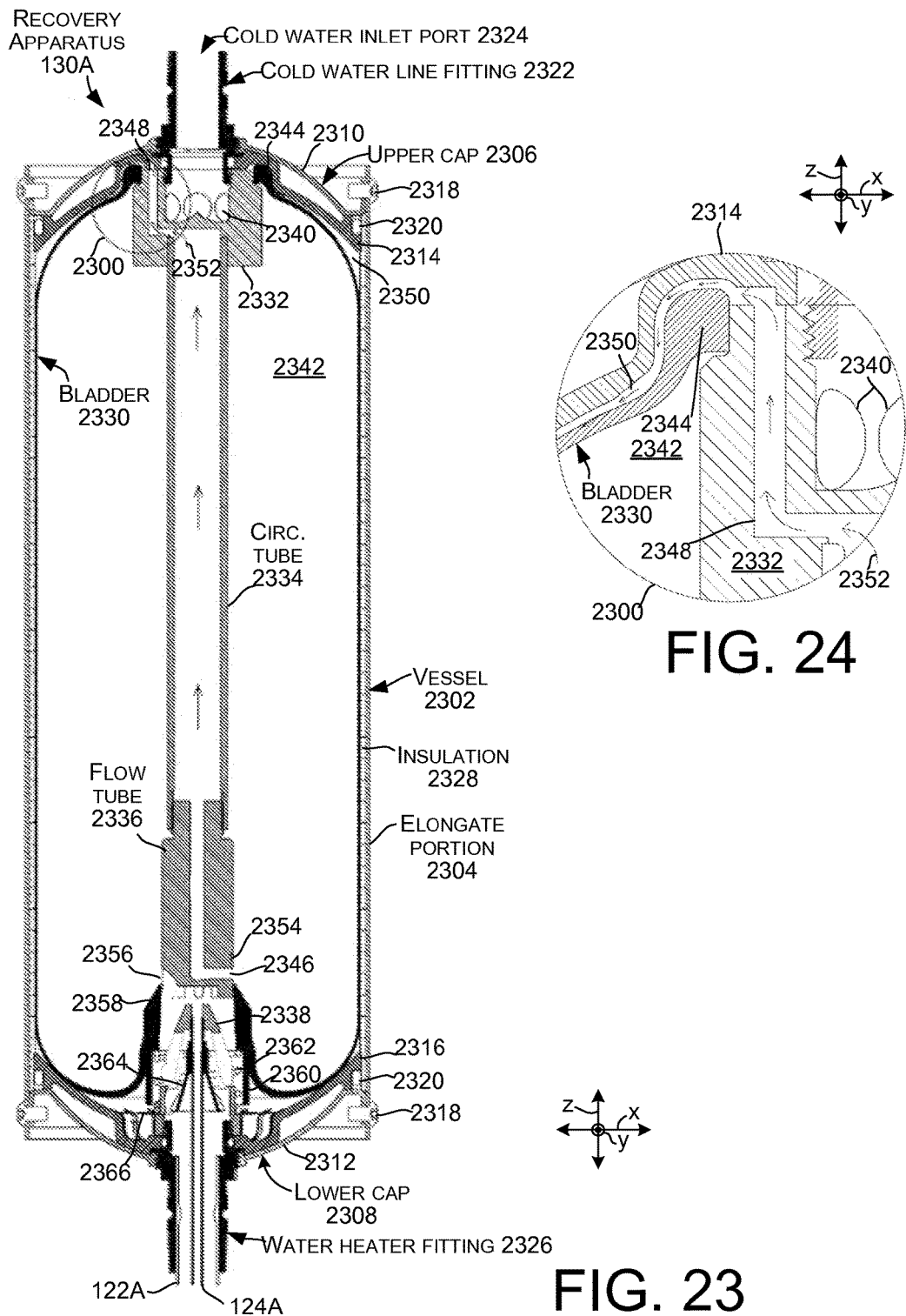

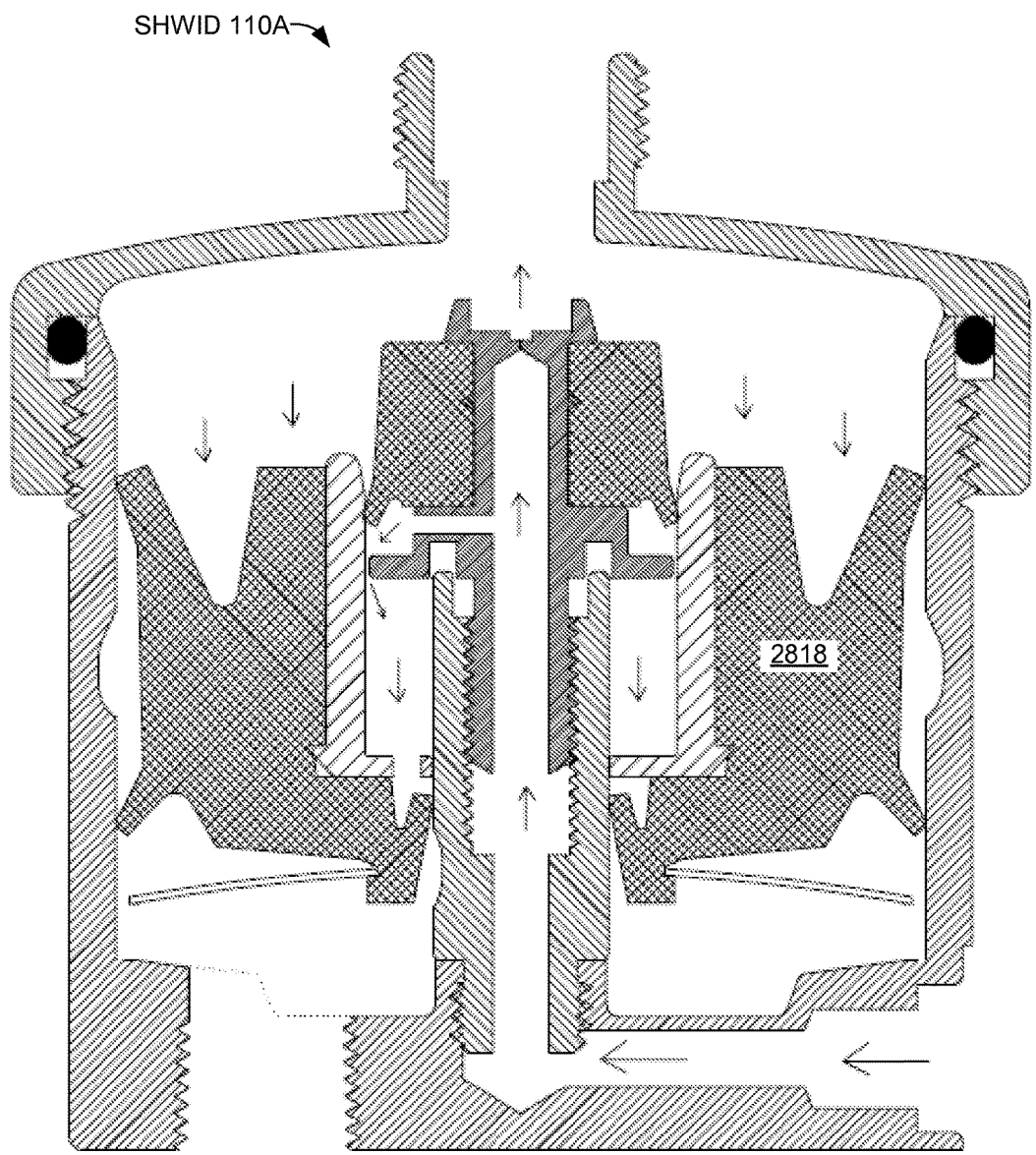
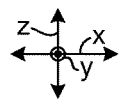
FIG. 32A

HOT WATER ENERGY CONSERVATION

PRIORITY

The patent is a utility patent application that claims priority to provisional application 62/019,332 filed on Jun. 30, 2014, which is hereby incorporated by reference in its entirety.

FIELD OF THE INVENTION

The patent relates to energy savings, especially energy savings associated with hot water and water heaters.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings.

FIGS. 2-21 show details of the example system of FIG. 1 in accordance with some implementations.

FIGS. 23-35B show details of the example system of FIG. 22 in accordance with some implementations.

DETAILED DESCRIPTION

Overview

Figure 1:
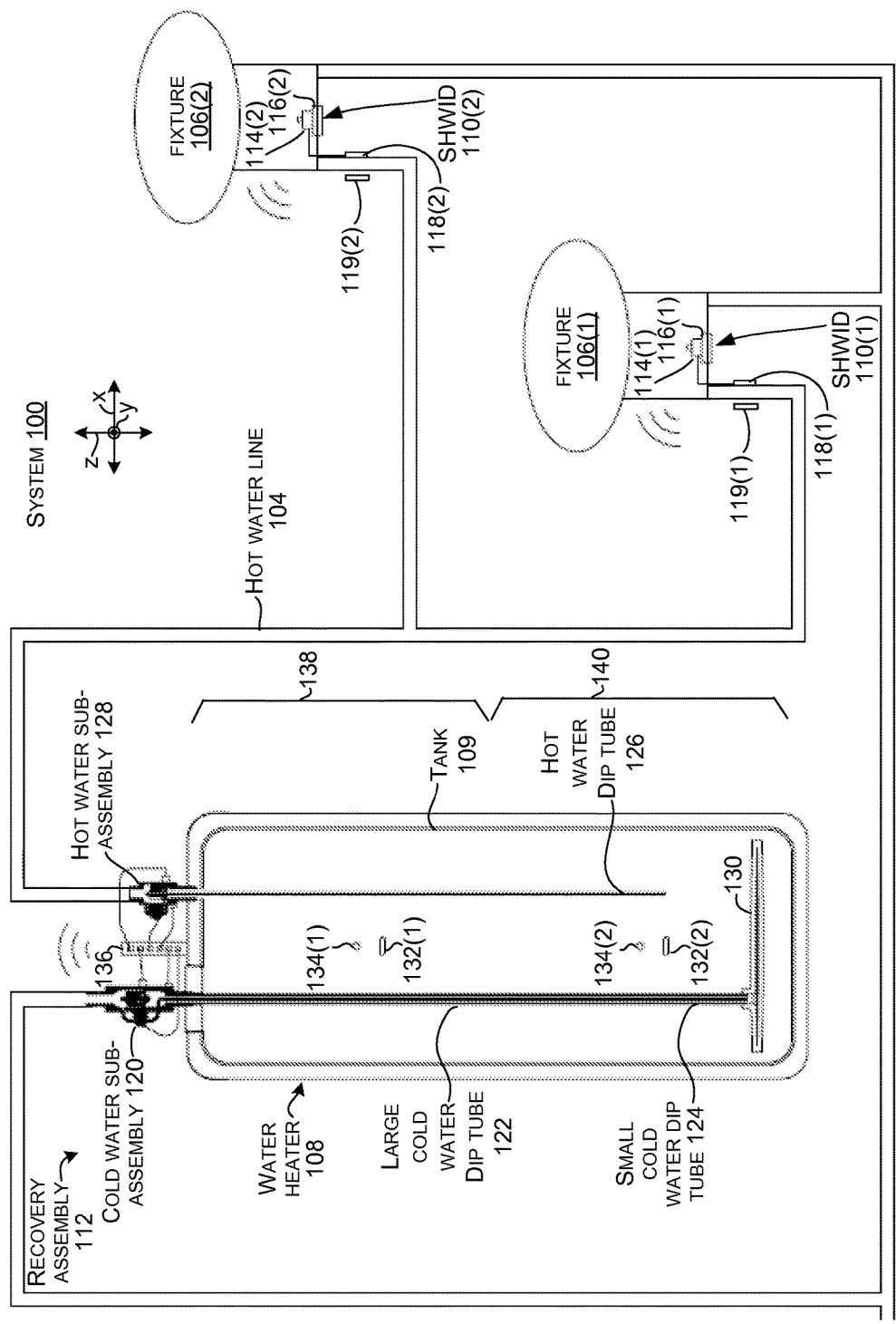
FIGS. 1, 22, and 36 show example systems in which the present energy recovery concepts can be applied in accordance with some implementations.

The present description relates to saving energy associated with a water heater and hot water lines connected to the water heater. Energy can be saved by recovering hot water from the hot water lines to the water heater so that energy in the hot water is not lost to the environment. Hot water can be recovered from hot water lines back to the water heater in a manner that can decrease power usage by the water heater. In some cases, operation of the water heater's heating elements can be controlled in relation to the recovered hot water. This operational control can cause the heating elements to consume less energy than would traditionally be used.

SYSTEM EXAMPLES

FIGS. 1-5 collectively show a system 100 to which the present hot water recovery concepts can be applied. Of course, system 100 is provided for purposes of explanation and the present concepts can be applied to other systems. Two other system examples are described below relative to FIGS. 22-35B and 36-60.

System 100 includes a cold water line 102 and a hot water line 104 that supply one or more fixtures 106, a water heater 108 that includes a tank 109, and one or more selective hot water isolation devices (SHWIDs) 110 and/or an automatic hot water recovery assembly (e.g. recovery assembly) 112. In this case, the SHWIDs 110 are manifest as a valve controller 114, an isolation valve 116, a temperature sensor (e.g., thermometer) 118, and a flow sensor 119 positioned relative to the hot water line 104 and the cold water line 102 proximate to the SHWID 110. The system can further include a cold water sub-assembly 120, a large cold water dip tube 122, a small cold water dip tube 124, a hot water dip tube 126, a hot water sub-assembly 128, and an automatic hot water recovery apparatus (e.g. recovery apparatus) 130. The water heater 108 can include upper and lower heating elements 132(1) and 132(2) and/or upper and lower thermostats 134(1) and 134(2), respectively, and a controller 136. For purposes of explanation, the tank 109 can be viewed as having upper and lower regions 138 and 140 respectively. The upper heating element 132(1) and the upper thermostat 134(1) can be positioned in the upper region 138, and the lower heating element 132(2) and the lower thermostat 134(2) can be positioned in the lower region 140. Natural gas or other combustion water heaters can be configured differently, such as with a single heating element, such as a burner positioned below the tank 109.

Controller (e.g., electronic control module) 136 can be wired or wirelessly communicatively coupled to the SHWIDs 110, recovery assembly 112, cold water sub-assembly 120, hot water sub-assembly 128, upper and lower heating elements 132(1) and 132(2), and/or upper and lower thermostats 134(1) and 134(2). (Not all of the electronic coupling is shown on the drawing page to reduce clutter). The coupling can be achieved via wires or other conductors and/or via wireless technologies, such as Bluetooth, Wi-Fi, and/or ZigBee, among others. Controller 136 can be manifest as a microcontroller, a general purpose computer, an application specific integrated circuit (ASIC), a field programmable gate array (FPGA), a system on a chip (SoC), an electronic control module, and/or other processors and/or dedicated circuitry. In the case of an electric water heater 108, the controller can receive power available at the water heater. In the case of other water heater types, such as natural gas water heaters that may not have power supplied to the water heater, a dedicated power line can be run to the controller 136.

The recovery assembly 112 can include cold water sub-assembly 120, large cold water dip tube 122, small cold water dip tube 124, hot water dip tube 126, hot water sub-assembly 128, and/or controller 136.

Figure 36:
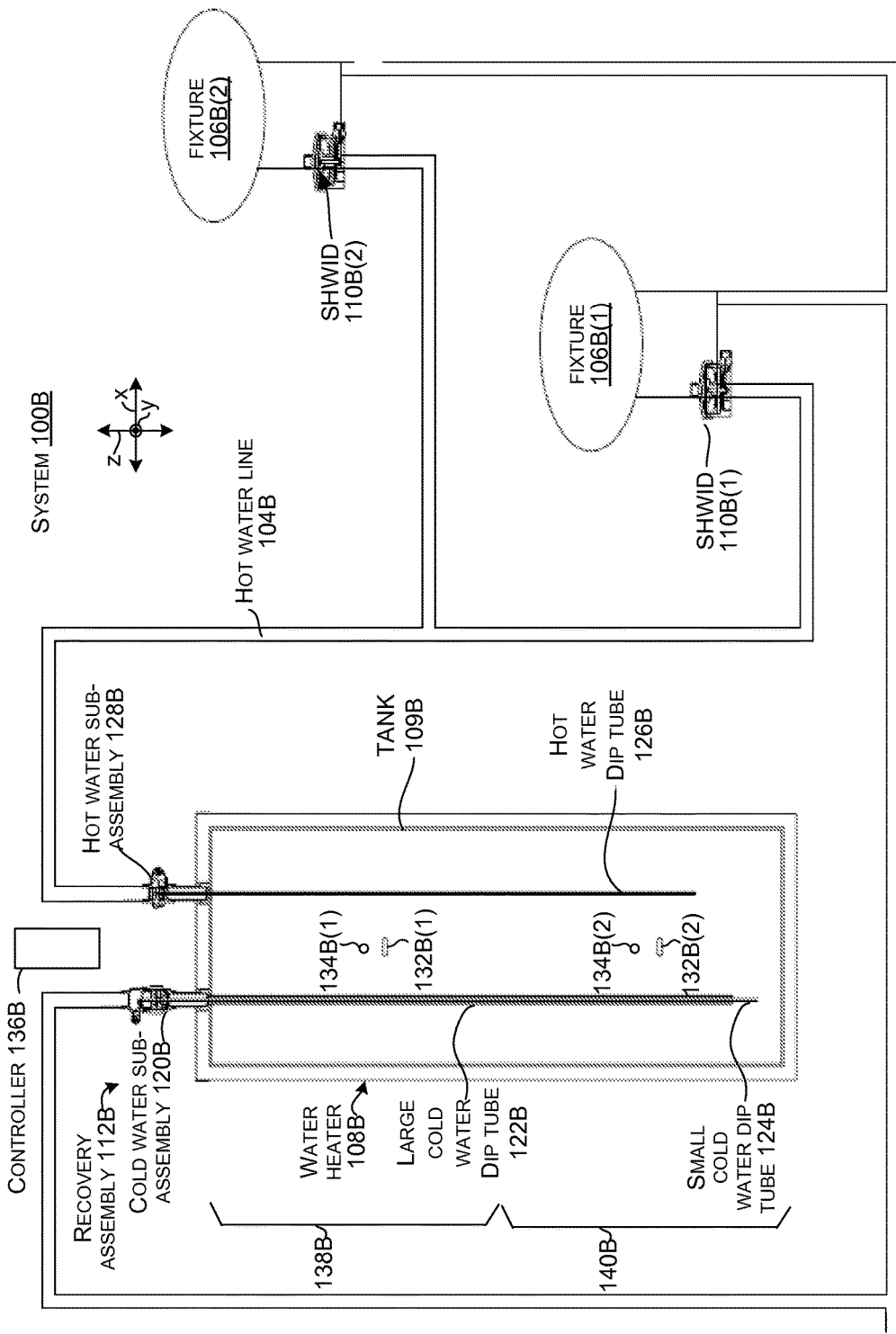

Fixtures 106 can be manifest as faucets, dish washers, and/or clothes washers, among others. From one perspective fixture 106 can be thought of as any device that offers the ability to control the flow of hot and/or cold water. An individual SHWID 110 can be associated with an individual fixture and can be located proximate to one or more of the fixtures. In this example cold water cross-over devices are positioned proximate to each of the fixtures. For instance, SHWID 110(1) is positioned proximate to fixture 106(1) and SHWID 110(2) is positioned proximate to fixture 106(2). The SHWIDs 110 can function to selectively allow cold water to flow to the hot water line, but block water from the hot water line flowing to the cold water line. Scenarios in which cold water could flow from the cold water line 102 to the hot water line 104 are described below. In the illustrated implementation, the SHWIDs 110 are electronically controlled by controller 136. More specifically, valve controllers 114 are manifest as wireless valve controllers that can be selectively controlled by controller 136. Alternative examples of SHWID configurations are described below relative to system 100A (FIG. 22) and system 100B (FIG. 36).

The SHWID's (wireless) valve controller 114 is configured to open and close the isolation valve 116. For instance, the valve controller 114 can activate a solenoid, motor, or other device to open and close the isolation valve 116. The valve controller 114 may be communicatively coupled to the temperature sensor 118 and/or flow sensor 119 to convey sensed information from the sensors 118 and/or 119 to the controller 136. For instance, the valve controller may be connected by wires to the sensors 118 and 119 and wired or wirelessly communicate signals from the sensors to the controller 136.

Figure 2:
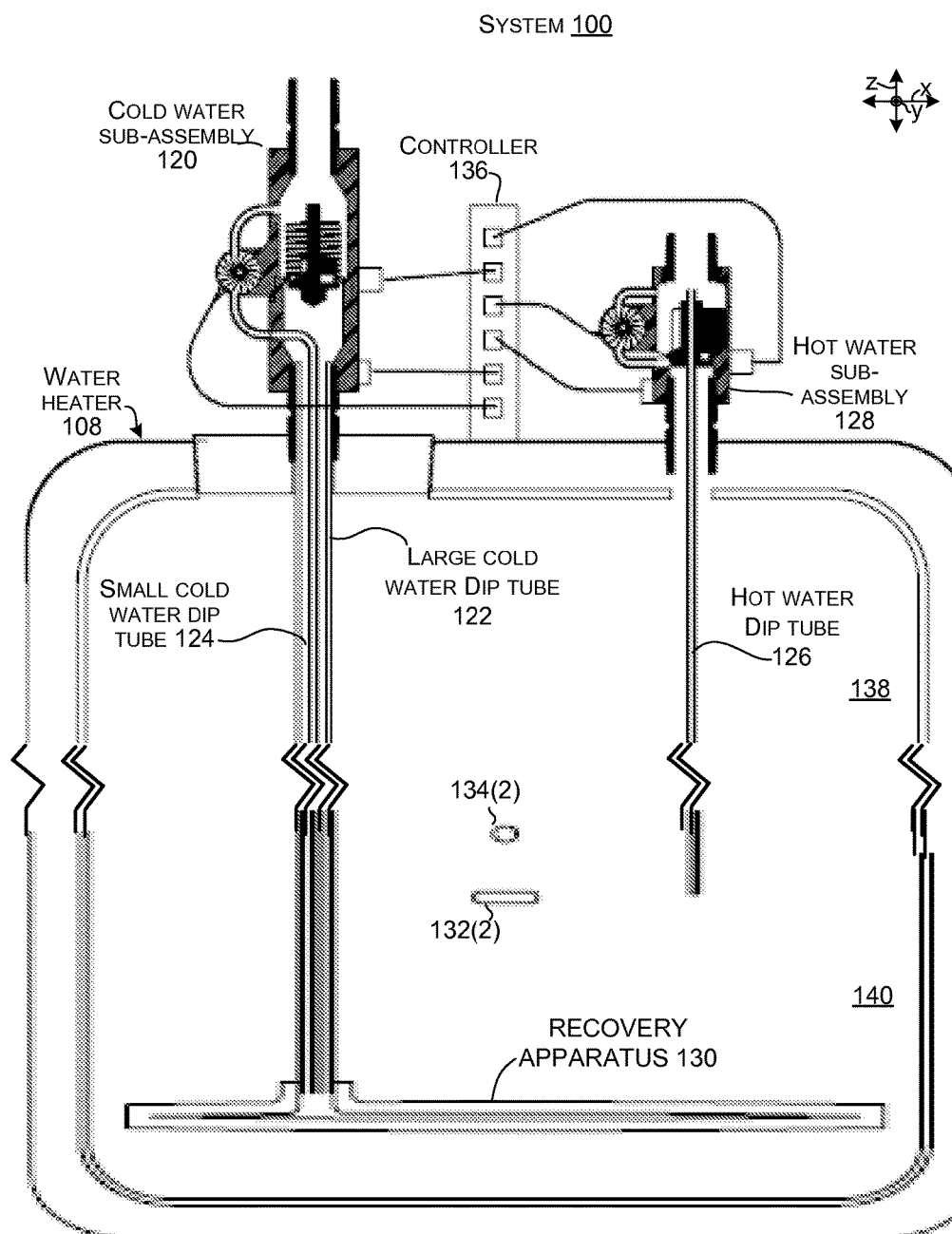
Figure 7A:
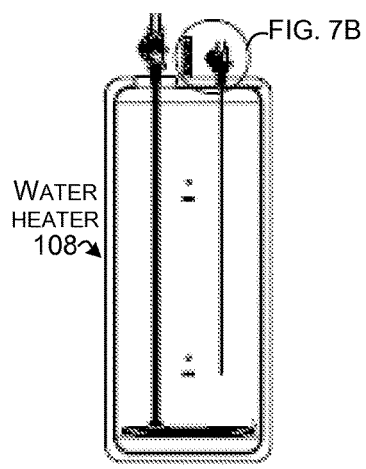
Figure 7B:
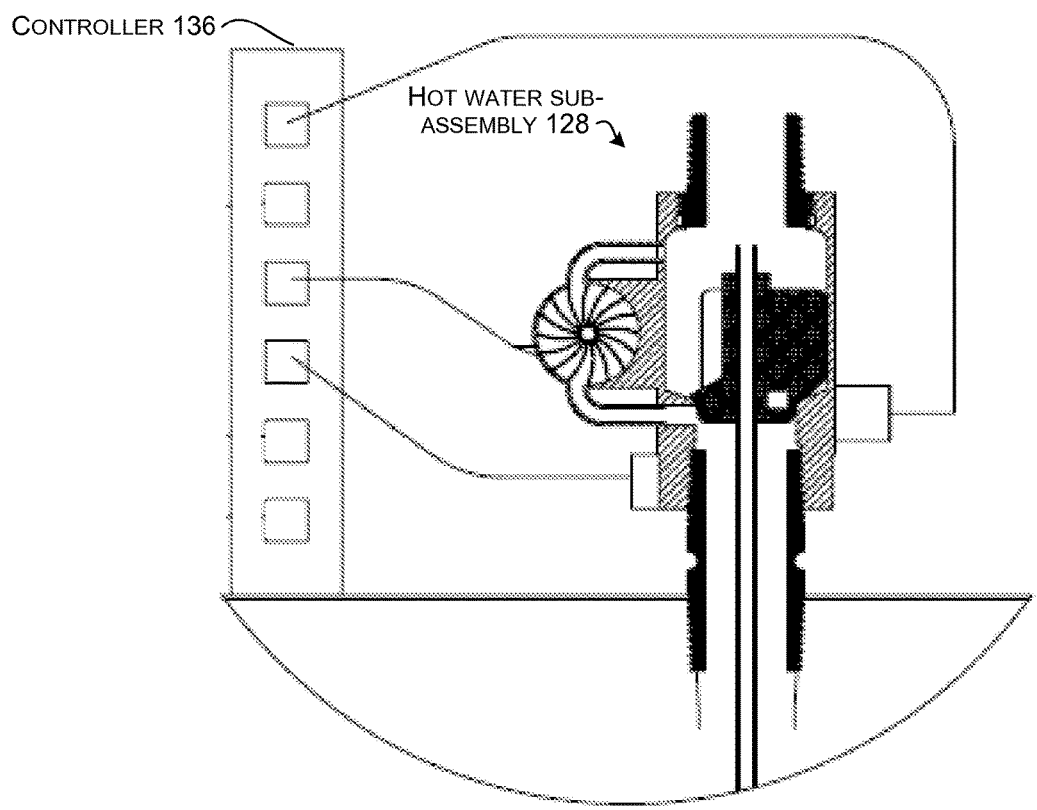
Figure 8B:
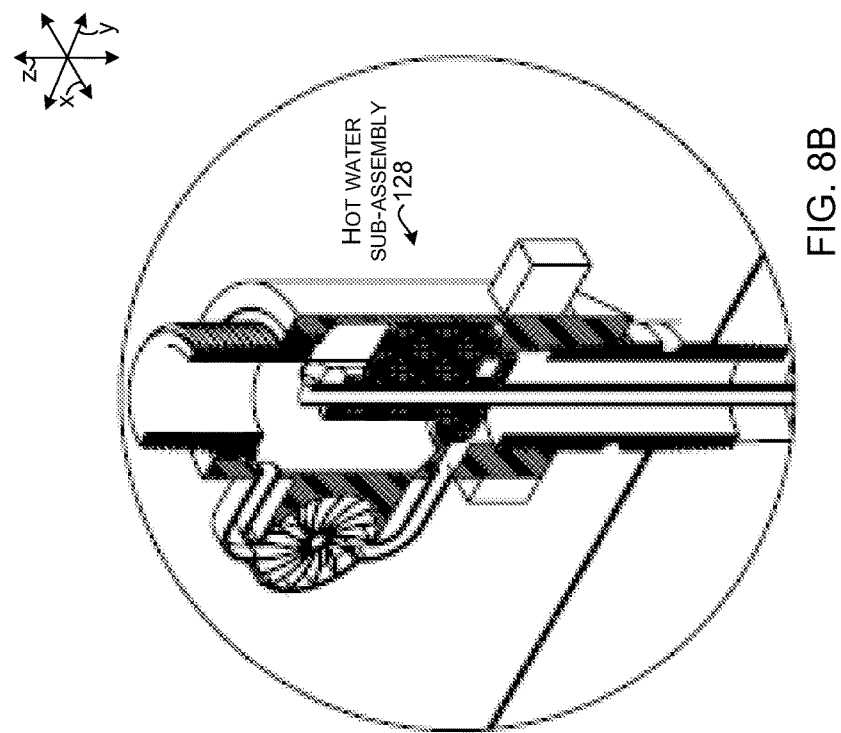
Figure 8A:
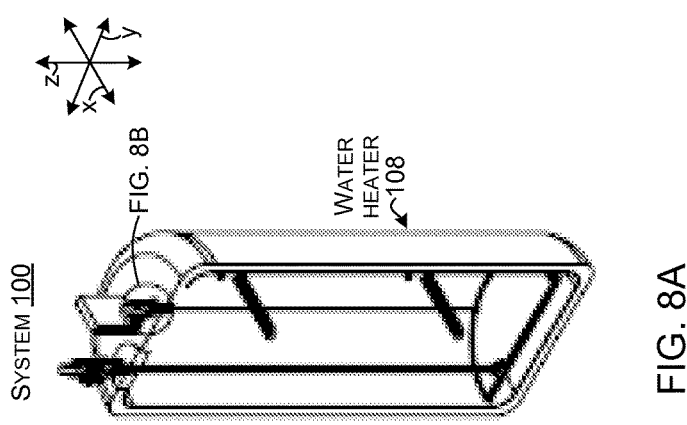
Figure 9:
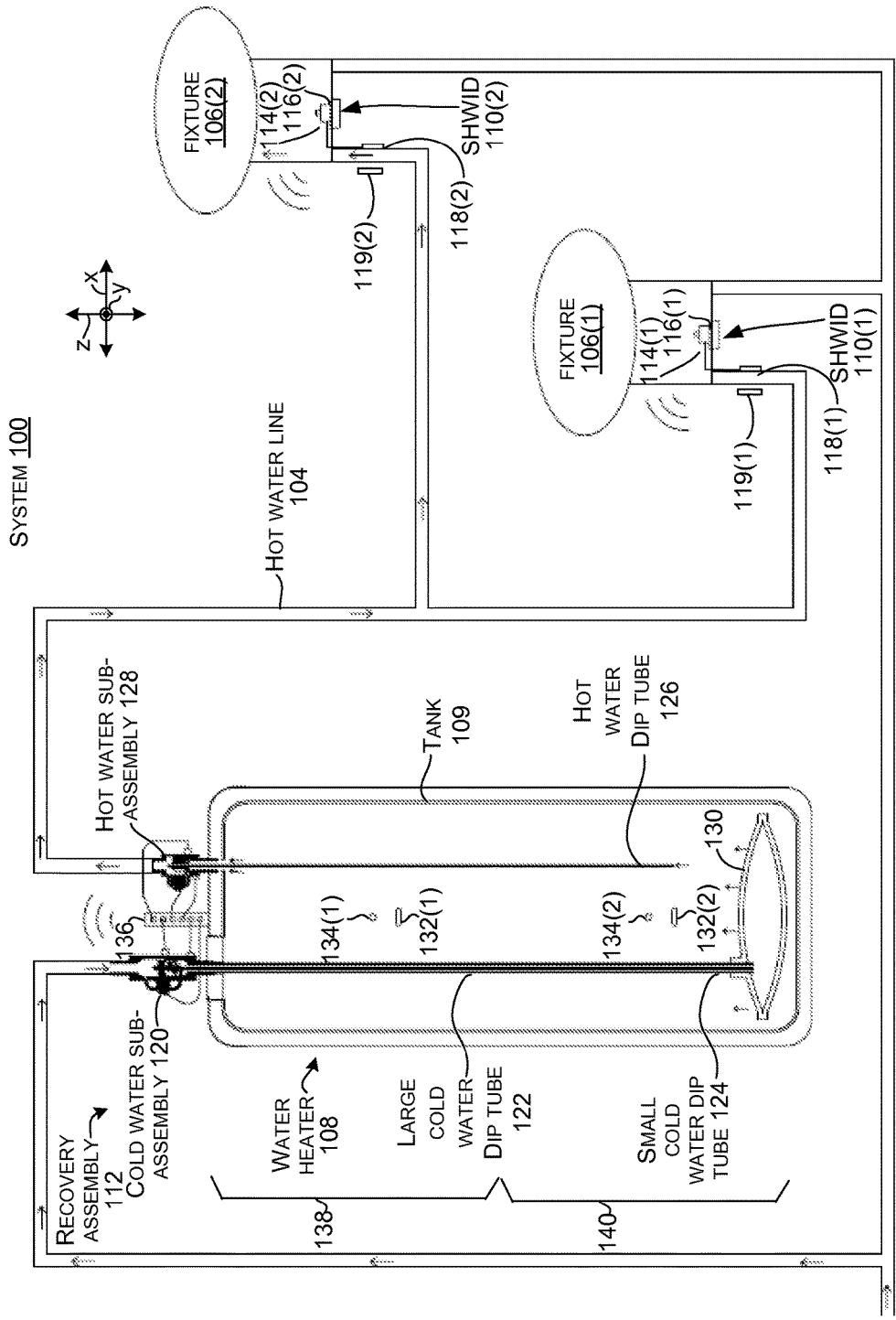
Figure 14A:
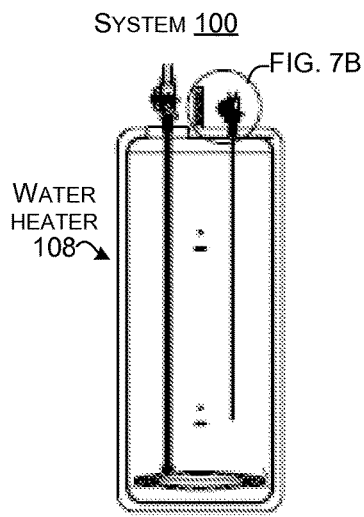
Figure 14B:
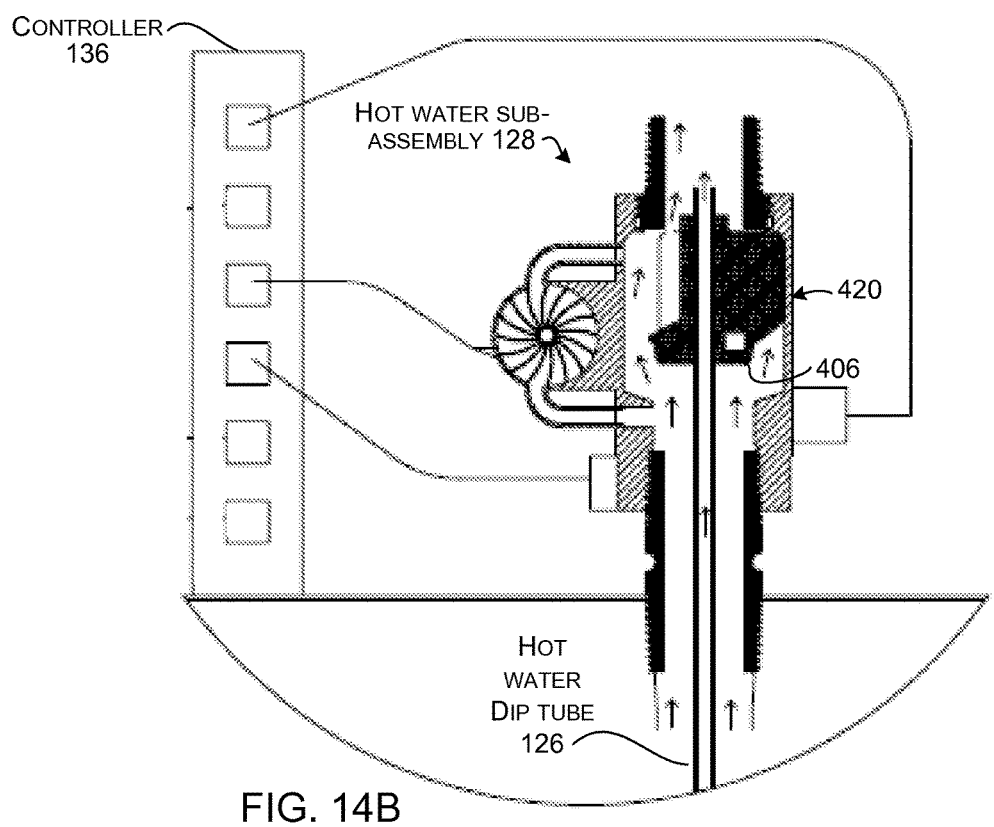
Figure 15B:
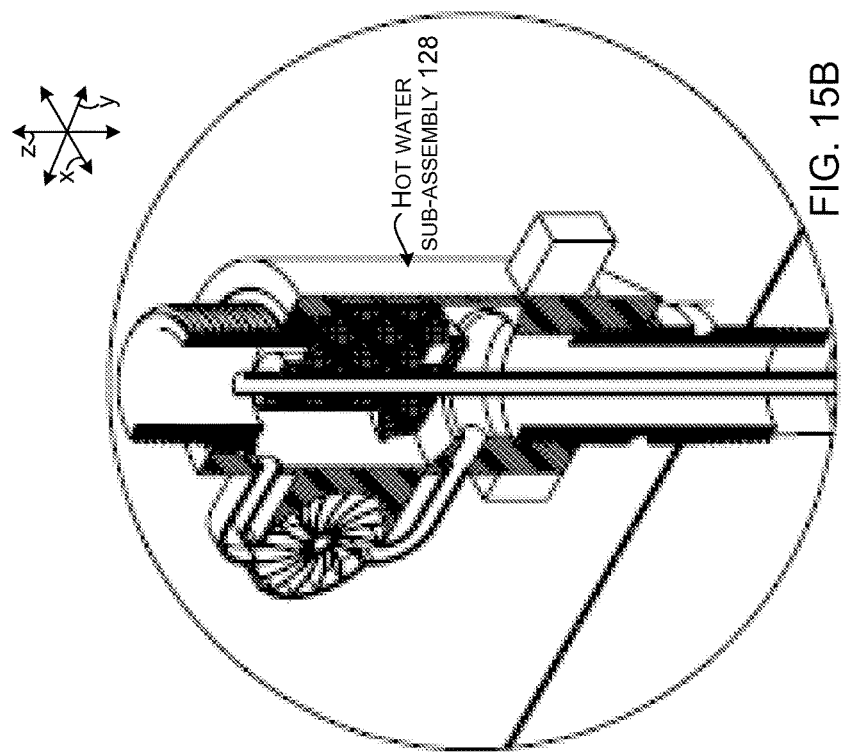
Figure 15A:
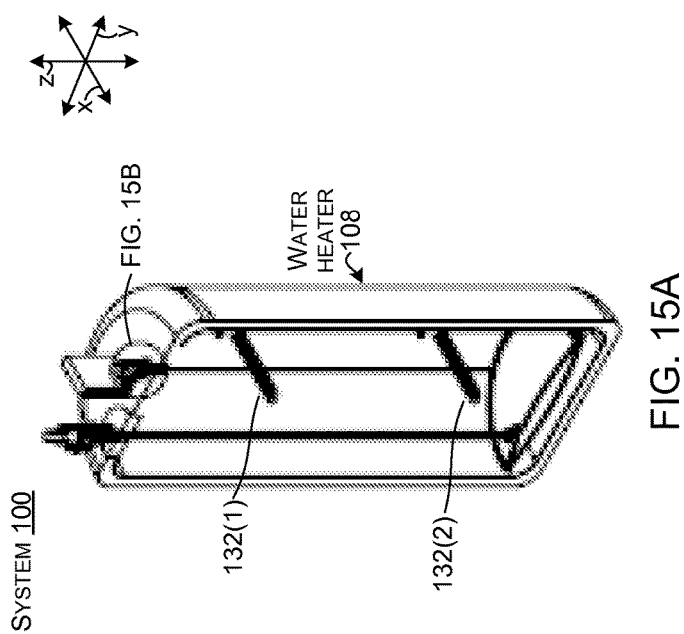

FIGS. 1-21 are now described collectively. FIGS. 2, 3A-3D, 4A-4D, 5A-5C, 6A-6C, 7A-7B, and 8A-8B collectively show further details of the system 100 relating to example cold water sub-assembly 120, controller 136, and hot water sub-assembly 128. FIG. 2 shows upper and lower regions 138 and 140 of the water heater 108 with the intervening middle portion removed for ease of illustration.

In this case, as can be seen from FIG. 3A, the cold water sub-assembly 120 includes a body 300, a recovery pump 302, a valve piston 304 that includes a valve position magnet 306, a valve position sensor 308, a spring 310, and/or temperature sensors 312(1) and 312(2). The cold water sub-assembly 120 can be positioned relative to a cold water inlet 313 of the water heater 108.

The valve position sensor 308 provides sensed information to the controller 136 as indicated at 314 (e.g., the position of the valve (or more specifically the piston 304)) that relates to water flow through the body 300 from the cold water line 102 to the water heater 108. The temperature sensors 312(1) and 312(2) provide information to the controller as indicated at 316 relating to the temperature of water in the body 300 and the small cold water dip tube 124, respectively. Also, at 318 the controller 136 is coupled to the recovery pump 302 so that the controller can selectively control operation of the recovery pump. The recovery pump 302 is connected in fluid flowing relation to the small cold water dip tube 124 and a volume above the piston 304.

FIGS. 3B-3D show details of piston 304. Body 300, piston 304, and spring 310 can function as a check valve 320 that can allow water to enter the water heater through the check valve but not exit the water heater through the check valve.

FIG. 4A shows details of example hot water sub-assembly 128. In this case, the hot water sub-assembly includes a body 400, a circulation pump 402, temperature sensors 404(1) and 404(2), a valve piston 406, a valve position magnet 408, a valve position sensor 410, and a hot water outlet port 412. The hot water sub-assembly 128 can be positioned relative to a hot water outlet 413 of the water heater 108.

The valve position sensor 410 provides sensed information to the controller 136 as indicated at 414, and the temperature sensors 404 provide sensed temperature information to the controller 136 at 416. The controller 136 can control the operation of the circulation pump 402 as indicated at 418. The piston 406 can interact with the body 400 to function as a check valve 420. The check valve 420 can allow water flow from the upper region 138 (FIG. 1) of the water heater 108 into the hot water line 104, but block the reverse flow from the hot water line into upper region of the water heater. (Note that the circulation pump 402 provides a controlled way to circumvent the check valve 420 but only allows water returning to the water heater to travel down the hot water dip tube 126 to the lower region 140 (FIG. 1). FIGS. 4B-4D show details of piston 406.

FIGS. 5A-18B further explain system 100 through various operating states. FIGS. 5A-8B show the system in a resting state. FIGS. 9-15B show the system during hot water usage/flow state. FIGS. 16-18B show the system during hot water recovery state.

FIGS. 5A-8 show system 100 in a resting state (e.g., no hot water draw has occurred recently or is occurring presently, and no water is moving in the system). FIG. 5A shows a portion of system 100 and FIGS. 5B and 5C show further details of specific components as indicated in FIG. 5A. FIGS. 5A-5C are elevational views, and FIGS. 6A-6D show corresponding isometric views. Similarly, FIGS. 7A-7B are elevational views, and FIGS. 8A-8B show corresponding isometric views. When considered collectively, these figures show the recovery apparatus 130 empty (e.g. in its non-expanded state) and water pressure within the system is generally even and water is generally static. Specifically, FIG. 6D introduces a check valve 602 on recovery apparatus 130. In this case, the check valve is manifest as a duckbill valve, but other types of check valves can be employed. The check valve 602 can allow water flow from inside of the recovery apparatus under certain conditions, such as when the recovery apparatus is expanded, but blocks flow from the outside to the inside. The check valve 602 is also shown and discussed relative to FIG. 13D.

FIGS. 9, 10A-10C, 11A-11C, 12A-12C, 13A-13D, 14A-14B, and 15A-15B collectively show details of system 100 when hot water use occurs at fixture 106(2). (See arrows representing water flow starting with FIG. 9). The hot water use (e.g., opening the hot water side of the fixture 106(2)) allows hot water to flow out of the system at the fixture 106(2) and thus decreases pressure on the hot water side relative to the cold water side. Responsively, cold water flows from the cold water line 102 through the cold water sub-assembly 120 into the water heater 108. More specifically, the cold water is directed into the large cold water dip tube 122 and the cold water fills the recovery apparatus 130 (e.g., forces the recovery apparatus to expand from a collapsed configuration to an expanded configuration). The expanding recovery apparatus 130 increases water pressure in the water heater 108 and hot water flows from the top of the water heater 108 into the hot water sub-assembly 128 into the hot water line 104 and ultimately to fixture 106(2). Note that some implementations can eliminate the recovery apparatus. (See for instance, system 100B of FIG. 36). However, the use of the recovery apparatus can enhance energy savings since the water from the cold water line 102 tends to be cooler than water already in the water heater 108. As such, isolating the incoming cooler water and later forcing it back into the cold water line 102 during hot water recovery rather than other warmer water from the water heater 108 can retain more energy in the water heater that would otherwise be lost through the cold water line.

In some implementations, the recovery apparatus 130 can be manifest as a flexible bladder that is resiliently biased to a collapsed configuration but can be temporarily enlarged to an expanded configuration. In this implementation, the recovery apparatus can be positioned inside the water heater 108 and can temporarily store cold water inside the water heater. This volume of cold water is displaced by the hot water that is returned from the hot water line 104 during hot water recovery. The recovery apparatus 130 can be placed proximate to the bottom (e.g., in the lower region 140) of the water heater 108 and is connected to the large cold water dip tube 122. The flexible bladder implementation can be made of flexible material that insulates the stored water from the water surrounding the expandable bladder. When hot water is used at the fixtures, cold water from the cold water line 102 flows through the large cold dip tube 122 into the expandable bladder implementation of the recovery apparatus 130. The recovery apparatus can include resistance check valves 602 that serve as exit ports so that cold water is not able to flow through the recovery apparatus until it is full. For instance, FIG. 13D show the elastic recovery apparatus 130 expanded to the point where check valve 602 opens and allows water to flow from inside the recovery apparatus to external the recovery apparatus. In this implementation, all of the water that enters the water heater 108 passes through the recovery apparatus 130.

While the hot water side of the fixture 106(2) remains open, water entering the recovery apparatus 130 continues to expand it (see FIG. 10C) until the volume of the recovery apparatus 130 approaches its maximum designed size and water starts to flow through the recovery apparatus's check valve 602 into the water heater (see FIG. 13D). During this hot water flow, water can exit the water heater 108 for the hot water line 104 via two paths through the hot water sub-assembly 128 (see FIG. 14B). The first path is from the top of the water heater 108 past the piston 406. The second path is from the bottom of the water heater through the hot water dip tube 126 which bypasses the piston 406. The water traveling these two paths tends to be different temperatures (e.g., the water from the top of the water heater tends to be warmer than the water from lower in the water heater).

This configuration can offer additional advantages. For instance, in some cases it is recommended to set water heaters at 130 degrees Fahrenheit or above to reduce growth of micro-organisms. However, such temperatures may be higher than the user wants or feels safe with at the fixture 106. For instance, it is often recommended to use cooler water to reduce the speed at which babies and young children may be accidentally burned by the hot water. The present implementations can allow both conditions to be satisfied. For instance, the water heater 108 can be set to 130 degrees. However, during hot water flow, relatively hot water can flow from the upper region 138 of the water heater through the hot water assembly toward the hot water line 104. Relatively cooler water can flow up the hot water dip tube 126 from the lower region 140. The controller 136 can use the temperature sensors 404(1) and/or 404(2) and/or thermometer/temp sensor 118 for feedback to further adjust the speed of the circulation pump 402 to control the ratio of the relatively hot water and the relatively cooler water so that the water entering the hot water line is at or close to the desired temperature, such as 120 degrees.

Stated another way, it may be desirable for the temperature inside the water heater 108 at the top (e.g., upper region 138) to be hot enough to kill bacteria. However, users may not want water delivered from the fixtures 106 that is this hot. In circulation mode and/or hot water recovery mode, hot water can be returned to the bottom of the water heater and the hot water leaves the end of the hot water dip tube 126 and flows upward because of thermal convection until it reaches its thermal density level above the end of the hot water dip tube. When the recovery flow stops, the end of the hot water dip tube is exposed to cooler water. When hot water is used, a measure of this unheated (cooler) water is drawn up through the hot water dip tube 126 and mixed with the hot water as it passes through the check valve 420 at the outlet port to the hot water line 104. This allows the output temperature to be less than the temperature of the water at the top of the water heater 108. This feature provides energy savings in addition to the savings from the recovered hot water trapped in the pipes/lines. Briefly, the check valve 420 operates on the main volume or interior of body 400 but not on hot water dip tube 126. The check valve 420 operates as a one-way valve so that during hot water usage, hot water can flow up from the upper region 138 of the water heater 108 through the body 400 of the hot water sub-assembly 128 and simultaneously water can flow up from lower region 140 of the water heater through the body 400. This water mixture can then flow into the hot water line 104. However, when flow reverses during hot water recovery, check valve 420 blocks returning hot water from entering the top of the water heater 108. This returning hot water instead is forced to travel down the hot water dip tube 126 toward the lower region of the water heater. In some implementations the check valve 420 can also adjustable by the controller 136 to be more or less restrictive to water flow from the top of the water heater (e.g., upper region) during hot water usage at the fixture to affect the temperature of the hot water delivered to the fixture).

FIGS. 16, 17A-17C, and 18A-18B show system 100 recovering hot water after hot water flow stops at fixture 106(2). In this case, to recover hot water from hot water line 104, the controller 136 can cause wireless valve controller 114(2) to open isolation valve 116(2) proximate to fixture 106(2). The isolation valve can allow cold water to flow from the cold water line 102 to the hot water line 104. The controller 136 can also activate recovery pump 302 and circulation pump 402.

Briefly, when the controller 136 senses the end of a hot water draw, the controller can send current to start the valve controller 114(2), recovery pump 302, and/or circulation pump 402. In some implementations, the controller can delay activating these components for a period of time after hot water flow stops. The recovery pump 302 can draw cold water through the small cold water dip tube 124, from the recovery apparatus 130 at the bottom of the water heater 108. The recovery pump 302 can move cold water from the cold water line 102 through the SHWID 110(2) at the point of use into the hot water line 104 and return or recover the trapped hot water to the water heater 108. Recovery flow can be ended as water heater inlet and outlet ports approach the same temperature (as sensed by temperature sensors 312 and 404).

Stated another way, the cold water sub-assembly's recovery pump 302 can pull water from the recovery apparatus 130 through the small cold water dip tube 124 and force the water back into the cold water line 102. Further, since this water was the last water received from cold water line 102 during the hot water draw, this water likely is a lower temperature (e.g. less energy) than other water in the water heater 108. The hot water sub-assembly's circulation pump 402 can draw hot water from the hot water line 104 into the water heater 108. This recovered hot water can be replaced in the hot water line 104 by water from the cold water line crossing over into the hot water line through isolation valve 116(2)

Figure 16:
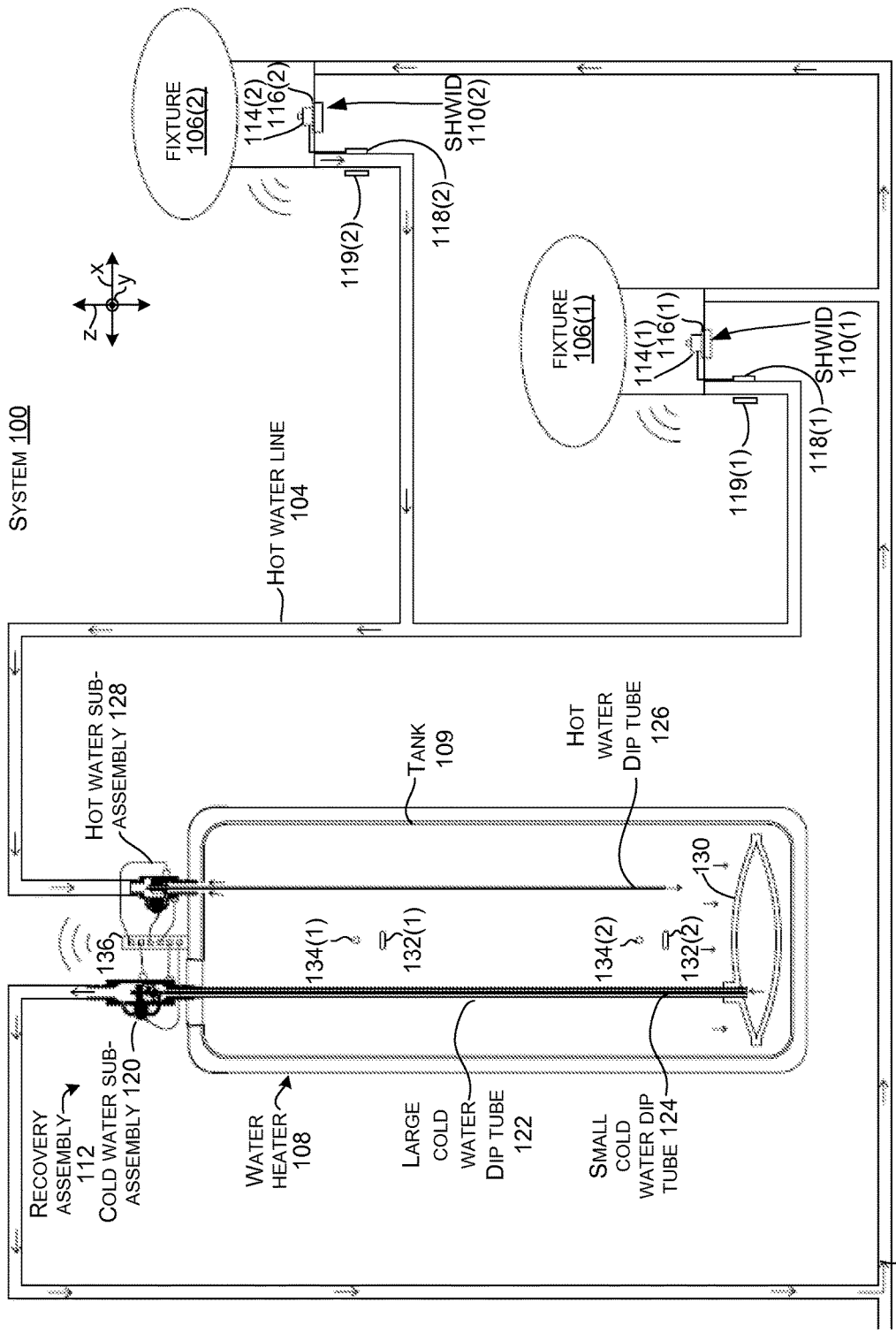
Figures 19A, 19B:
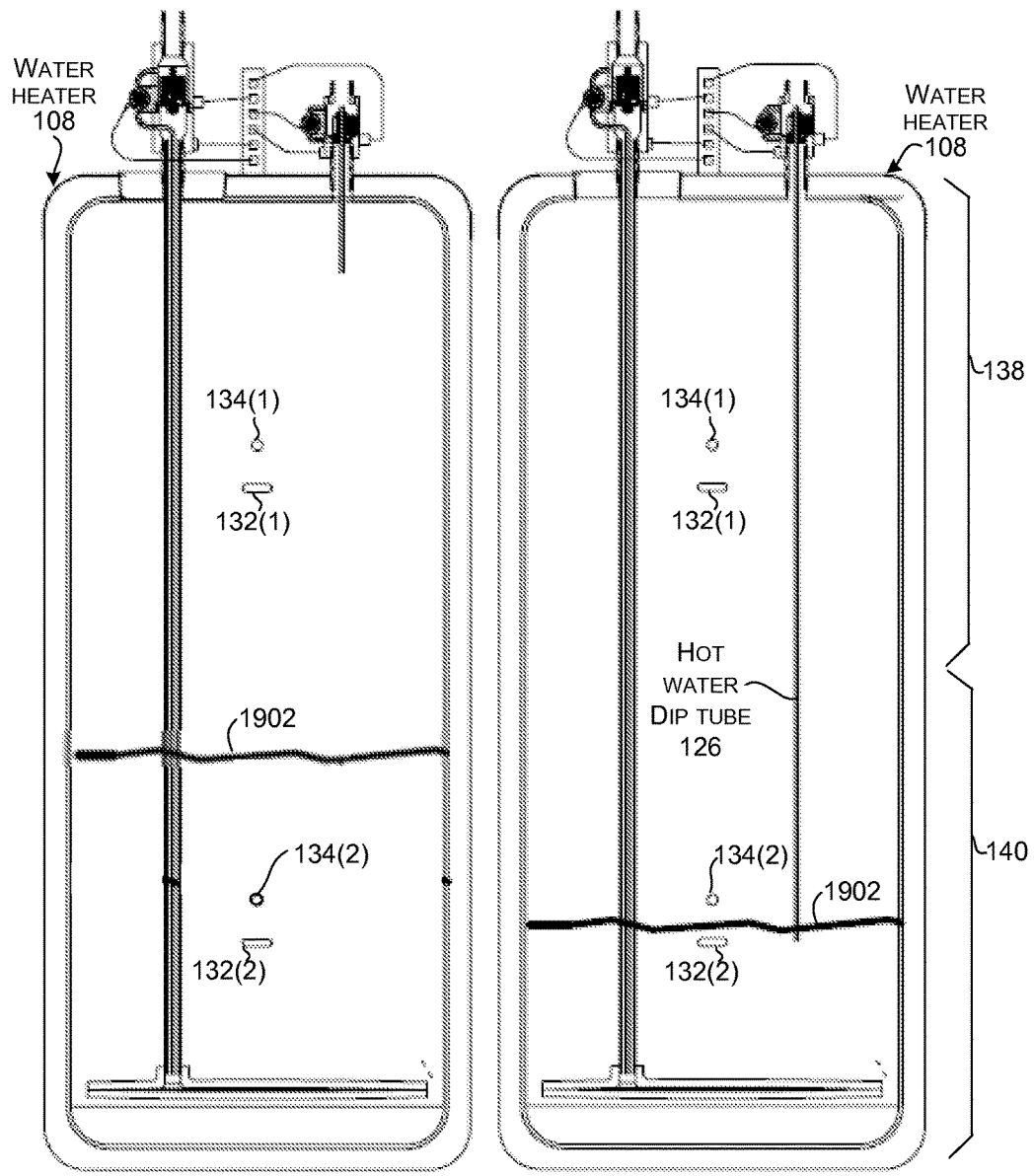

In this implementation, the circulation pump 402 can push the recovered hot water into the hot water dip tube 126 so that the recovered hot water is forced down into the lower region 140 of the water heater 108. Thus, in this case, the hot water is released not at the top of the water heater, but at a lower point. In this specific instance, the hot water exits from the end of the hot water dip tube 126 toward the bottom of the water heater, such as below the lower thermostat 134(2) in the illustrated configuration (FIG. 16). Releasing the recovered hot water below the lower thermostat tends to cause the lower thermostat to sense the energy in the recovered hot water and not activate the lower heating element 132(2). For instance, the lower thermostat 134(2) can be set at a threshold temperature so that if it senses water temperatures above the threshold it does not activate the lower heating element 132(2), but when the lower thermostat senses water temperatures below the threshold it activates the lower heating element. This aspect is illustrated in FIGS. 19A and 19B. Briefly, returning the recovered hot water proximate to and/or below the lower thermostat 134(2) can cause the lower thermostat to keep the lower heating element 132(2) powered off whereas otherwise, the lower thermostat would likely sense cooler water and turn the lower heating element on.

At the same time hot water is recovered into the water heater 108, the recovery pump 302 can draw water out of the recovery apparatus 130 through the small cold water dip tube 124. In the expandable bladder implementation, the bladder can deflate as the hot water is recovered from the hot water line 104 and the water from inside the bladder is pumped into the cold water line 102 by the recovery pump 302. The expandable bladder's one way check valve feature can prevent water from entering the bladder through the check valve (e.g., exit ports) 602 as it deflates.

Figure 18A:
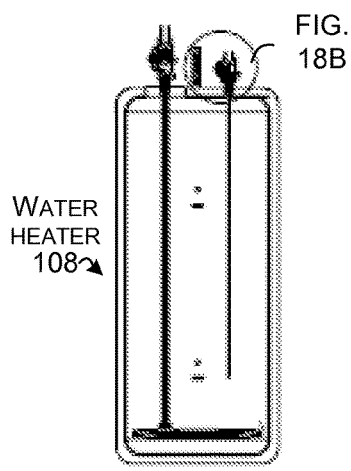
Figure 18B:
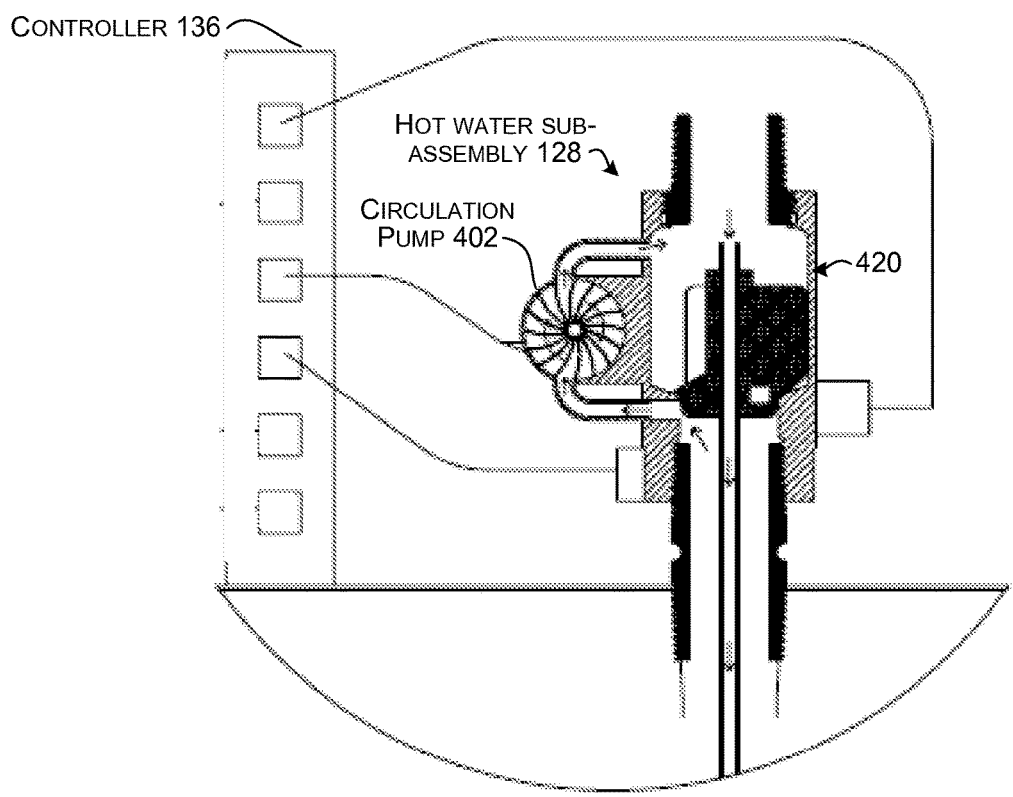

Also note that in the illustrated configuration of FIG. 18B, the circulation pump 402 can further de-stratify water in the water heater 108 by pulling relatively hot water from the top (e.g. upper region 138) of the water heater and pumping it down the hot water dip tube 126 to the lower region 140 of the water heater. This can reduce instances where relatively extremely hot water accumulates at the top of the water heater yet the water lower in the water heater is cool enough (e.g. below the threshold) that the lower thermostat 134(2) energizes the lower heating element 132(2).

FIGS. 19A and 19B show a line 1902 that demarcates a water temperature boundary. Water above the line is above a temperature threshold that causes the lower thermostat 134(2) to activate the lower heating element 132(2). Water below the line 1902 is below the threshold and causes the lower thermostat to activate the lower heating element. FIG. 19A shows a scenario where recovered hot water is returned to upper region 138 of the water heater 108. FIG. 19B shows a scenario where the recovered hot water is returned to the lower region 140, such as below the lower thermostat 134(2). In a scenario where equal amounts of hot water are recovered in both FIGS. 19A and 19B, the water heater 108 may use different amounts of energy. In FIG. 19A, heat energy is concentrated toward the top of the water heater. The lower thermostat 134(2) senses water below the threshold and activates the lower heating element 132(2). In contrast, in FIG. 19B, water temperatures in the water heater 108 are less stratified. The lower thermostat 134(2) senses water above the threshold and does not activate the lower heating element 132(2). This is due at least in part by delivering the recovered hot water below the lower thermostat 134(2) via hot water dip tube 126 terminating below the lower thermostat. Note that the exact position of line 1902 is for purposes of explanation and may be different in various implementations. The point of the illustrations is to emphasize managing the recovered hot water in a way that affects the lower thermostat. Thus, in FIG. 19B the line 1902 tends to be below the lower thermostat 134(2) more often that in FIG. 19A and thereby energy usage at the lower heating element is lowered. FIGS. 20 and 21 show schematic diagrams for alternative ways of controlling water heater operation.

FIG. 20 shows a circuit 2000 involving water heater 108, a power supply 2002, controller 136, controllable switch 2004, lower thermostat 134(2) in the form of a temperature actuated switch 2006, and lower heating element 132(2). The power supply 2002 is selectively connected to the lower heating element 132(2) via the temperature actuated switch 2006 and the controllable switch 2004. When the temperature actuated switch 2006 senses water temperatures below a threshold, it closes its switch portion to complete the circuit 2000 and energize the lower heating element 132(2) with the power supply 2002. However, in this case, the controller 136 can open controllable switch 2004 to prevent and/or stop energizing the lower heating element. For instance, at the end of a hot water draw, the temperature actuated switch 2006 may sense water temperatures below the threshold and close the temperature actuated switch 2006. However, the controller 136 may recognize that hot water is likely going to be recovered (lacking another hot water flow soon after the first) and thus open controllable switch 2004 to prevent energizing the lower heating element 132(2) until after the hot water recovery is completed. After the hot water recovery, the temperature sensed by the temperature actuated switch 2006 may be above the threshold and so the temperature actuated switch may open its switch and thus, the lower heating element 132(2) would not be activated even if the controller 136 closes controllable switch 2004 after the hot water recovery.

FIG. 21 shows schematic circuit 2100. In this case, the lower thermostat is replaced with a thermometer 2102. The thermometer's sensed output is communicated to the controller 136. The controller can utilize controllable switch 2004 to energize or de-energize the lower heating element 132(2). The controller can use various inputs to determine when to energize the lower heating element 132(2) (and/or the upper heating element). Looking at FIGS. 1-4A collectively with FIGS. 20-21, the input can include input from the thermometer 2102 and/or various other sensors, such as: temperature input from the inlet port (FIG. 3, temp sensor 312) and/or outlet port (FIG. 4, temp sensor 404), temperature inputs from the upper thermostat 134(1) (FIG. 1), input from the lower thermostat 134(2) (FIG. 20), temperature input from points of use (e.g., temperature sensors 118(1) and 118(2), FIG. 1), and/or flow sensing from a flow meter or a valve position sensor 119. Based upon any combination of these and/or other inputs, the controller can output current to drive recovery pump 302 (FIG. 3) and/or hot water circulation pump 402 (FIG. 4), output signals to isolation valves 116 (FIG. 1) at the points of use, and/or output to control the upper and/or lower heating elements 132(1) and 132(2). In this case, the controller can control the heating elements 132(1) and 132(2) in a smart manner based upon total heat energy in the system rather than simply based upon the localized temperatures sensed at the water heater's upper and/or lower thermostats 134(1) and 134(2) as has traditionally been the case.

In some implementations, the controller 136 can make the system interactive by responding to codes sent by the user. For example, the user may signal short on-off draws within a few seconds period to signal the controller to delay the recovery function at that point of use for a given space of time. For example, this feature can be useful during meal preparation.

Viewed from another perspective, system 100 can employ hot water dip tube 126 coupled with check valve 420 to deposit the hot water that is recovered from the pipes (e.g., hot water line 104) to the bottom of the water heater 108 below the level of the lower thermostat 134(2). The system can also allow the hot water to be drawn from the top of the water heater during normal hot water use. This water may or may not be mixed with cooler water from lower in the water heater to adjust the temperature of the delivered hot water. The system can also provide a conduit for overheated water at the top of the water heater 108 to be pumped to the bottom of the water heater 108 using circulation pump 402 (e.g., destratification).

In relation to water temperature stratification in the water heater 108, if the recovered hot water returns to the top of the water heater 108 it will not move downward against the natural thermal convection created by the burner or heater element and the lower thermostat 134(2) has no way of sensing this recovered heat energy. In contrast in the present implementations, the check valve 420 can direct the returning flow of hot water into the hot water dip tube 126 past the top of the water heater down to or below the lower thermostat 134(2). The lower thermostat can sense the recovered heat energy and can turn off the lower heating element 132(2). This is one way in which the system 100 saves the heat energy recovered from the hot water line and/or additional energy that would be used if the lower heating element was energized. This also more evenly distributes the heat energy throughout the water heater 108 and increases the thermal storage capacity of the water heater.

The present implementations can also leverage the lower heating element 132(2) that is located in the lower region 140 near the bottom of water heater 108. The accompanying lower thermostat 134(2) turns the lower heating element 132(2) on and off and tends to be located only a few inches above the lower heating element. Traditionally, thermal feedback from the top of the water heater must push downward to the lower thermostat by a weak thermal conduction force and overcome the forced convection thermal driving head created by the lower heater element. As a result, the temperature at the top of the water heater is often substantially higher than the thermostat setting at the bottom of the water heater. To provide feedback to the lower thermostat, some of the present implementations employ circulation pump 402 to force hotter water from the top of the water heater through the hot water dip tube 126 to the lower thermostat 134(2). The circulation pump 402 can be turned on or off by the controller 136 based on input from the temperature sensors 404 at the water heater outlet port, the upper water heater thermostat 134(1), the lower water heater thermostat 134(2), and/or the flow sensor 119. The controller 136 can activate the circulation pump if or when sensed temperatures at the top of the water heater exceed a set point and/or when a differential between temperatures sensed at the top of the water heater exceed those sensed at the bottom by more than a defined temperature spread, such as 30 degrees, for instance.

Note that some energy efficiency implementations can entail a water heater de-stratification mechanism with or without other recovery assembly components. The hot water de-stratification mechanism can mix the water in the water heater 108 so that the lower thermostat 134(2) senses a more accurate reflection of the thermal energy contained in the water heater. For instance, one implementation can include the hot water dip tube 126 and the circulation pump 402 with or without other recovery assembly components. Other implementations can be manifest as a stirrer or other water mover positioned within the water heater. Thus, the hot water de-stratification mechanism can contribute to a way of operating the water heater to reflect the true amount of energy in the water heater including the energy in any recovered hot water.

Figure 22:
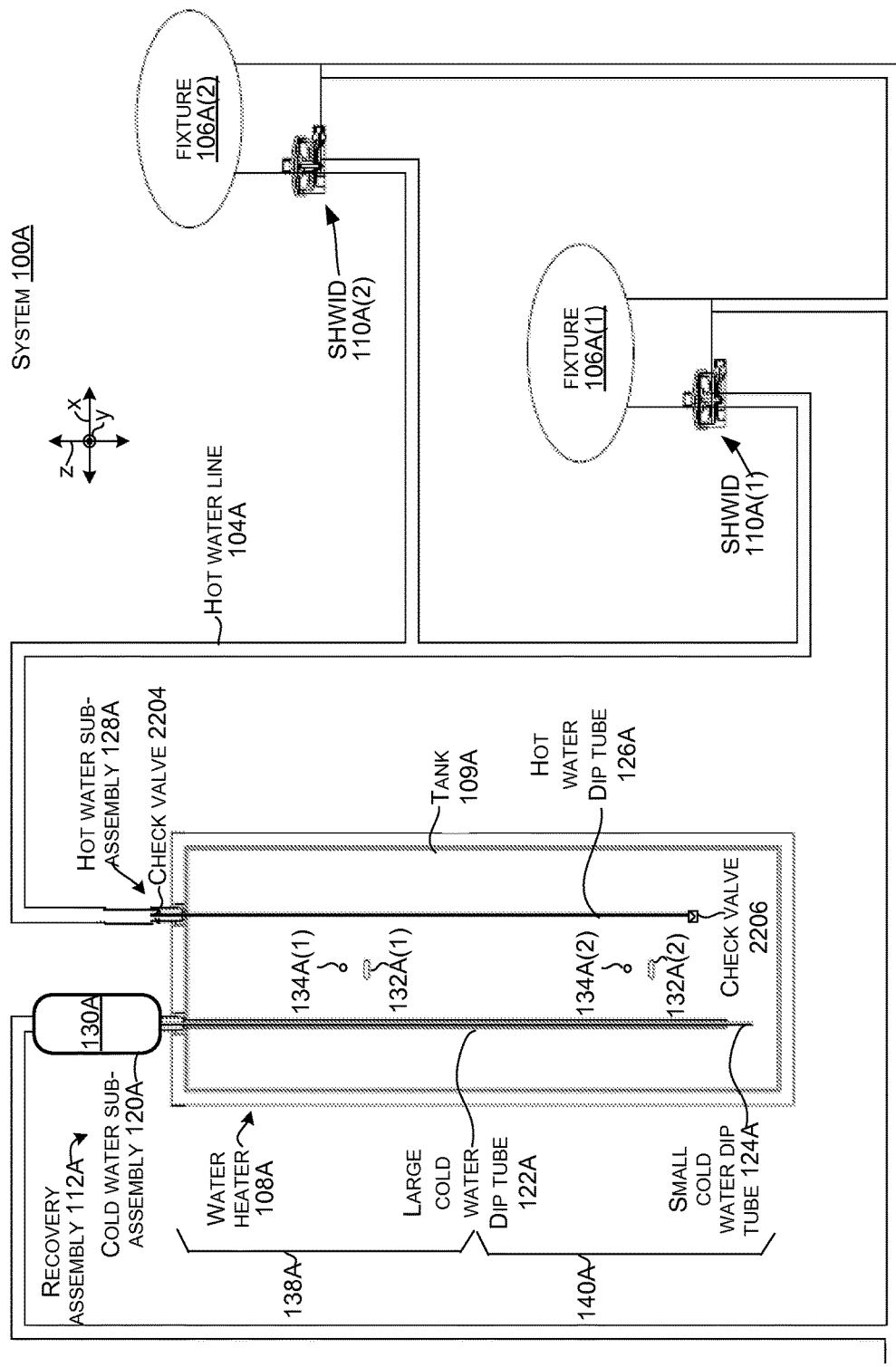

FIG. 22 introduces an alternative implementation of system 100A which is further explained relative to FIGS. 23-35B. In this case, the cold water sub-assembly 120A includes an external recovery apparatus 130A. An example of the recovery apparatus 130A is described in more detail below relative to FIGS. 23-27. The hot water sub-assembly 128A can entail a check valve 2204 that allows water to be drawn from top of the water heater into the hot water line 104A during hot water use at the fixture 106A, but does not allow water to be returned to the top of the water heater 108A. The hot water dip tube 126A can include a second check valve 2206 that allows water to be returned into the water heater 108A via the hot water dip tube 126A, but does not allow water to exit the water heater 108A via the hot water dip tube 126A. The SHWIDs 110A are manifest as mechanical devices, a version of which are described below relative to FIGS. 28-35B.

The SHWIDs 110A provide cold water cross-over after a hot water draw has occurred at a fixture 106A proximate to an individual SHWID. In this case, the recovery apparatus 130A can generate a pressure differential that causes hot water recovery without a controller or electric motors.

Figure 25:
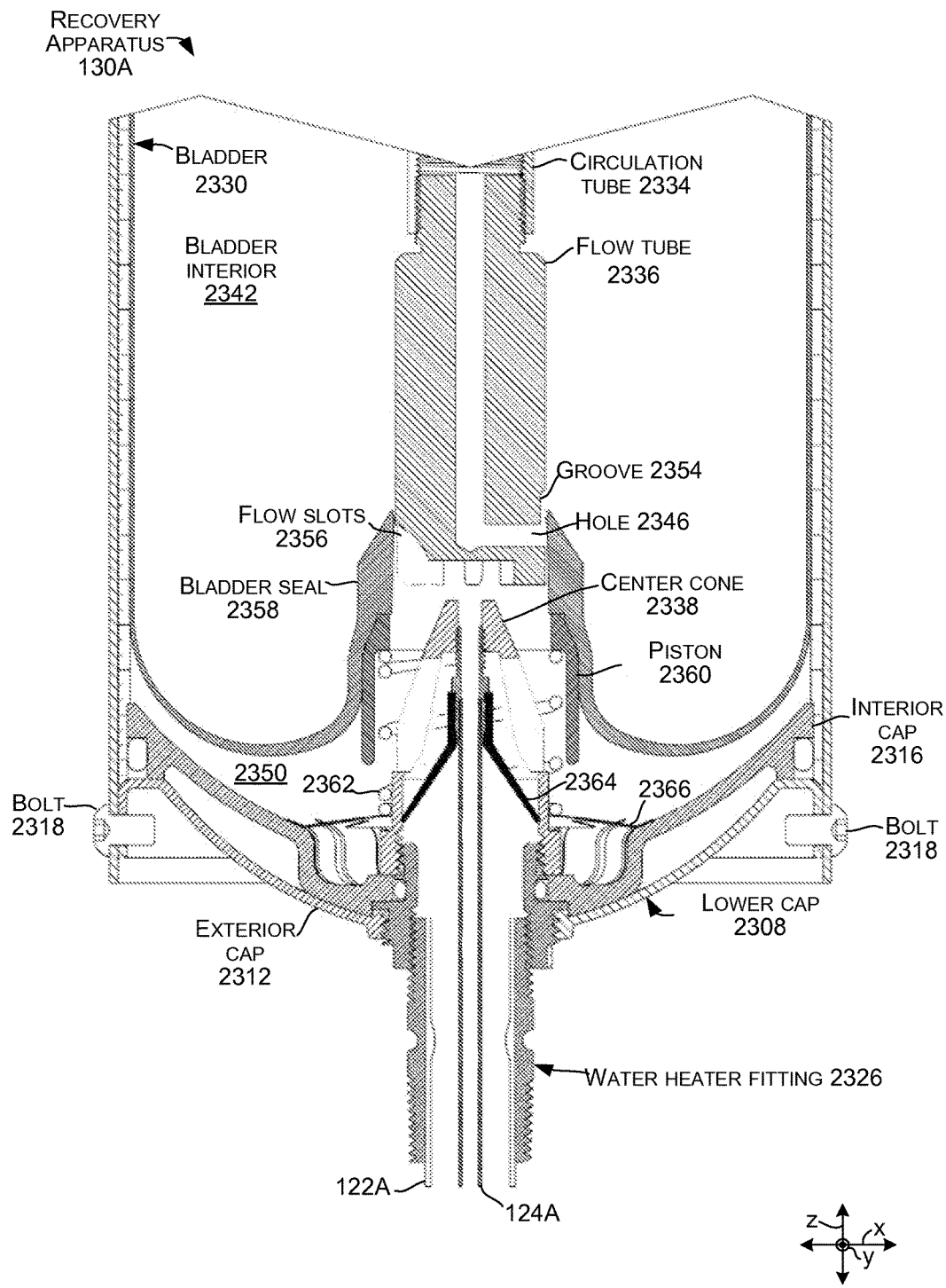
Figure 26:
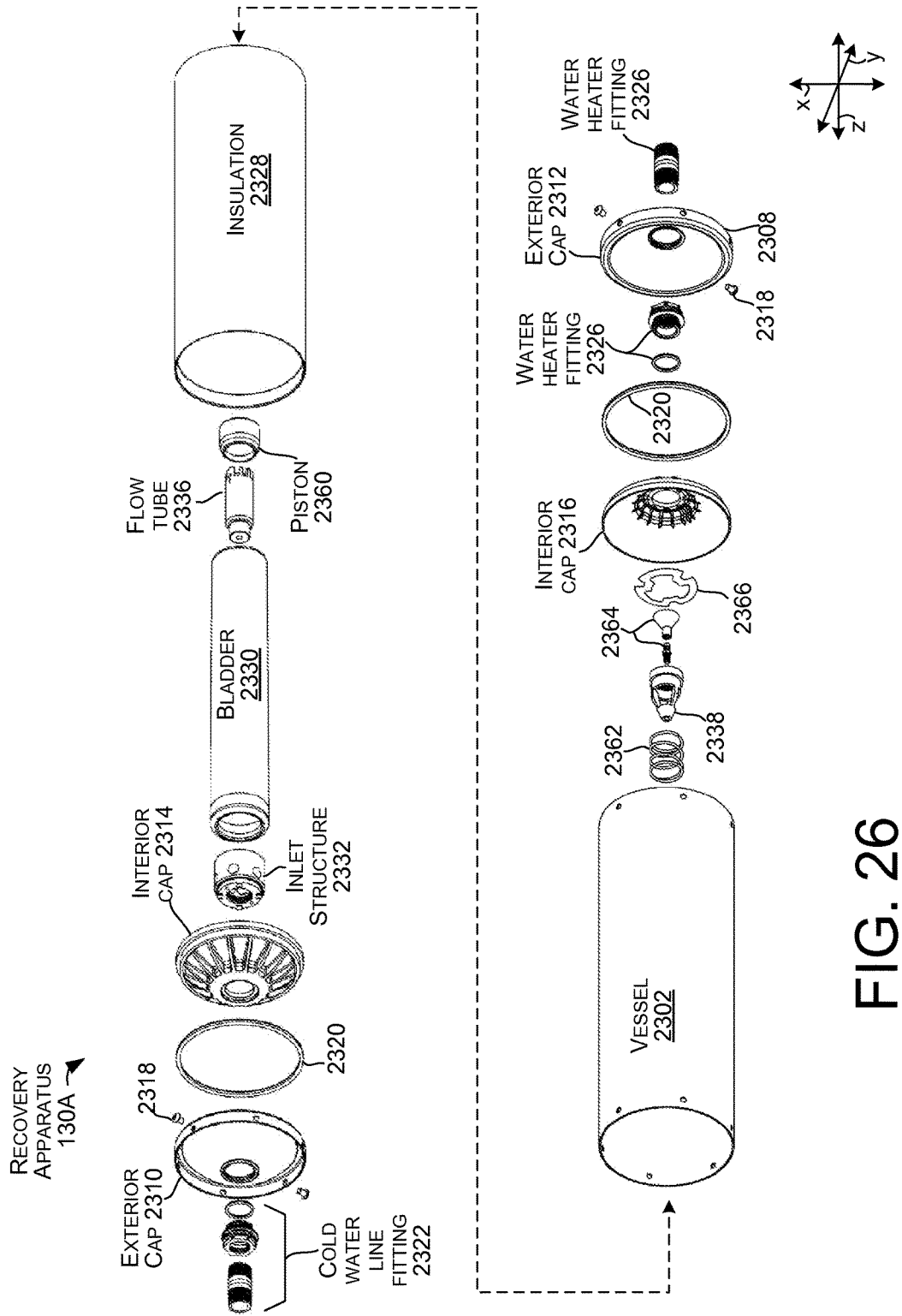
Figure 27:
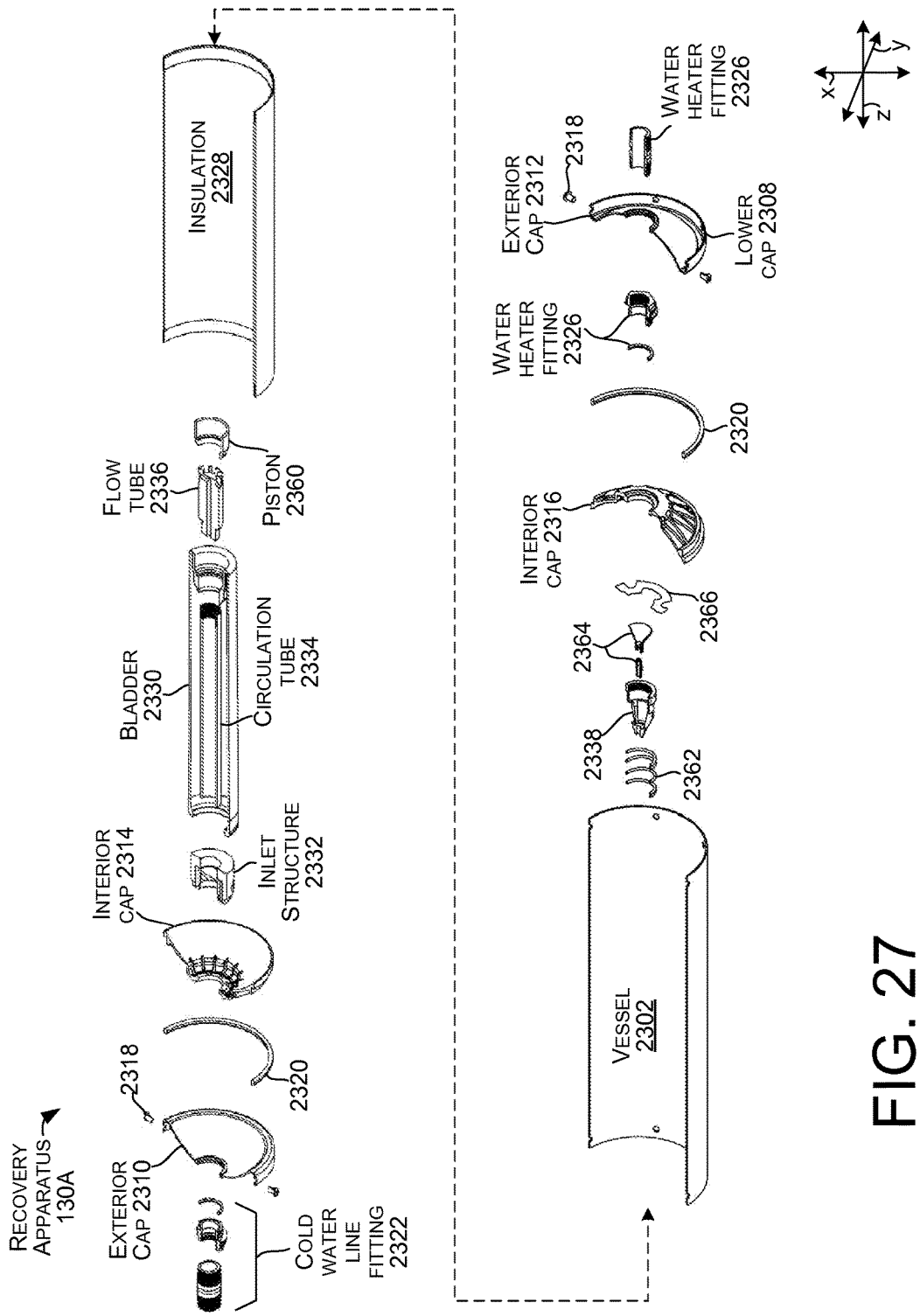

FIGS. 23 through 27 collectively illustrate example recovery apparatus 130A in more detail. Since the reader may have difficulty visualizing all of the components of recovery apparatus 130A from a single view, several views are offered concurrently. FIG. 23 is a sectional view of the recovery apparatus. FIG. 24 is a close-up view of portion 2300 of FIG. 23. FIG. 25 is a close-up, sectional view of a lower end of recovery apparatus 130A. FIG. 26 is an exploded, perspective view, and FIG. 27 is an exploded, cut-away perspective view of structures of the recovery apparatus 130A.

In the example illustrated in FIGS. 23 through 27, recovery apparatus 130A includes a vessel 2302 (e.g., barrel). The vessel can include an elongate portion 2304 and end caps, e.g., upper cap 2306, and lower cap 2308. In some implementations, the end caps can be configured with one or multiple pieces, and can be secured to the elongate portion depending on their configuration. In this example, the upper cap 2306 and lower cap 2308 each include exterior caps 2310 and 2312 and interior caps 2314 and 2316 (e.g., cap liners), respectively. The exterior caps can be secured to the elongate portion 2304 with screws 2318, and the interior caps can be sealed against the elongate portion with seals 2320. The end caps and the elongate portion can be securable to one another and/or sealed by other methods, either in a fixed or removable fashion.

The upper cap 2306 can be secured by one or more threaded connections (or otherwise secured) to a cold water line fitting 2322 (e.g., nipple and/or port adapter), which can define a cold water inlet port 2324. The cold water line fitting 2322 can also be secured by a threaded connection (or otherwise secured) to cold water line 102A (see FIG. 22). The lower cap 2308 can be secured by one or more threaded connections (or otherwise secured) to a water heater fitting 2326 (e.g., nipple and/or port adapter). Note that the cold water line fitting and/or the water heater fitting can be configured with one or multiple pieces, and can be secured to the end caps with or without seals. In the case shown in FIGS. 23 through 27, the cold water line fitting and the water heater fitting each include two pieces and are sealed against the end caps with a seal (shown but not designated). The large cold water dip tube 122A can be positioned within the water heater fitting 2326, and the small cold water dip tube 124A can be positioned within the large cold water dip tube 122A to thermally isolate cooler water from the small cold water dip tube from warmer water in the water heater. Additionally, the vessel 2302 can be surrounded by insulation 2328 (e.g., barrel liner) as feasible. Of course, other configurations are contemplated. For instance, the small cold water dip tube 124A could be positioned outside the large cold water dip tube 122A The recovery apparatus 130A can also include a bladder 2330, an inlet structure 2332 (e.g., bladder clamp), a circulation tube 2334, a flow tube 2336 (e.g., upper flow tube), and a center cone 2338 (e.g., lower flow tube). The bladder 2330 can be elastomeric in nature to aid the operation of the recovery apparatus as will be described below.

The inlet structure 2332 can have inlet holes 2340 such that cold water can pass from cold water inlet port 2324 through the inlet structure and into bladder interior 2342. The bladder 2330 can have a bladder top 2344 that is sealed against the inlet structure. In this case, the bladder top is bulbous and is received in a corresponding annular cavity of the inlet structure (shown but not designated). The inlet structure 2332, circulation tube 2334, and flow tube 2336 can be connected in series, by threaded connections or other sealed connections. The flow tube 2336 can define a fluid passageway from a hole 2346 to the circulation tube 2334 such that water can flow from the bladder interior 2342 into the circulation tube 2334. Further, the inlet structure 2332 can have a duct 2348 such that water can flow from inside the circulation tube 2334 to a bladder exterior 2350, as indicated by arrows 2352 (best viewed in FIG. 24).

As shown in FIG. 26, the interior cap 2314 can have one or more grooves (e.g., indentations). The duct 2348 of the inlet structure can be aligned with at least one groove such that a fluid passageway is formed from the inside of the circulation tube 2334 to the bladder exterior 2350. In other implementations, the fluid passageway could be formed in part by one or more indentations or grooves in an external surface of the bladder, or with raised areas of the external surface of the bladder, such as ribs or protuberances (e.g., bumps). Alternatively or additionally, an interior surface of the interior cap can have raised areas, such as ribs or bumps.

Structures in the lower end of recovery apparatus 130A will now be described in relation to FIGS. 23 and 25. Although shown in FIG. 23, these structures are best viewed in FIG. 25. Note that bladder 2330 is in a slightly different position in FIG. 23 as compared to FIG. 25. For example, in FIG. 23 the bladder is touching the interior 2316 of the lower cap 2308, but these parts are not touching in FIG. 25. As shown in FIGS. 23 and 25, in addition to hole 2346, flow tube 2336 can have flow tube groove 2354 and flow slots 2356. Bladder 2330 can include bladder seal 2358. The recovery apparatus can also include piston 2360 (e.g., spring sleeve), bladder spring 2362, check valve 2364, and snap disk spring 2366 (e.g., disk spring). The check valve 2364 can include one or multiple pieces, such as the check valve and a check valve barb (shown but not designated). In this case, the bladder seal is positioned on top of the piston 2360. The elastic nature of the bladder tends to seal the bladder against the piston and hold the lower end of the bladder in place. Fluid flow relationships between structures in the lower end of recovery apparatus 130A are determined by the operation of the recovery apparatus, and influenced by the operation of other components of system 100A, e.g., selective hot water isolation device 110A(1) (see FIG. 22).

Briefly, hot water flow at fixtures 106A(1) and/or 106A(2) can cause a decrease in pressure on the hot water side of the system relative to the cold water side as hot water flows from the water heater 108A into the hot water line 104A and out the fixture, such as fixture 106A. Water from the cold water line 102A overcomes the resilient bias of the bladder 2330. Cold water flow through the recovery apparatus 130A into the water heater 108A is delayed/blocked until the bladder 2330 is fully expanded against the side and bottom of the vessel 2302. The water can then flow into the large cold water dip tube 122A into the water heater 108A. After hot water use stops at the fixture 106A, the resilient bias of the bladder 2330 creates a force on water within the bladder to push that water back up into the cold water line 102A. This action creates a lower pressure within the vessel 2302 but outside the bladder 2330 than in the water heater 108A, and cooler water is drawn up the small cold water dip tube 124A from the lower region 140A of the water heater 108A into the recovery apparatus 130A. This action in turn draws/recovers hot water from the hot water line 104A back into the lower region of the water heater 108A via the hot water dip tube 126A when the associated SHWID 110A allows cold water cross-over proximate to the fixture 106A where the hot water flow occurred. This action can cause lower thermostat 134A(2) to sense warmer water than would otherwise be the case and operate the lower heating element 132A(2) accordingly. Of course, other recovery apparatus configurations can be employed to achieve the hot water recovery in a manner that reduces activation of the lower heating element 132A(2).

FIGS. 28 through 35B collectively illustrate example selective hot water isolation device 110A in more detail. The selective hot water isolation device (SHWID) 110A extends from a water heater end (e.g., inlet port) 2800 to a fixture end (e.g., outlet port) 2802 and couples to a cold water cross-over line to the cold water line 102A (FIG. 22) at a cross-over port 2804. The inlet port, outlet port, and cross-over port can be threaded or otherwise be securable to their respective water lines (e.g., the inlet and outlet ports can be connected to the hot water line 104A and the cross-over port can be connected to a small line that is connected to the cold water line 102A). This selective hot water isolation device can include a valve cap 2806 and a valve body 2808. The valve body includes a cylinder wall 2810. The valve cap and valve body can be threaded or otherwise be securable to one another, either in a fixed or removable fashion. A valve body seal 2812 is positioned between the valve cap 2806 and the valve body 2808. The valve cap 2806 can have an inside diameter that corresponds to an outside diameter of the cylinder wall 2810 such that the valve body seal 2812 can create a seal therebetween.

Figure 28:
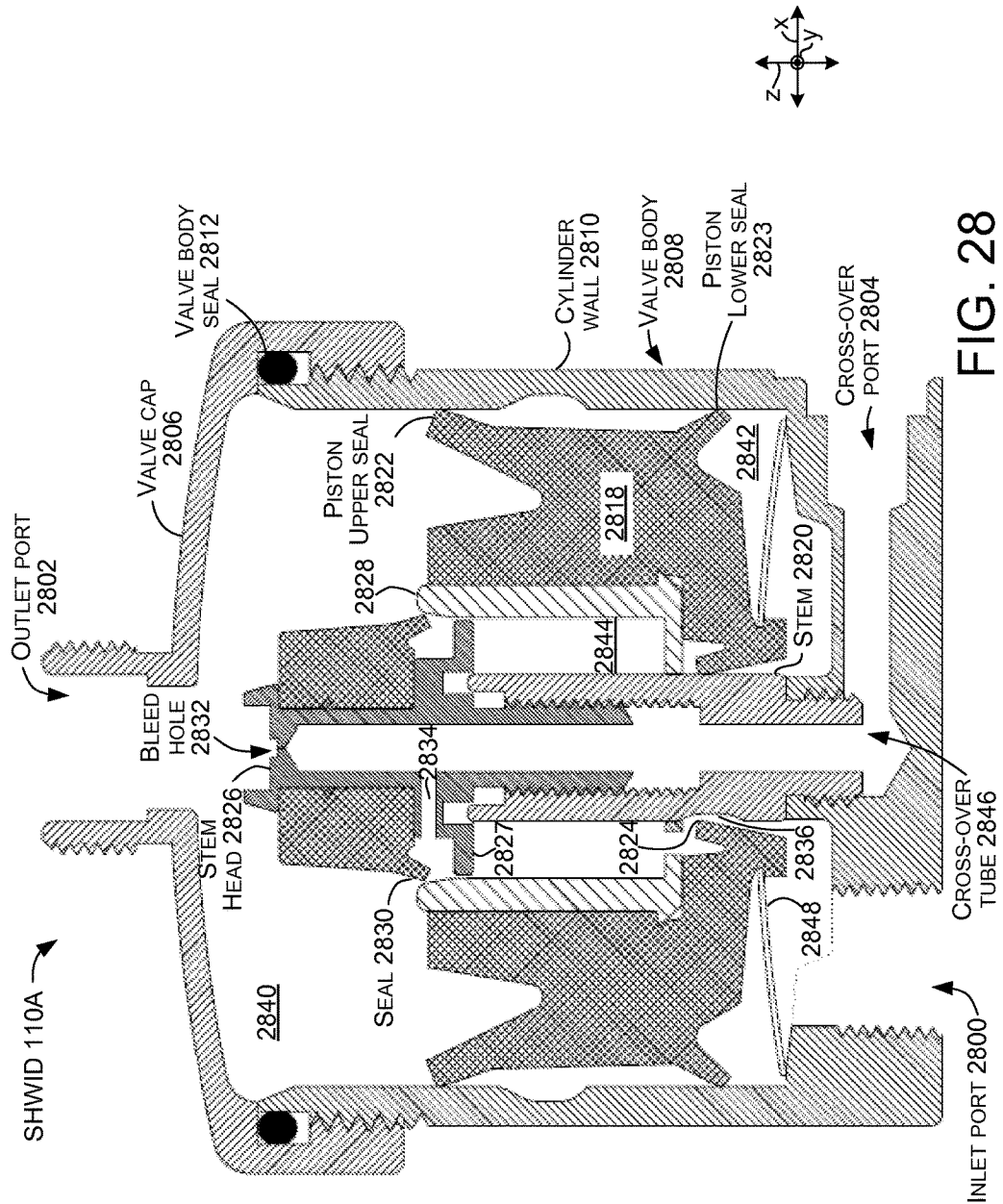

As shown in the example in FIG. 28, a piston 2818 is positioned in the valve body 2808. A stem 2820 is nested in the piston 2818. The piston includes an upper piston seal 2822 and a lower piston seal 2823 proximate the cylinder wall 2810 and an inner piston seal 2824 proximate the stem 2820. The stem includes a stem head 2826. An inner cylinder liner 2828 is nested between the stem head 2826 and the piston 2818, and a stem head seal 2830 is positioned between the stem head 2826 and the inner cylinder liner 2828. The dimensions of the piston, stem head, and inner cylinder liner can be such that the stem head seal helps create a seal therebetween. The stem 2820 can also include a bleed hole 2832, a metering hole 2834, and a stem groove 2836.

In this case, the valve body 2808, valve cap 2806, piston 2818, and inner cylinder liner 2828 collectively form an outer cylinder upper cavity 2840, an outer cylinder lower cavity 2842, and an inner cylinder cavity 2844. The outer cylinder lower cavity 2842 and the inner cylinder cavity 2844 extend radially around the stem 2820 in the x and y directions with respect to the x-y-z reference axes. The stem also has an inner cavity (cross-over tube) 2846. The inlet port 2800 is in fluid flowing relation with the outer cylinder lower cavity 2842. The outlet port 2802 is in fluid flowing relation with the outer cylinder upper cavity 2840. The cross-over outlet 2804 is in fluid flowing relation with the cross-over tube 2846. Bleed hole 2832 allows fluid to pass between the cross-over tube and the outer cylinder upper cavity 2840. Metering hole 2834 allows fluid to pass between the cross-over tube and the inner cylinder cavity 2844.

As shown in the example in FIG. 28, selective hot water isolation device 110A also includes snap disk spring 2848. In this case, the piston 2818 can move up and down the z reference axis with respect to the stem 2820. The position of the piston, the dimensions and positioning of the structures introduced above, and the action of the snap disk spring collectively determine further fluid flowing relations within the selective hot water isolation device 110A and the system in general.

In operation, FIG. 28 shows the selective hot water isolation device 110A at rest when the system is static and no water is flowing.

Figure 29A:
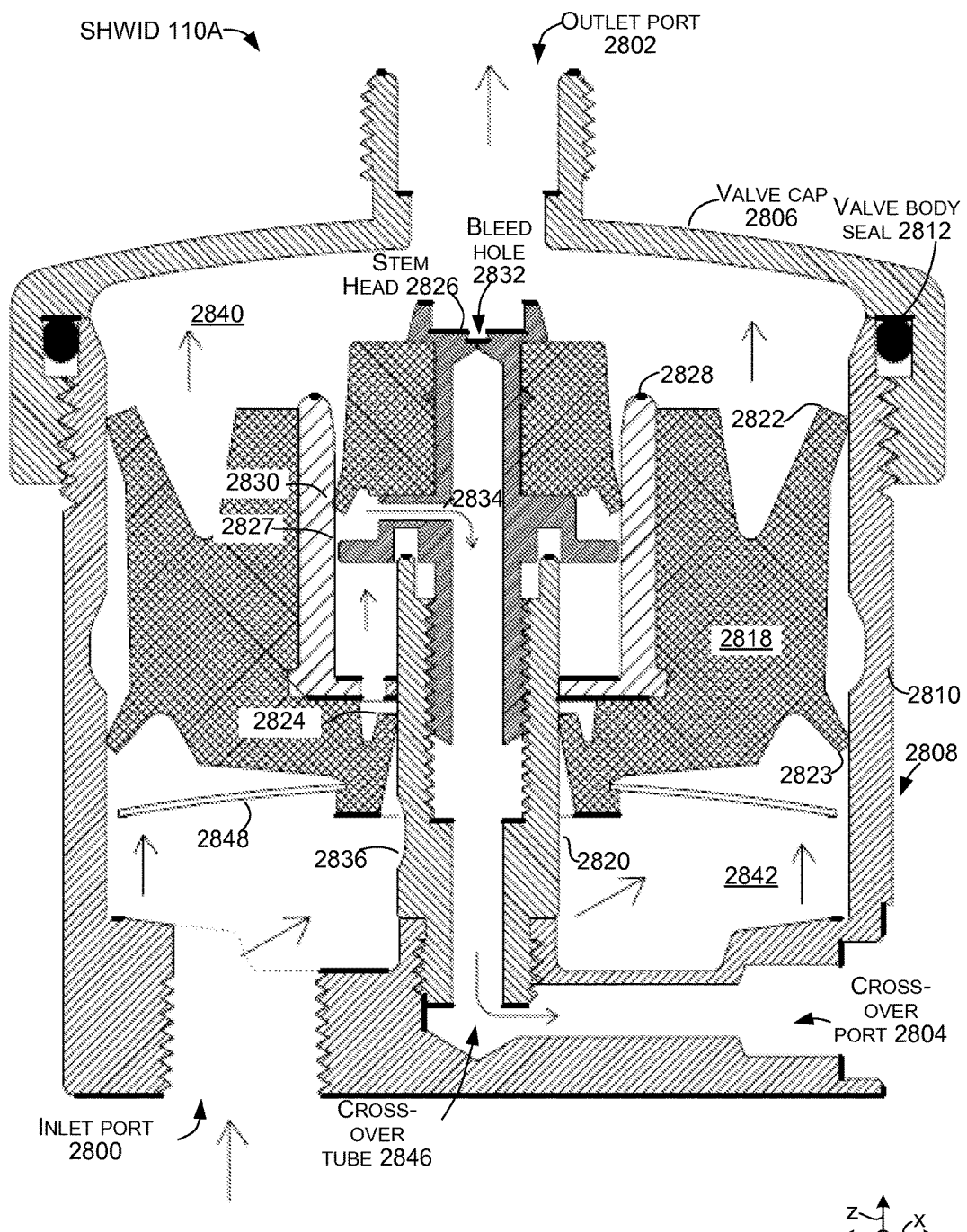
Figure 29B:
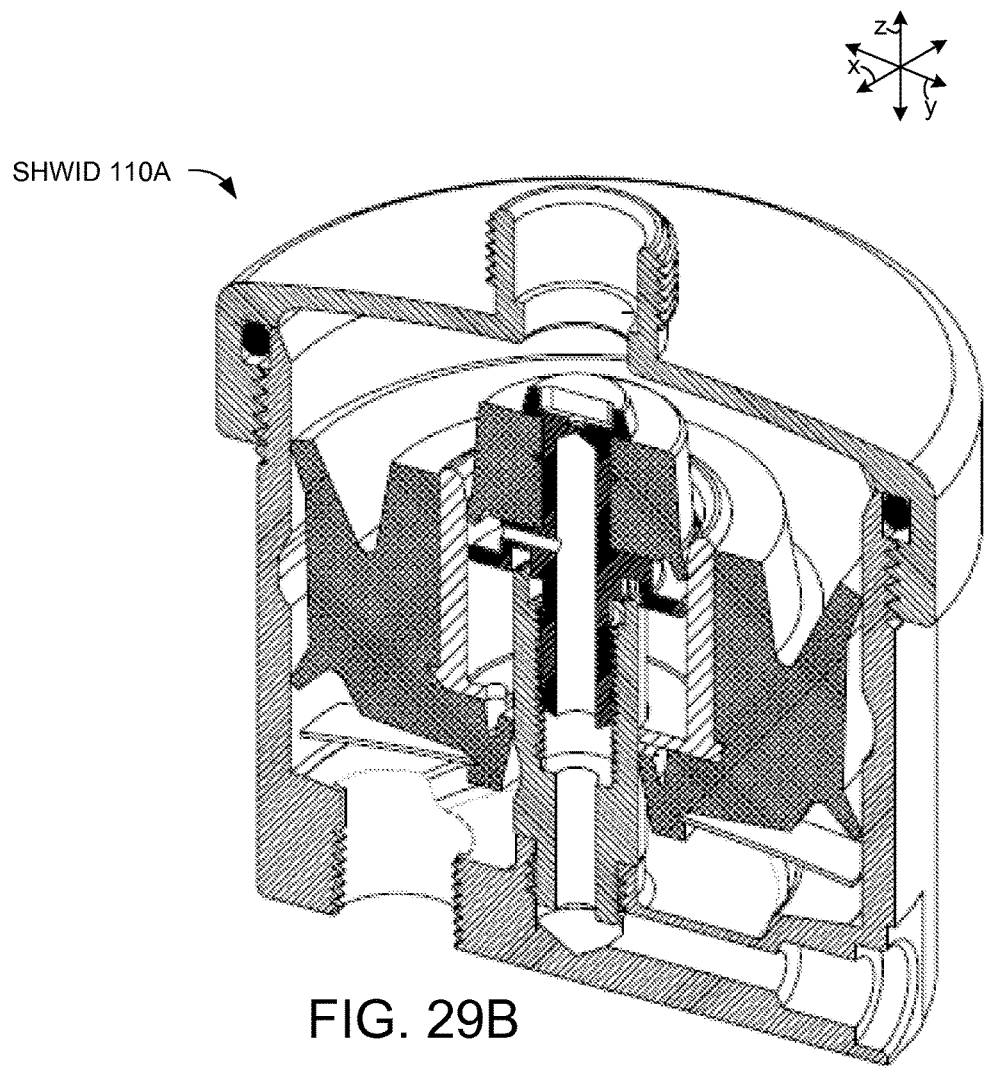
Figure 30A:
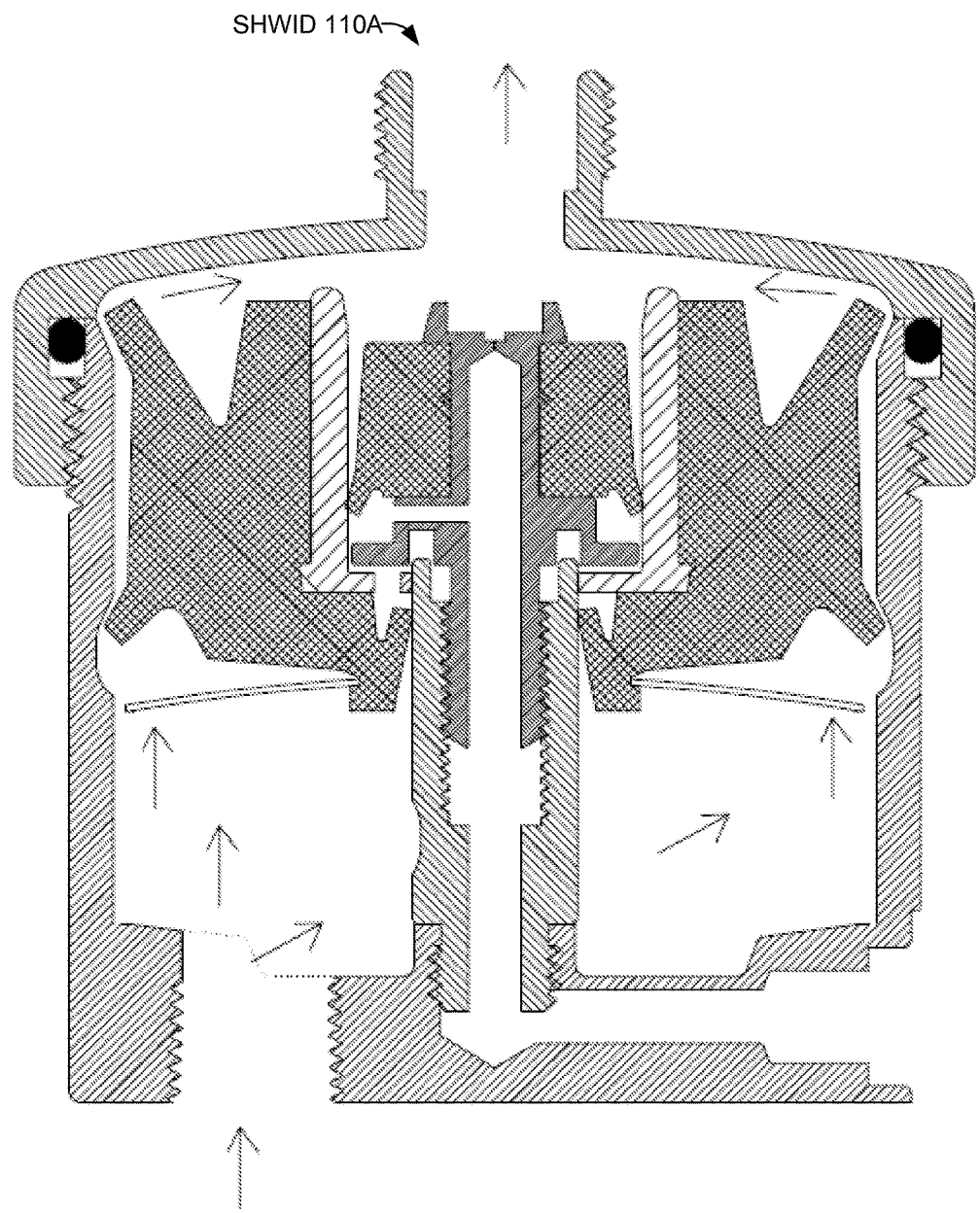
Figure 30B:
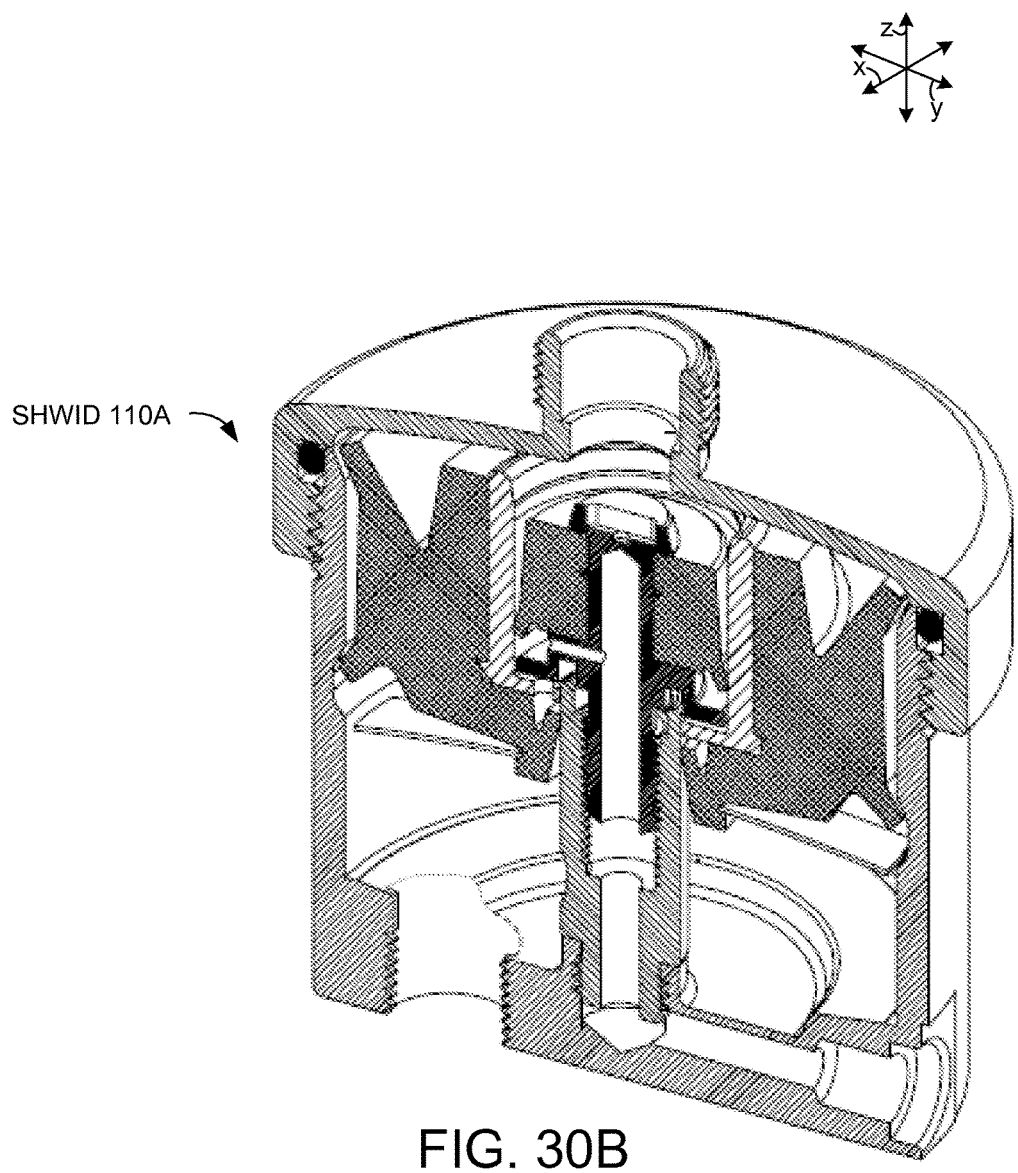

FIGS. 29A and 29B shows the selective hot water isolation device 110A when hot water is turned on at associated fixture 106A (FIG. 22). The lower seal 2823 of the piston 2818 is the same size as the valve body bore defined by cylinder wall 2810. When hot water is turned on, it causes the piston 2818 to move all the way to the top of the valve body bore as seen in FIGS. 30A and 30B. In FIGS. 30A and 30B, hot water flows freely through the selective hot water isolation device 110A.

Figure 31A:
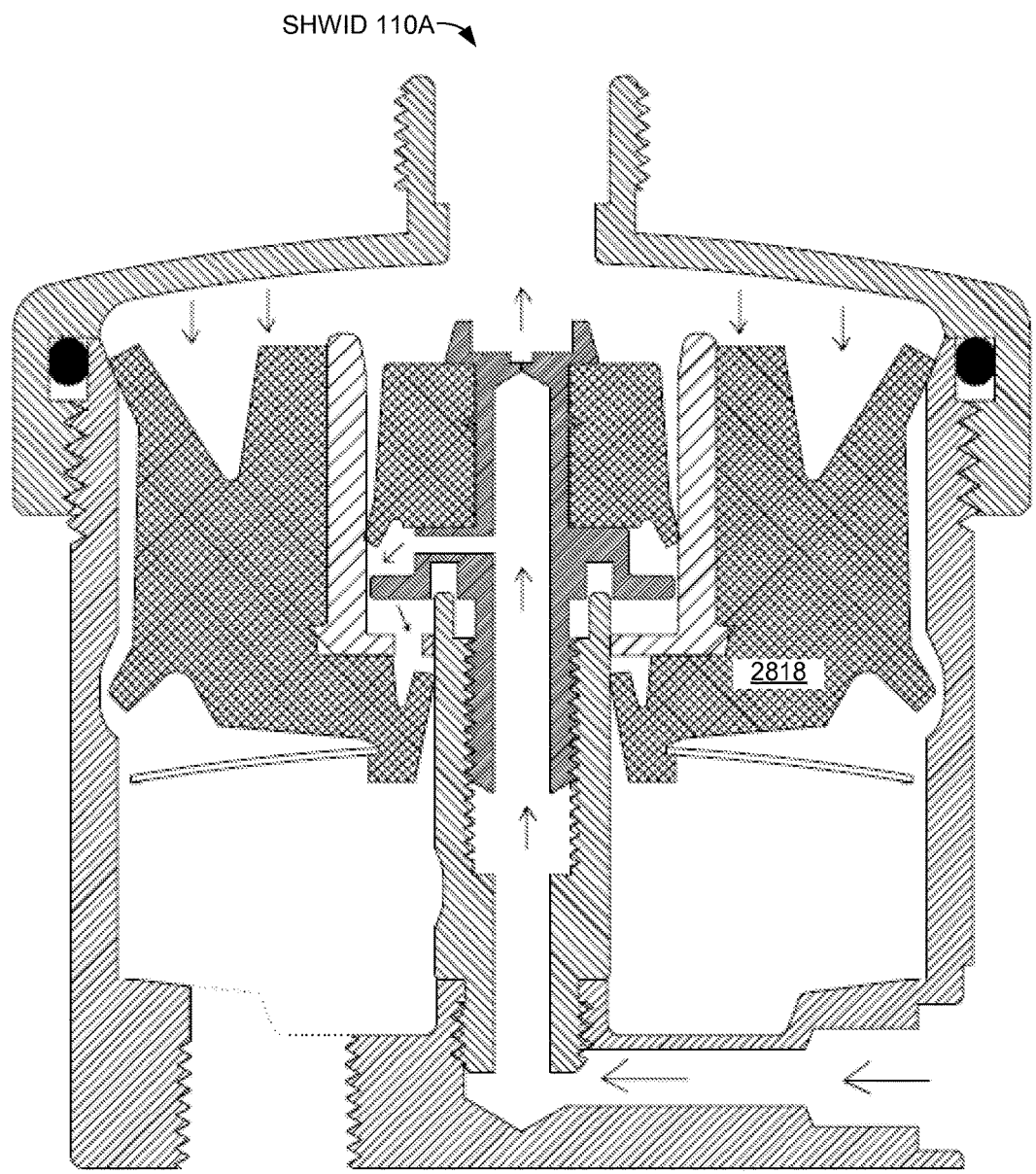
Figure 31B:
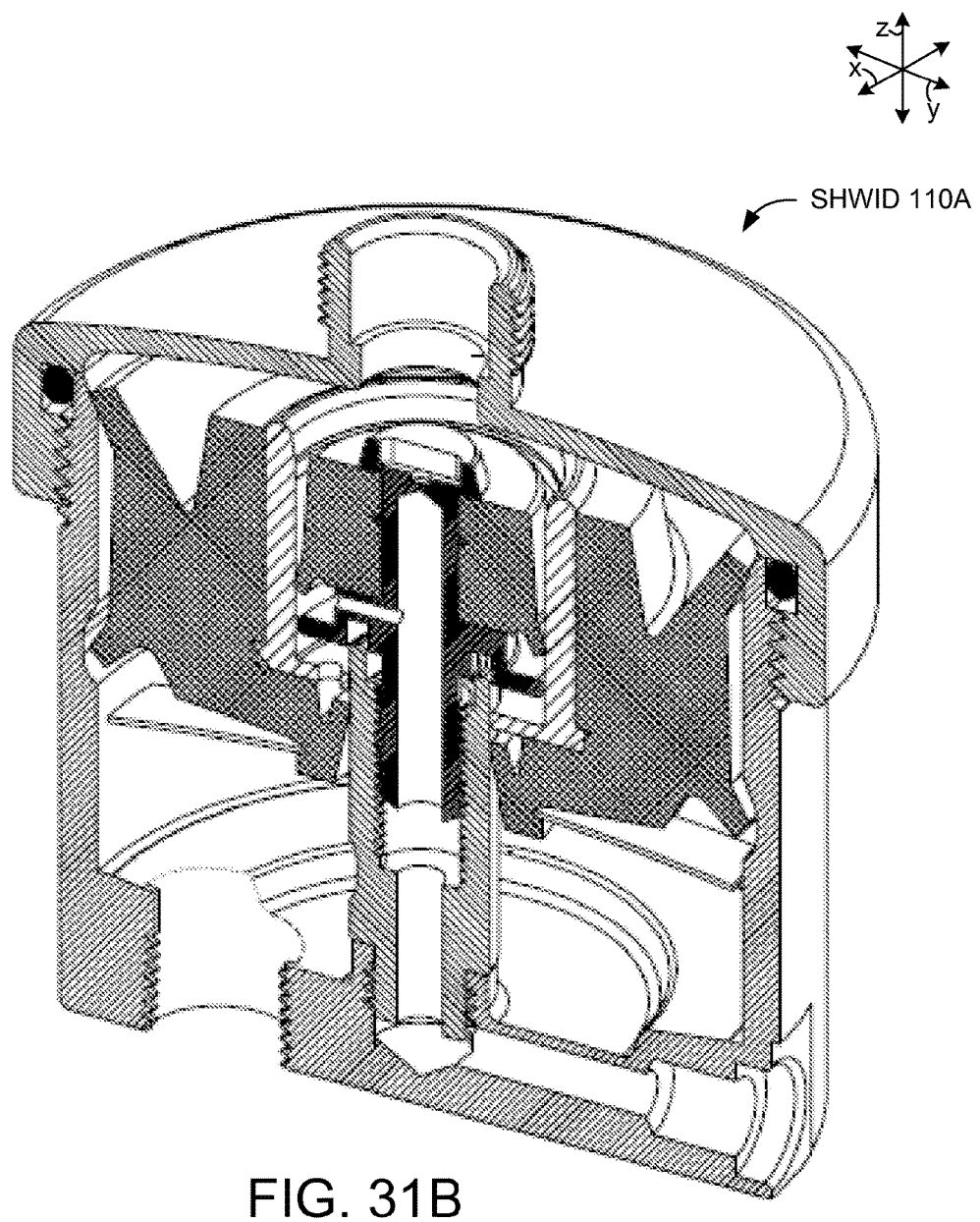

FIGS. 31A and 31B show selective hot water isolation device 110A when the hot water is turned off at fixture 106A (FIG. 22). Cold water at higher pressure pushes the piston 2818 down. (This can utilize the bladder in the recovery unit to create the pressure differential (see FIGS. 23-25).

Figure 32B:
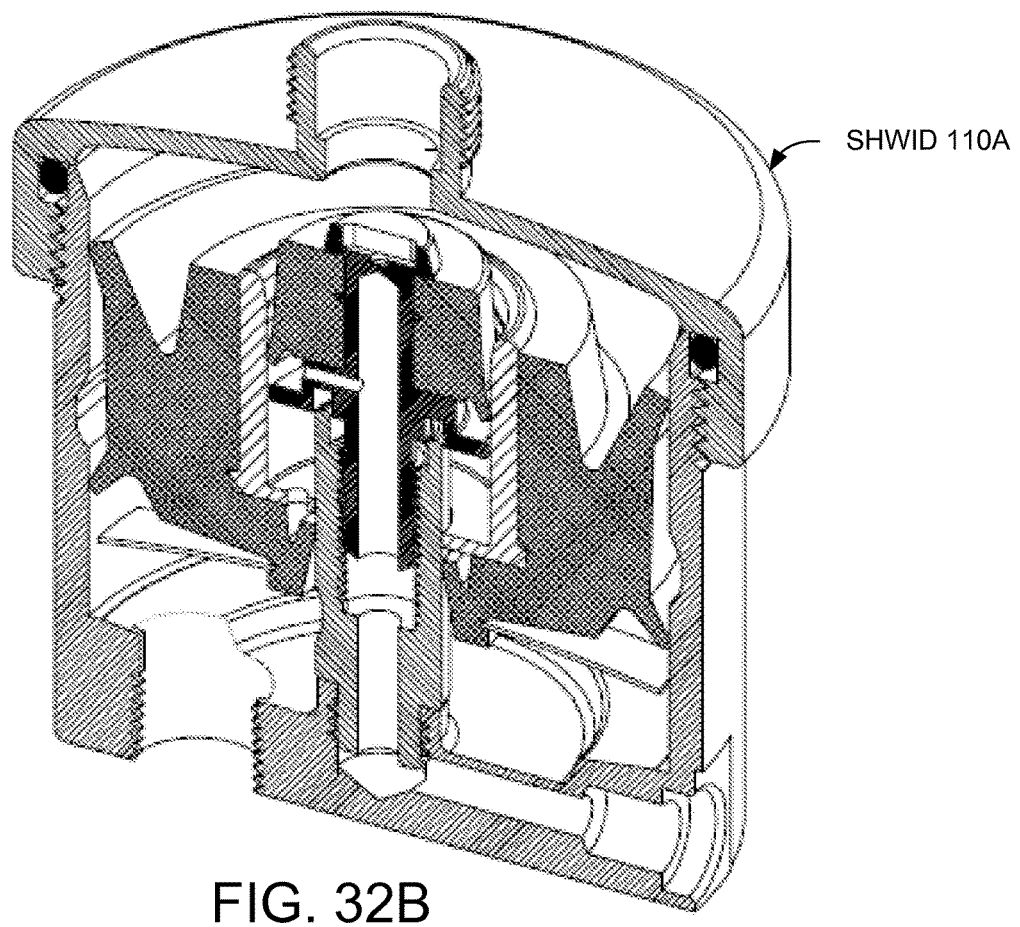

FIGS. 32A and 32B show delay of cross-over in the selective hot water isolation device 110A. The pressure differential continues to slowly move the piston 2818 down as cold water flows through the metering hole 2834.

Figure 33A:
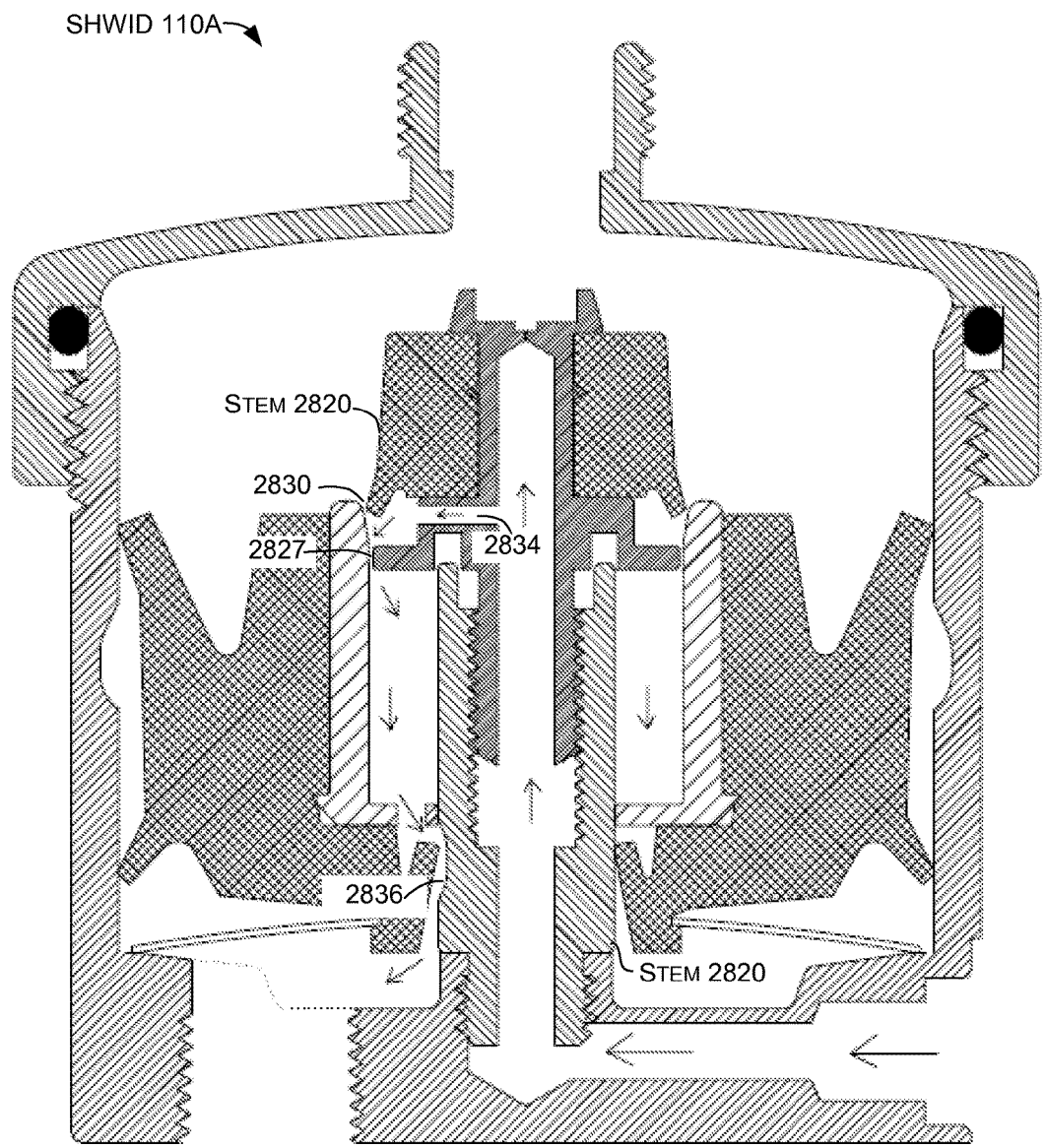
Figure 33B:
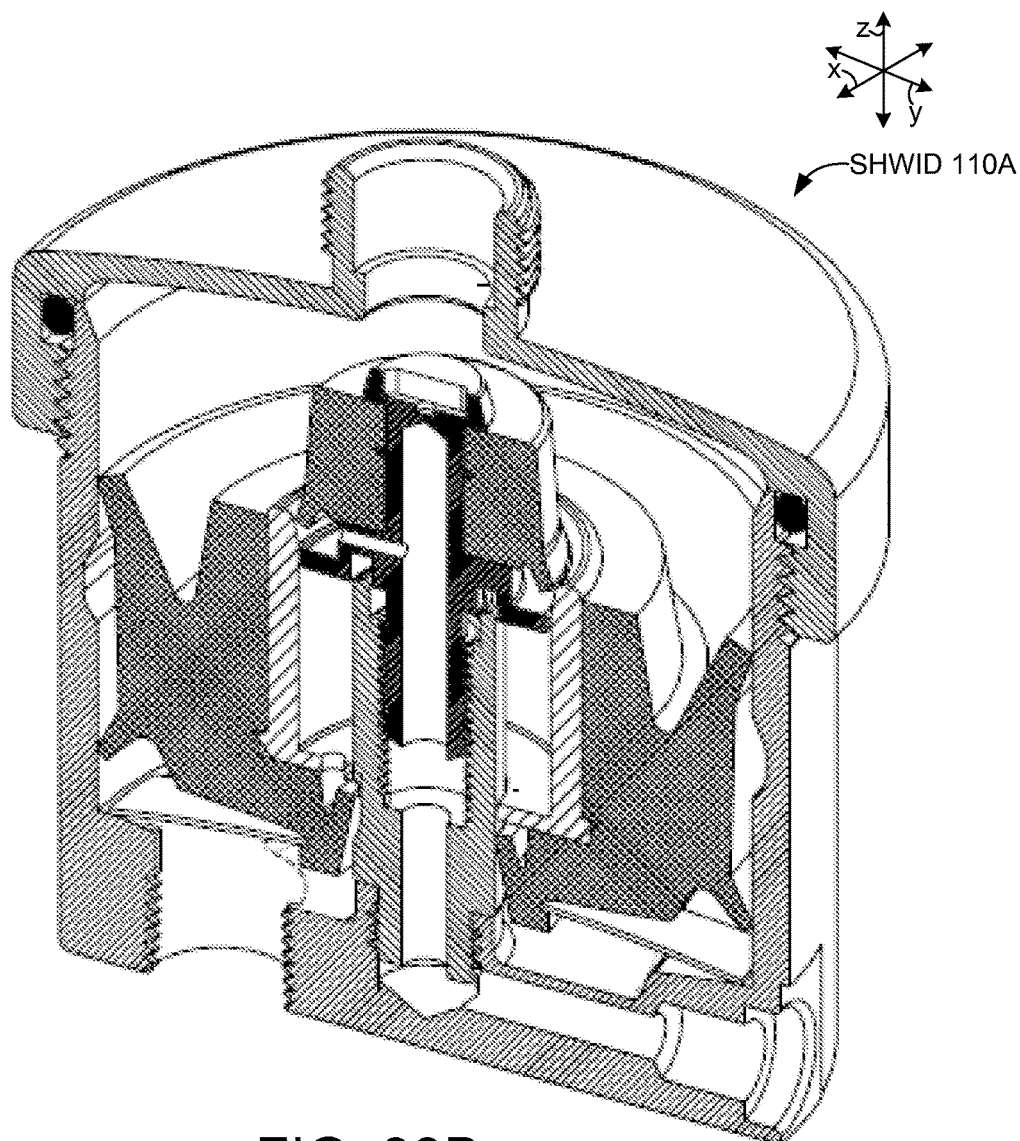

FIGS. 33A and 33B show cold water cross-over in the SHWID 110A. When the stem head seal 2830 reaches the grooves 2836 in the stem 2820, cold water flows through the metering hole 2834 past the stem stabilizer 2827 and then through the grooves 2836 in the stem 2820.

Figure 34A:
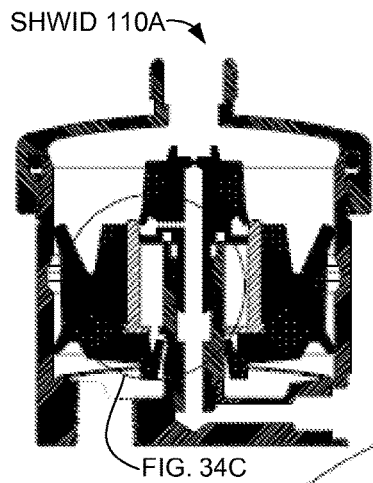
Figure 34C:
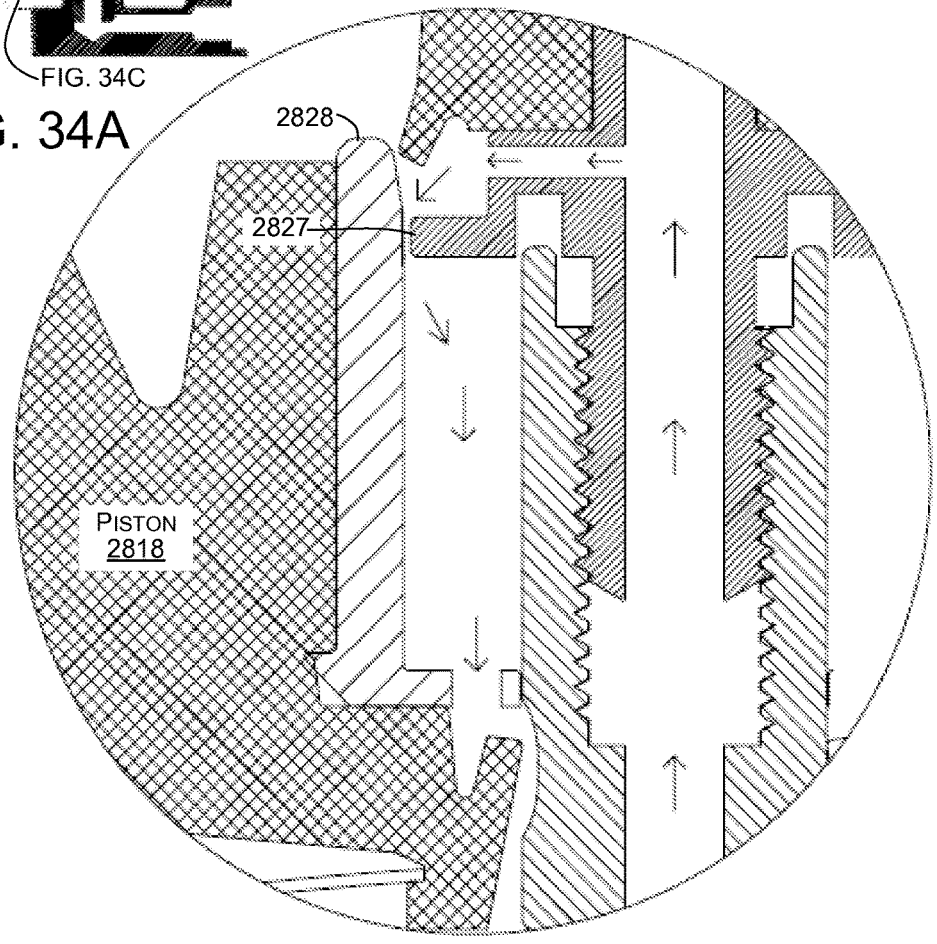
Figure 34B:
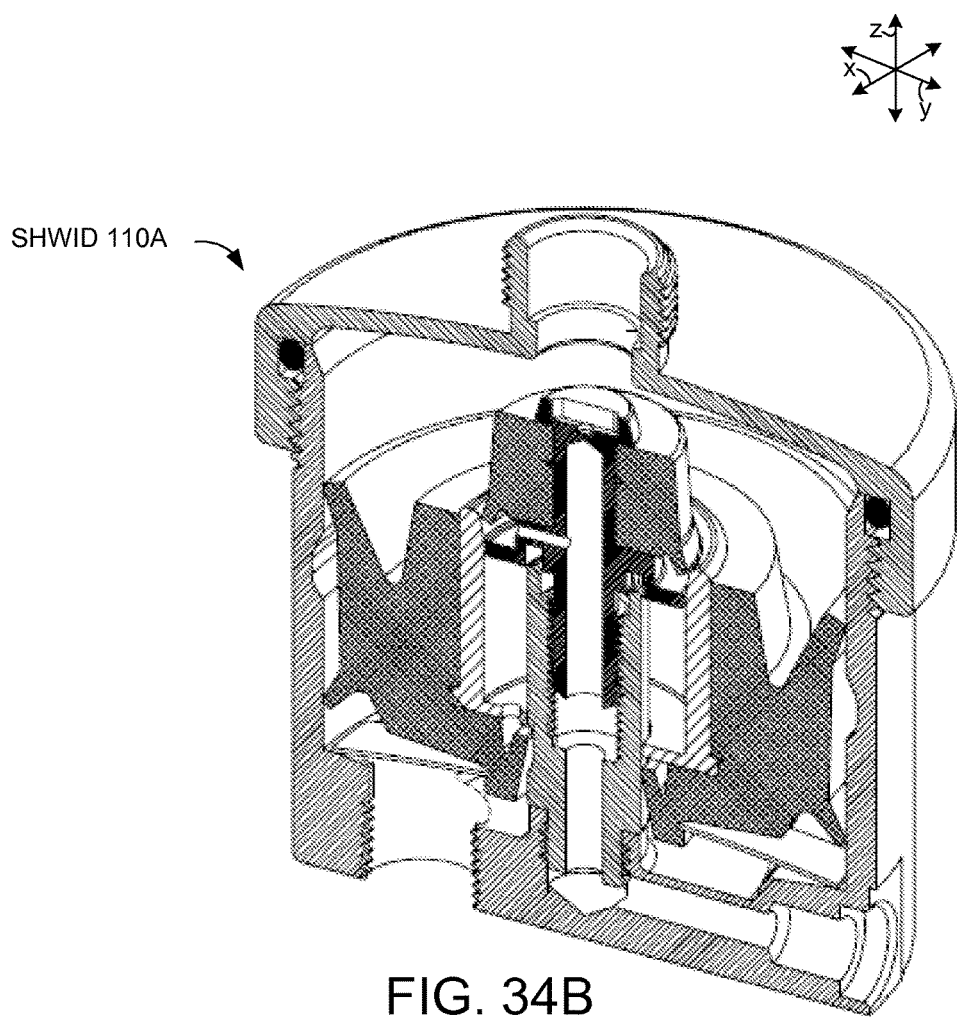

FIGS. 34A-34C show SHWID 110A approaching cross-over shut off. Assume hot water is used elsewhere in the system (100A, FIG. 22). When hot water is used anywhere else in the system, the hot water pressure is reduced. The small gap between the stem stabilizer 2827 and the inner cylinder liner 2828 restricts the cold water cross-over flow and as the pressure below the piston decreases the piston is pushed down into shut-off mode. The slight taper of the inner cylinder liner 2828 at the piston flange when the piston is in this position allows the sensitivity of the shut off to be adjusted.

Figure 35A:
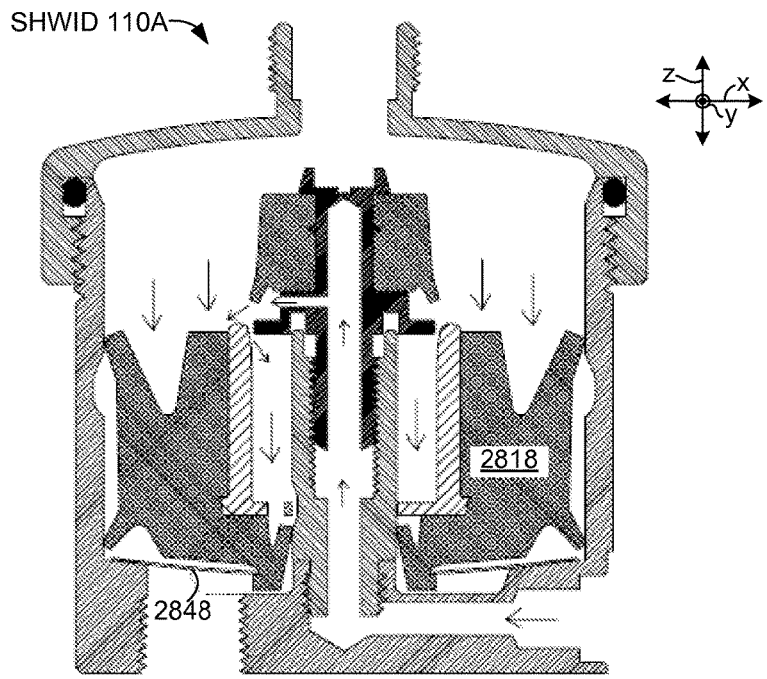
Figure 35B:
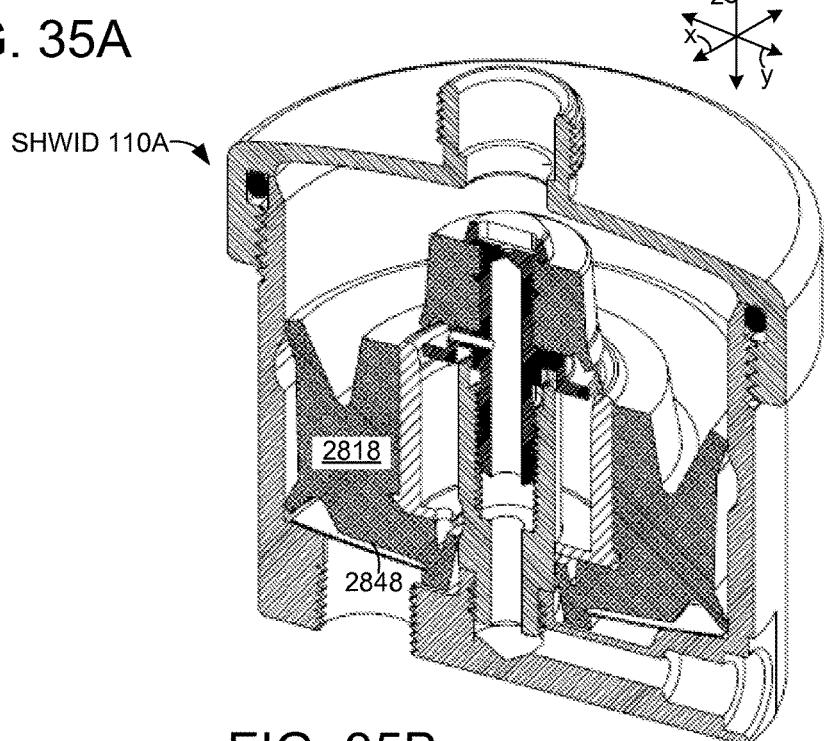

FIGS. 35A and 35B show cold water cross-over shutoff. At this point, the piston 2818 has moved fully downward in the x reference direction and snapped the snap disk spring 2848 closed.

To summarize, an example operation of a system 100A with an automatic hot water recovery apparatus 130A and selective hot water isolation devices 110A is described above. The selective hot water isolation devices do not simply allow cold water cross-over whenever system hot water pressure is lower than system cold water pressure. Individual selective hot water isolation devices can limit cold water cross-over to instances where hot water flowed through a fixture proximate to their location (e.g., they do not allow cold water cross-over when flow occurs at other fixtures). Further, the selective hot water isolation devices can delay the cold water cross-over for a period of time after hot water usage stops at the fixture. Thus, for example, a user that is intermittently using hot water is not inconvenienced by cold water entering the hot water line. Viewed from another perspective, the selective hot water isolation devices can allow cold water cross-over in a period or window after hot water flows through the selective hot water isolation device. The window can start immediately upon cessation of the hot water flow through the selective hot water isolation device or begin after a delay period. Additionally, the selective hot water isolation device can allow for a cross-over shutoff stage that can interrupt the delay and/or cross-over periods if water is drawn elsewhere in the system.

Figure 37:
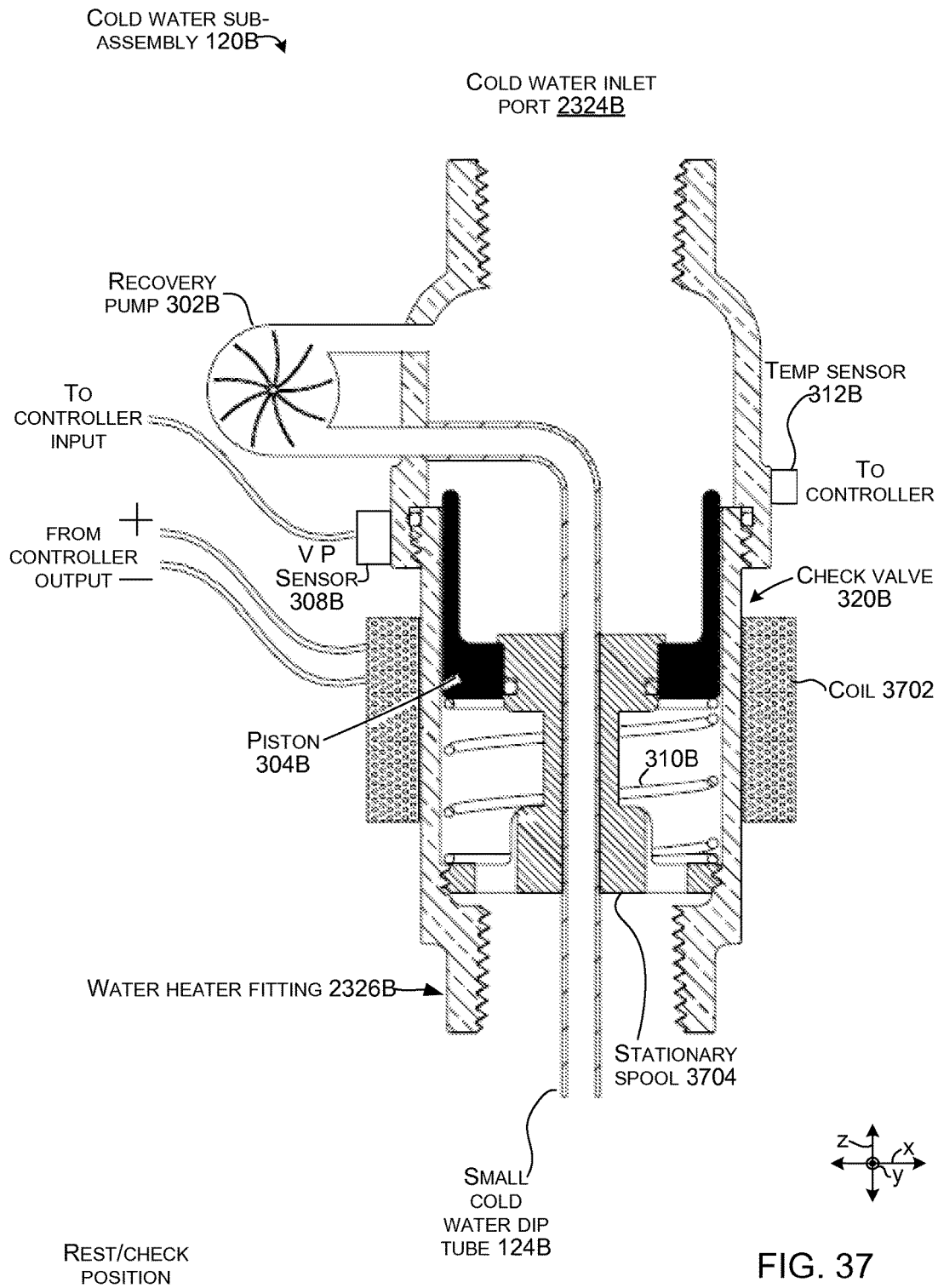
FIGS. 37-60 show details of the example system of FIG. 36 in accordance with some implementations.

FIGS. 36-60 collectively show another energy saving implementation involving system 100B that includes recovery assembly 112B. Some components of system 100B that are similar to those described above are not introduced again here for sake of brevity. FIG. 36 shows system 100B generally. FIG. 37 shows details of cold water sub-assembly 120B. The cold water sub-assembly can be connected to the cold water line 102B (FIG. 36) via cold water inlet port 2324B and connected to the water heater 108B (FIG. 36) via water heater fitting 2326B. In this case, the cold water sub-assembly includes a coil 3702 for operating cooperatively with spring 310B to control the position of piston 304B. The cold water sub-assembly also includes a stationary spool 3704. The coil 3702, piston 304B, spring 310B, and stationary spool 3704 can function as check valve 320B that affects water flow through the cold water sub-assembly 120B. In this case, the check valve 320B can be viewed as functioning as a controllable check valve or restrictor valve that can be controlled by the controller 136B to control, such as to slow or stop water flow through the check valve. The function of the check valve 320B can be controlled by the controller 136B by energizing the coil 3702. Further, the small cold water dip tube 124B bypasses (e.g., is not affected by) the check valve 320B.

Figure 38:
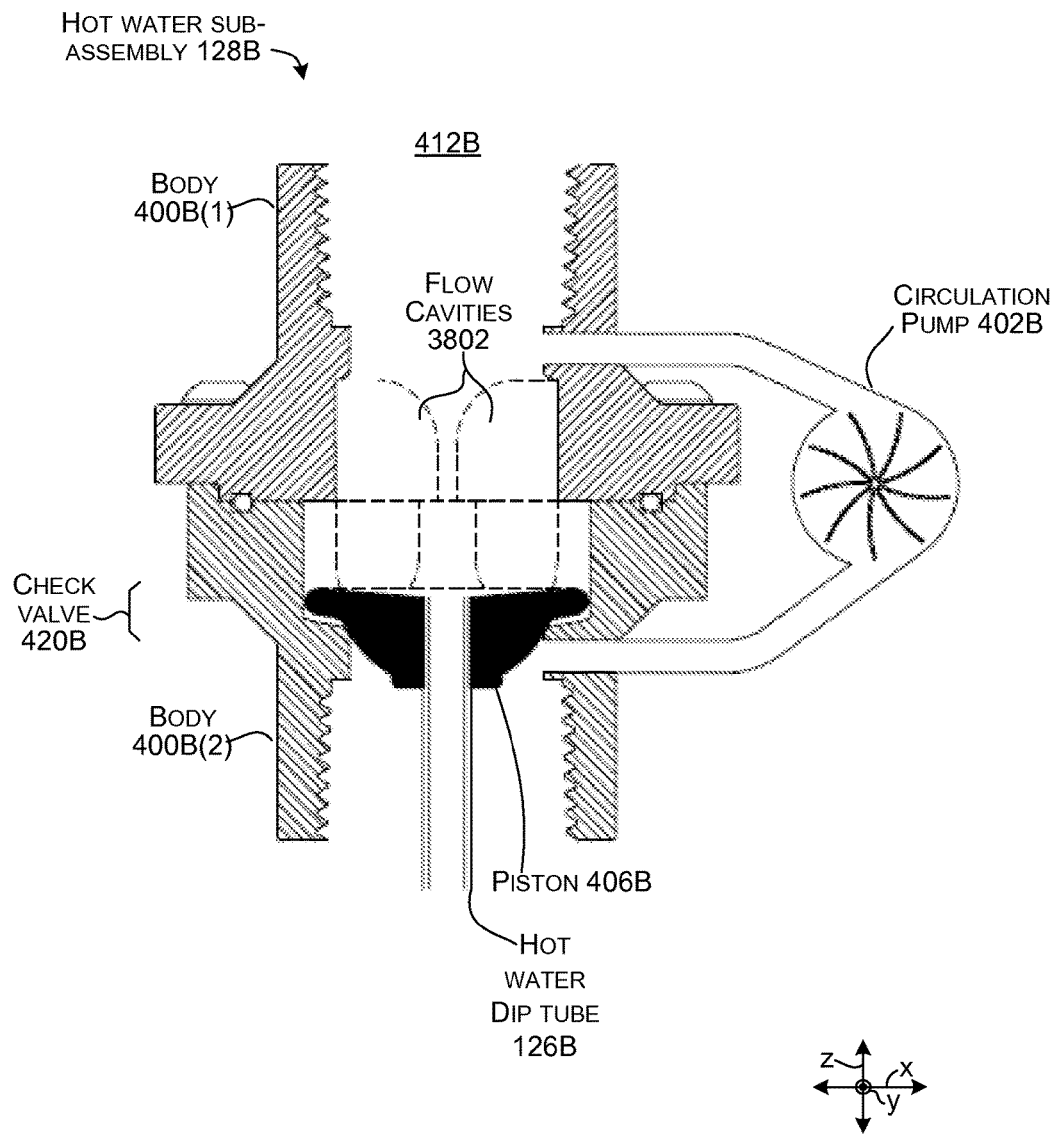
Figure 39:
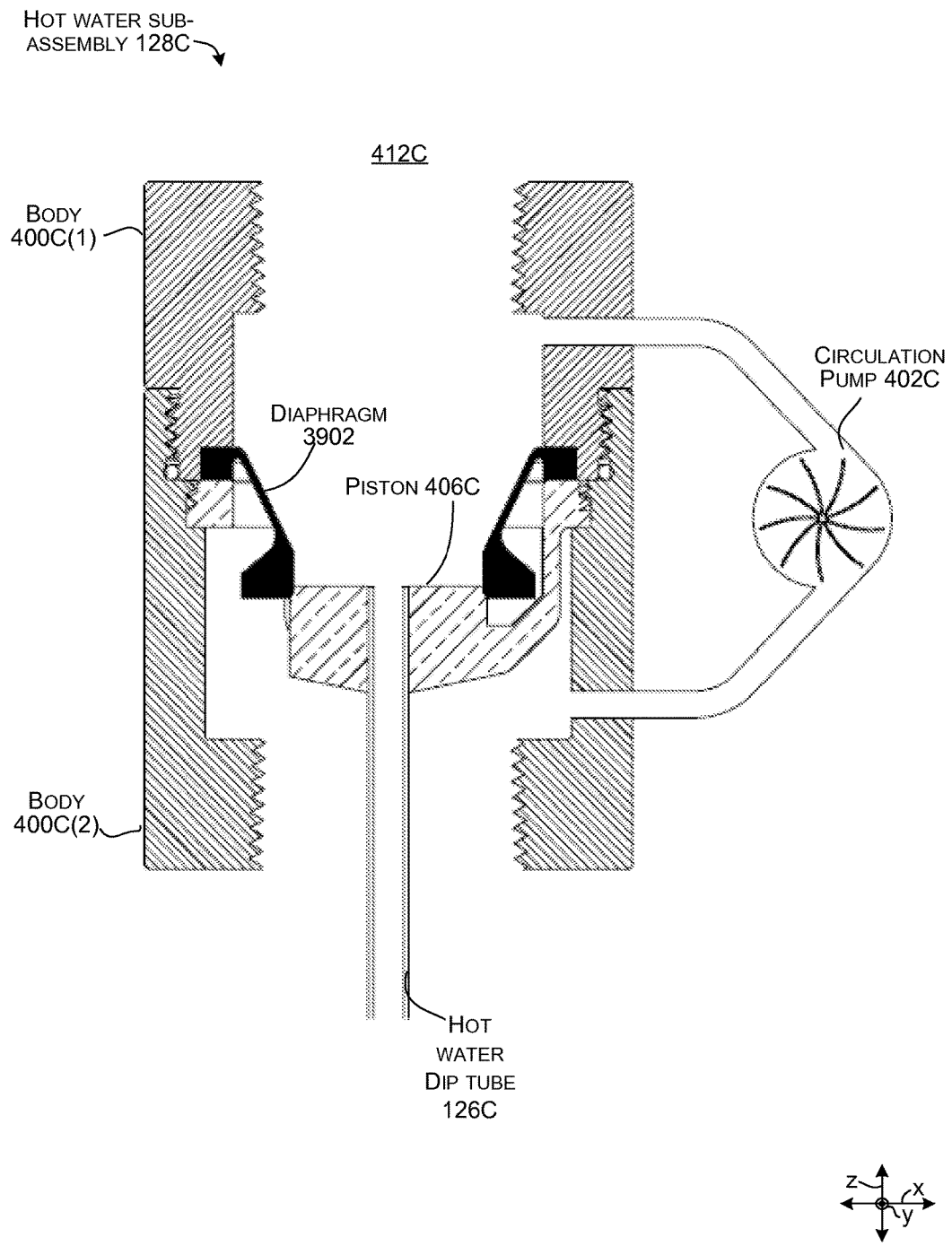

FIG. 38 shows details of hot water sub-assembly 128B. In this case the housing is manifest as upper and lower body portions 400B(1) and 400(B)2. The top body portion defines flow cavities 3802. FIG. 39 shows an alternative hot water sub-assembly 128C. That implementation includes a diaphragm 3902 that interacts with piston 406C.

Figure 40:
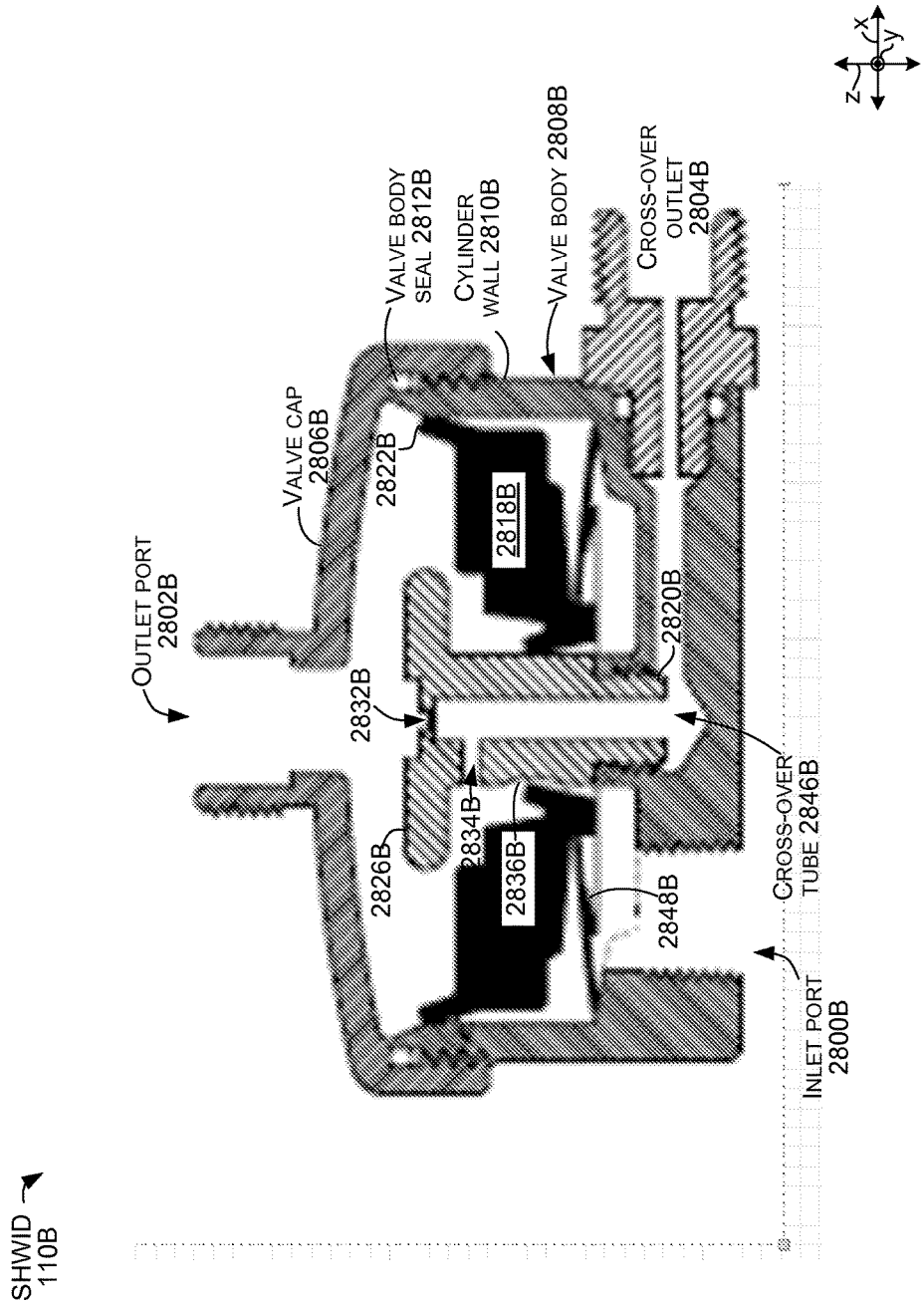

FIG. 40 shows details of this version of the SHWID 110B. This version of the selective hot water isolation device 110B extends from a water heater end (e.g., inlet port) 2800B to a fixture end (e.g., outlet port) 2802B and couples to a cold water cross-over line to the cold water line at cross-over port 2804B. This selective hot water isolation device can include a valve cap 2806B and a valve body 2808B. The valve body includes a cylinder wall 2810B. The valve cap and valve body can be threaded or otherwise be securable to one another, either in a fixed or removable fashion. A valve body seal 2812B is positioned between the valve cap and the valve body. The valve cap 2806B can have an inside diameter that corresponds to an outside diameter of the cylinder wall 2810B such that the valve body seal 2812B can create a seal therebetween. Piston 2818B is positioned in the valve body 2808B. Stem 2820B is nested in the piston 2818B. The piston includes a piston seal 2822B proximate the cylinder wall 2810B and a lower piston seal 2823B proximate the stem 2820B. The stem includes a stem head 2826B and a stem stabilizer 2827B. The dimensions of the piston and stem head can be such that the stem head seal helps create a seal therebetween. The stem 2820B can also include a bleed hole 2832B, a metering hole 2834B, and a stem groove 2836B. The stem also has an inner cavity (cross-over tube) 2846B.

Figure 41:
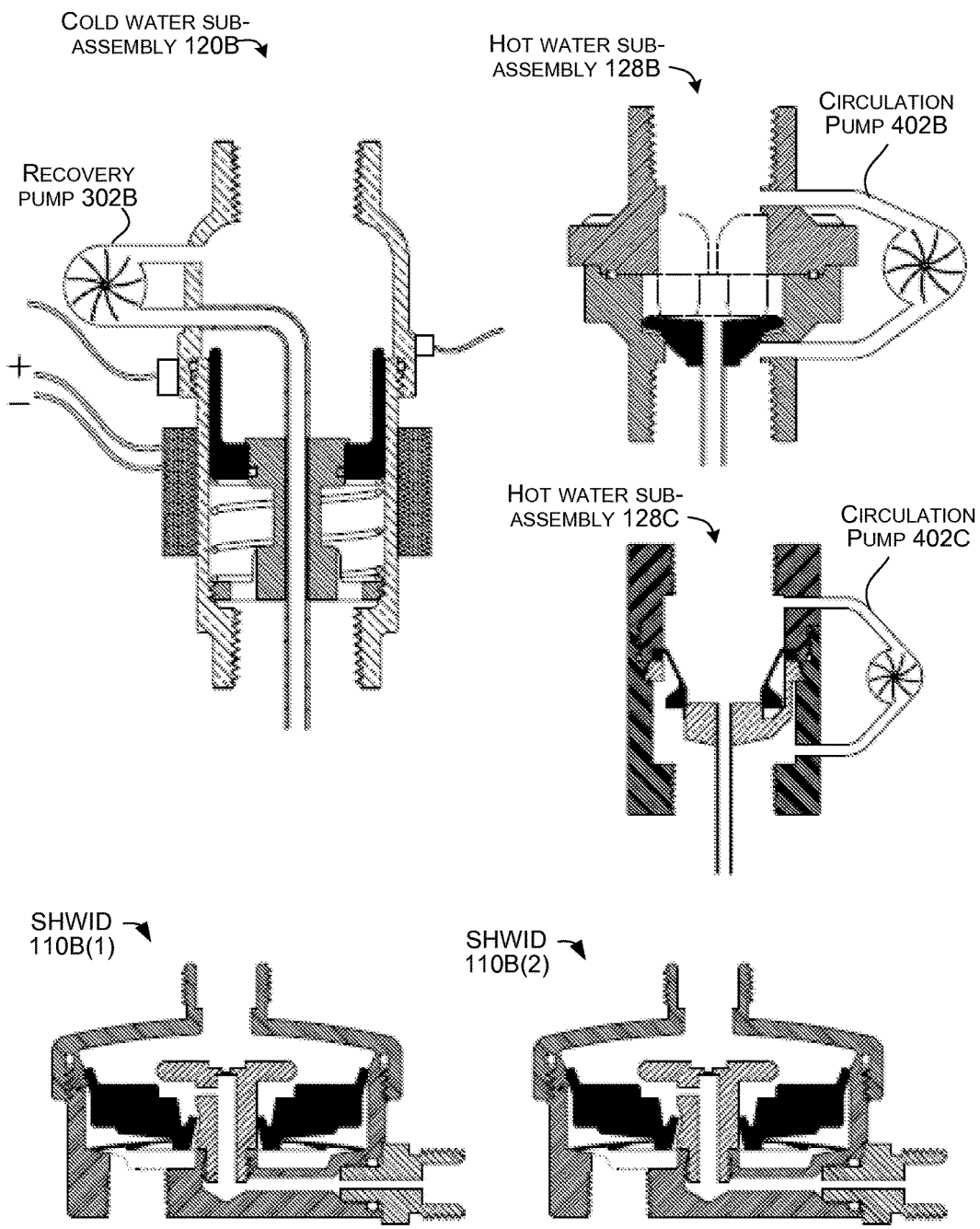
Figure 42:
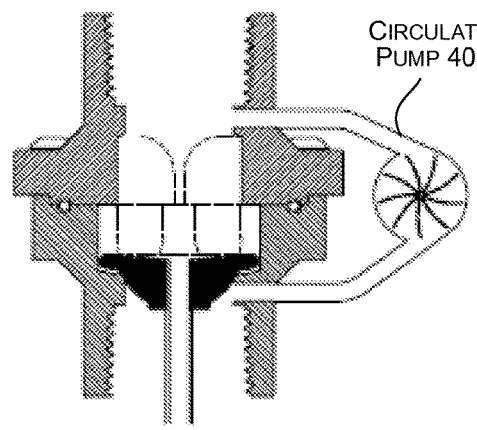
Figure 43:
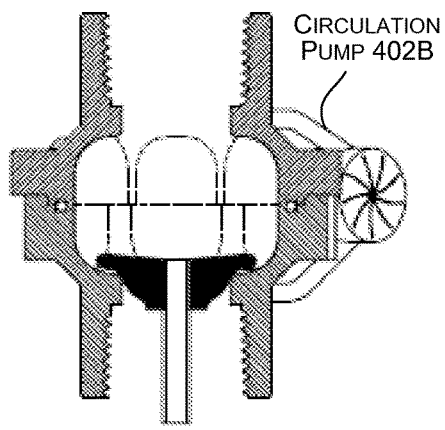
Figure 44:
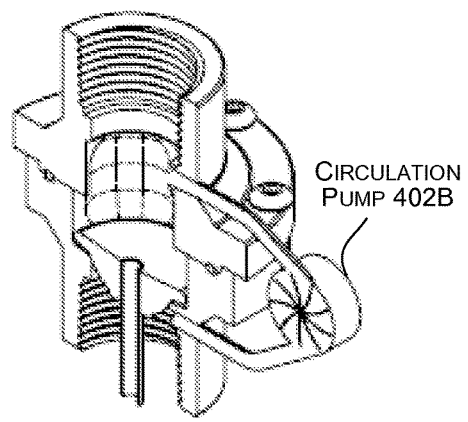
Figure 45:
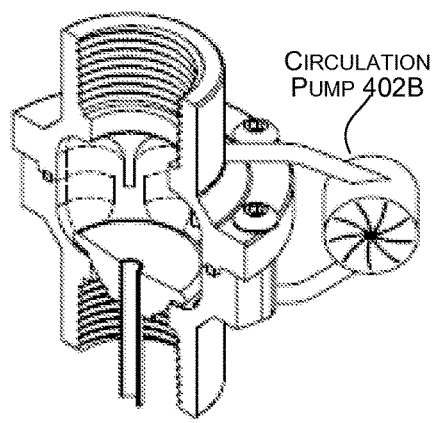
Figure 46:
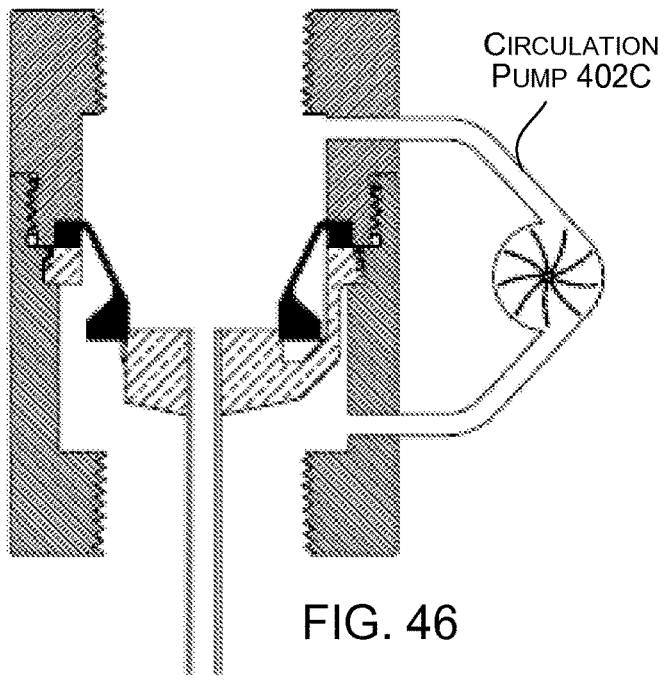
Figure 47:
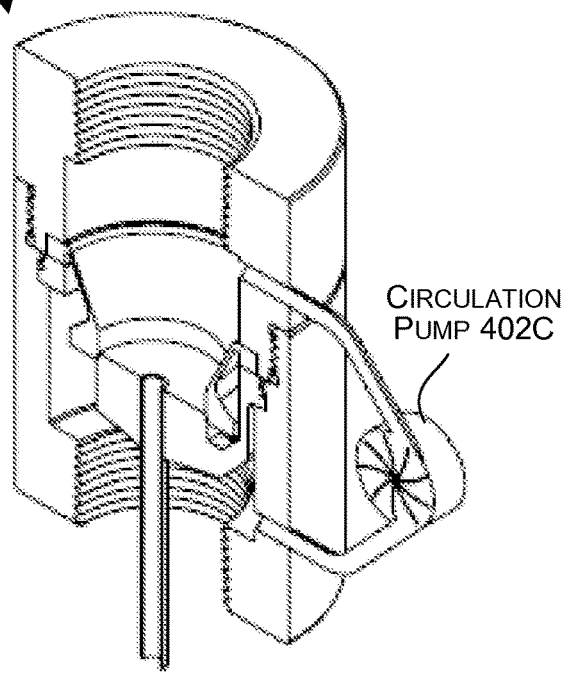

FIG. 41 shows the cold water sub-assembly 120B, the two variations of the hot water sub-assemblies 128B and 128C, and the SHWIDs 110B(1) and 110B(2) (associated with fixtures 106B(1) and 106B(2), respectively) during a rest position where water is not moving. FIGS. 42-45 offer additional views of hot water sub-assembly 128B during the rest position. FIGS. 46-47 offer additional views of hot water sub-assembly 128C during the rest position.

Figure 48:
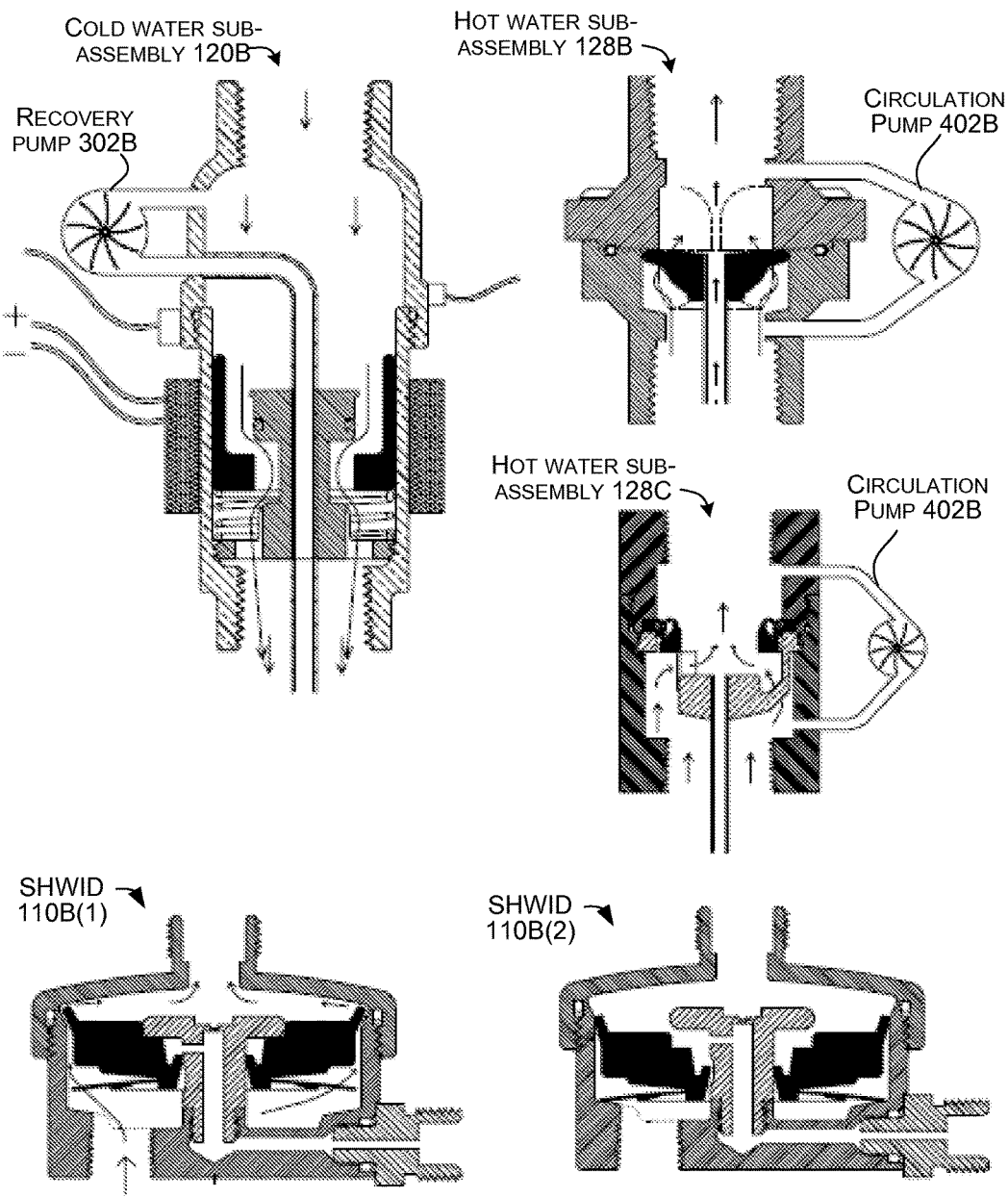
Figure 49:
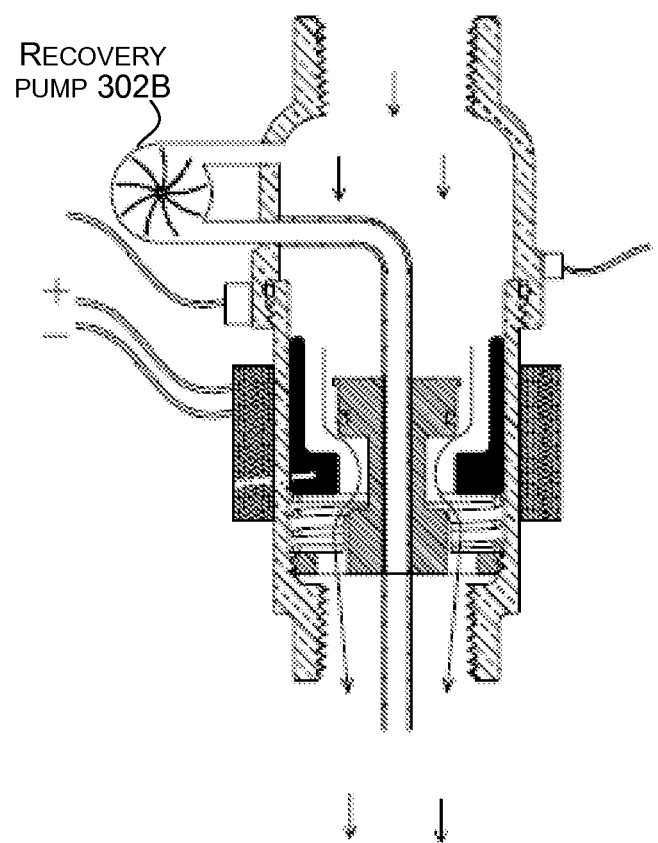
Figures 50, 51:
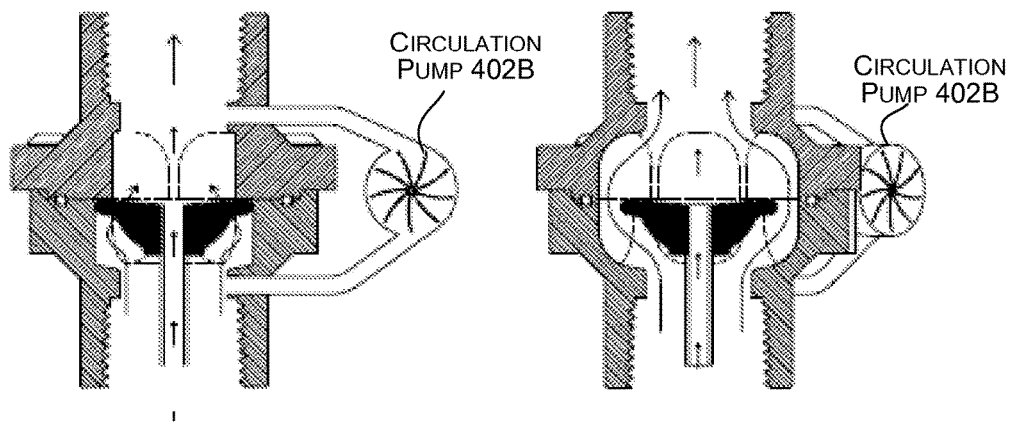
Figures 52, 53:
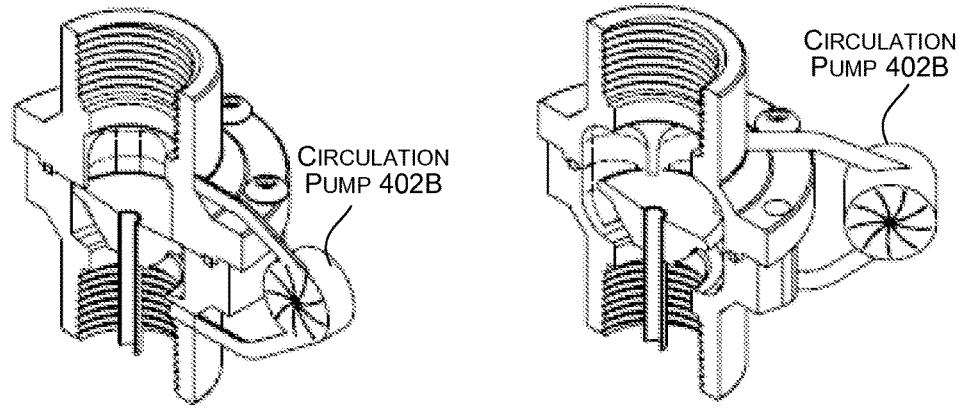

FIG. 48 uses arrows to represent water flow relative to the cold water sub-assembly 120B, the two variations of the hot water sub-assemblies 128B and 128C, and the SHWIDs 110B(1) and 110B(2) during hot water usage at fixture 106B(1) (FIG. 36) associated with SHWID 110B(1). FIG. 49 shows cold water flow from the cold water line (102B, FIG. 36) through the cold water sub-assembly 120B into the water heater (108B, FIG. 36).

Figure 54:
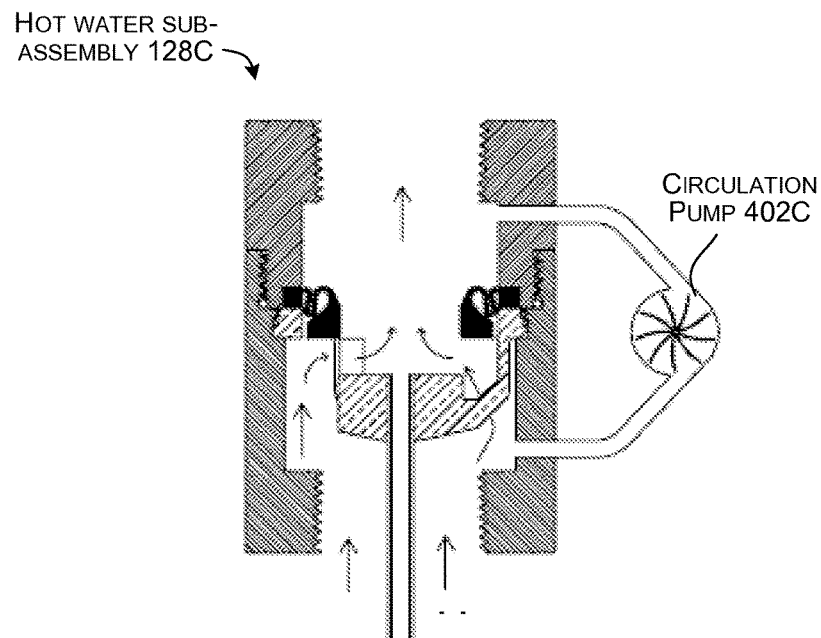
Figure 55:
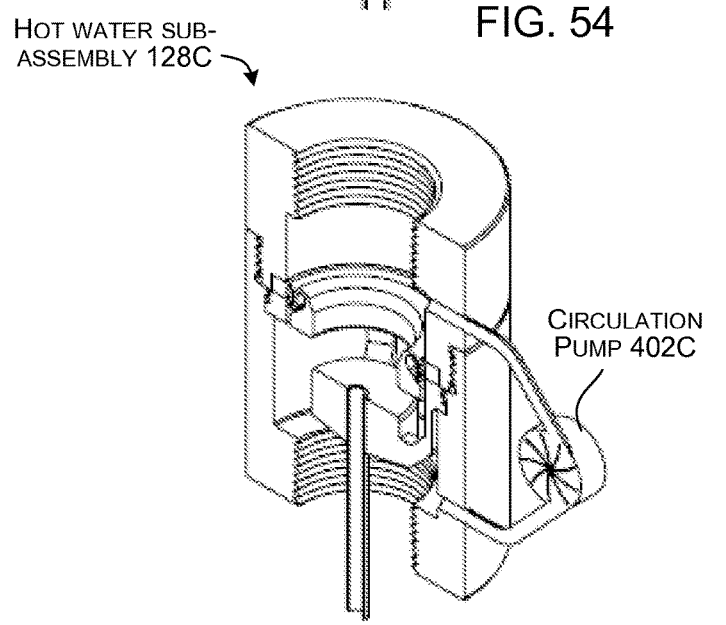
Figure 56:
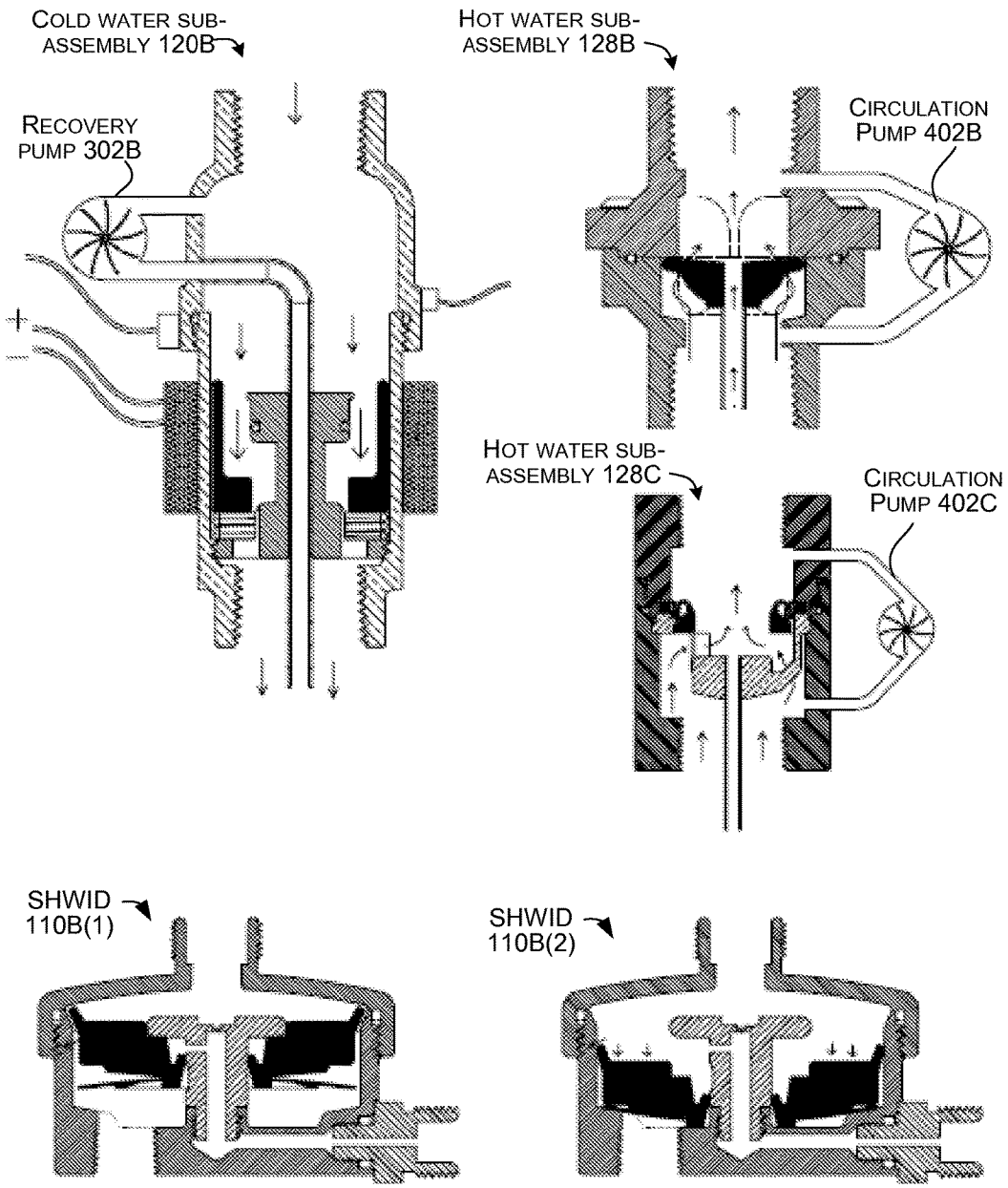

FIGS. 50-53 show hot water flow from the water heater (108B, FIG. 36) through the hot water sub-assembly 128B into the hot water line 104B. Note that a temperature of the hot water can be manipulated by drawing water both from the top of the water heater that tends to be hotter and from the bottom of the water heater via the hot water dip tube (126B, FIG. 36) that tends to be cooler. This mixture of hotter and cooler water can be adjusted based upon temperature readings from temperature sensors (118, FIG. 1) positioned proximate to the fixture 106B to deliver a desired temperature of hot water. FIGS. 54-55 show a similar hot water flow through alternative hot water sub-assembly 128C.

The recovery assembly 112B shown collectively in FIGS. 36-55 can draw cold (e.g., cooler) water from the bottom of the water heater 108B through the small cold water dip tube 124B inside the large cold water dip tube 122B and can eliminate the use of the volume storage capacity of the recovery unit and instead replace it with recovery pump 302B. As mentioned above, some of the present implementations can employ hot water dip tube 126B coupled with check valve 420B to allow hotter water to be drawn from the top (e.g., upper region 138B) of the water heater and mixed with cooler water from the bottom (e.g., lower region 140B) of the water heater 108B. The hot water dip tube 126B can also allow the hot water that is recovered from the hot water line 104B to be deposited near the bottom of the water heater 108B. The hot water sub-assembly 128B or 128C (e.g., the circulation pump) in combination with the hot water dip tube 126B can also provide a conduit for over-heated water at the top of the water heater to be pumped to the bottom as a way to mix the water and/or as a way to cause the lower thermostat 134B(2) to more accurately sense the heat energy in the water heater 108B.

The SHWIDs 110B can be placed at any point of use (e.g., fixture 106B) and can include a delayed recovery feature. Check valve 320B can be controlled by controller 136B as a momentary flow restrictor valve at the inlet port 2800B to create a pressure differential spike to close the SHWID to cold water cross-over during hot water use. In another configuration, electronic SHWIDs can be employed that can be controlled by the controller 136 (see for instance, system 100 of FIG. 1). In new construction or remodels, electronic SHWIDs can be wired to the controller 136B. In retrofit scenarios, mechanical SHWIDs may be more practical. Both types are contemplated and can be selected based upon a given installation scenario.

Controller 136B is capable of, but not limited to receiving sensory inputs, such as temperature and flow, and automatically generating controlling outputs, such as valve and pump control signals. Examples of such sensory inputs are listed below along with example output signals that can be generated at predetermined timed sequences and/or intervals in some implementations:

1. Temperature input from the water heater inlet port (e.g., cold water inlet port 2324).
2. Temperature input from the water heater outlet port (e.g., temperature sensors 404(1) and/or 404(2)).
3. Flow sensing from a flow meter or a valve position sensor 410.
4. Output current to drive recovery pump 302B.
5. Output current to a coil that actuates a flow restrictor valve (e.g., check valve 320B).
6. Output current to a hot water circulation pump 402B.

In some implementations, the controller 136B can make the system interactive by responding to simple codes sent by the user. For example, the user may signal short on-off draws within a few seconds period to signal the controller 136B to delay the recovery function for a given space of time such as during meal preparation. Alternatively or additionally, the controller 136B can be manifest as a smart controller that can learn about the user's or users' behavior. For instance, the smart controller may learn that on weekdays the users intermittently use water from 6:00 A.M. to 7:00 A.M. (as they get ready to leave for work and school) and then don't use water until afternoon. In such a case the smart controller may not implement hot water savings techniques between 6 and 7 and then start them immediately at 7 without waiting through a delay period.

In other cases, the controller 136B may over-ride traditional functioning/control of the water heater elements 132B. Traditionally, lower thermostat 134B(2) in the water heater 108B controls the lower heater element 132B(2). Thus, if the temperature sensed by the lower thermostat 134B(2) drops below a predefined value, such as 120 degrees, the thermostat turns on the lower heating element. The smart controller can be connected to this circuit by a relay so that it can control the lower element in a more efficient manner. Assume for purposes of explanation that the user draws two gallons of hot water from the system and that traditionally this would cause the lower thermostat to turn on the lower heating element. In this case, the smart controller may delay turning on the lower heating element by opening the relay switch. The controller 136B may then attempt to recover some of the hot water back into the water heater 108B from the hot water line 104B. After the controller completes the recovery it can close the relay switch to allow the lower thermostat to control the lower heating element in a traditional fashion. However, the recovery may have raised the temperature of the water proximate to the lower thermostat above the threshold temperature and thus the lower thermostat does not turn on the lower heating element. This can produce additional energy savings. Viewed from one perspective, the smart controller can manage the system 100B based upon total heat energy in the system rather than heat energy sensed at a specific location in the system (e.g., at the lower thermostat) at a specific point in time. Toward this end, the controller can operate the system in a manner that can consider both the heat energy in the water heater 108B and the recoverable heat energy in the hot water line 104B and can determine whether to activate the lower heating element 132B(2) based upon this total heat energy figure rather than simply the temperature at the lower thermostat 134B(2).

Thus, the controller 136B can leverage many inputs. For instance, the controller could leverage temperature sensors located at intervals along the hot water lines to determine the temperature of water along the hot water lines and/or within the hot water heater, such as arranged from top to bottom. The controller could also leverage information about the volume of the water heater 108B and/or the volume of the hot water lines running to each fixture 106B. For instance, at installation, a technician could enter information to the controller that the volume of the hot water line between the water heater 108B and fixture 106B(2) is 2 gallons, for example, and the volume between the water heater and fixture 106B(1) is one gallon, for example and that the volume of the water heater is 50 gallons, for example. The controller could use this information along with temperature information from the hot water line 104B and volume and temperature information from different location in the water heater to determine the total heat energy in the system and the recoverable heat energy from the hot water line after hot water flow at an individual fixture. The controller could use this information (alternatively or in addition to) information from the lower thermostat 134B(2) to determine whether to activate the lower heating element 132B(2). This is but one example configuration; the point of interest is that the controller can utilize many system inputs to generate system outputs to control the water heater in a manner that conserves energy when compared to traditional configurations. Stated another way, the controller 136B can function to expel relatively cool water from the hot water heater 108B back into the cold water line 102B and replace the cooler water with relatively hotter water recovered from the hot water line 104B. The controller can further do this in a manner that decreases energy usage by the hot water heater, such as by delivering the recovered hot water proximate to the lower thermostat 134B(2) so that the lower thermostat does not activate the lower heating element 132B(2), for example.

In a specific example in some implementations, when the controller 136B senses the end of a hot water draw, and in some implementations after a timed delay, it can send current to start the recovery pump 302B. The recovery pump can draw cold water through the small cold water dip tube 124B, from the bottom of the water heater 108B, bypassing the check valve 320B. The recovery pump can pressurize the cold water line 102B slightly above the pressure of the hot water line 104B and return the trapped hot water to the water heater 108B. Recovery flow can be ended as the controller 136B senses the temperatures of the water heater inlet and outlet ports are equalizing and stops the recovery pump. This can ensure that the energy returned to the water heater matches the length of pipe from which the last hot water was drawn (e.g., recaptures as much heat energy as possible into the water heater).

In some implementations, such as those employing a dual element electric water heater illustrated in FIG. 36, during the hot water recovery mode, the returning hot water flows past the check valve 420B at the outlet port 412B through the hot water dip tube 126B to below the level of the lower thermostat 134B(2). This enables the lower thermostat to sense the heat energy that has been returned, thus limiting the duration of the heating element 132B(2) "on" time. Because most hot water draws are of small volume, over time, the recovered hot water accumulates in the lower region 140 of the water heater 108B. As a result, heat is more evenly distributed throughout the tank 109B and the thermal storage capacity of the water heater is significantly increased.

If during recovery mode, the hot water is merely returned to the top of the water heater 108B, it may be beneficial to force the hot water downward, against the natural thermal convection flow to have an effect on the lower thermostat 134B(2) and lower heating element 132B(2). This can be accomplished by the controller 136B activating the circulation pump 402B. Lacking such, the temperature at the top of the water heater would increase and result in less energy savings.

It may be desirable for the temperature inside the water heater 108B at the top to be hot enough to kill bacteria, such as 130 degrees Fahrenheit, for example. However, for child safety (e.g. potential burns) only a 120 degree water supply is ordinarily utilized for hot water use. When in circulation mode and/or hot water recovery mode, hot water is returned to the bottom of the water heater, it leaves the end of the hot water dip tube 126, and flows upward because of thermal convection until it reaches its thermal density level above the end of the hot water dip tube. When the recovery flow stops, the end of the hot water dip tube is exposed to cooler water. When hot water is turned on, a measure of this cooler water can be drawn up through the tube and mixed with the hot water from the top of the tank as it passes through the check valve 420B at the outlet port 412B. This allows the output temperature to be 10 degrees (or other value) less than the top of the water heater. This feature can provide energy savings in addition to the savings from the recovered hot water trapped in the hot water lines.

In summary, the hot water dip tube 126B can deliver hot water to the bottom of the water heater 108B to directly moderate the lower water heater element 132B(2) and to increase thermal storage capacity. It also can use unheated water from the bottom of the water heater to directly control the output temperature delivered to the hot water line 104B during hot water use.

Most of the water that passes through a water heater, such as water heater 108B tends to be heated by the lower heating element 132B(2) or a gas burner. This lower heating element, and the lower thermostat 134B(2) that controls it, is located at or near the bottom of the water heater 108B. During periods of inactivity, heat tends to accumulate at the top of the water heater, increasing the temperature substantially above the lower thermostat setting. The only feedback from the top of the water heater to the lower thermostat is a weak conduction pathway which must overcome the forced convection thermal driving head created by the heater element.

The circulation pump 402B can overcome this force by sending the overheated water from the top through the hot water dip tube 126B to the bottom of the tank 109B. The circulation pump can be turned on or off by the controller 136B based on input from the temperature sensor at the water heater outlet port 412B, the lower thermostat 134B(2), and the flow sensors 119B.

Figure 57:
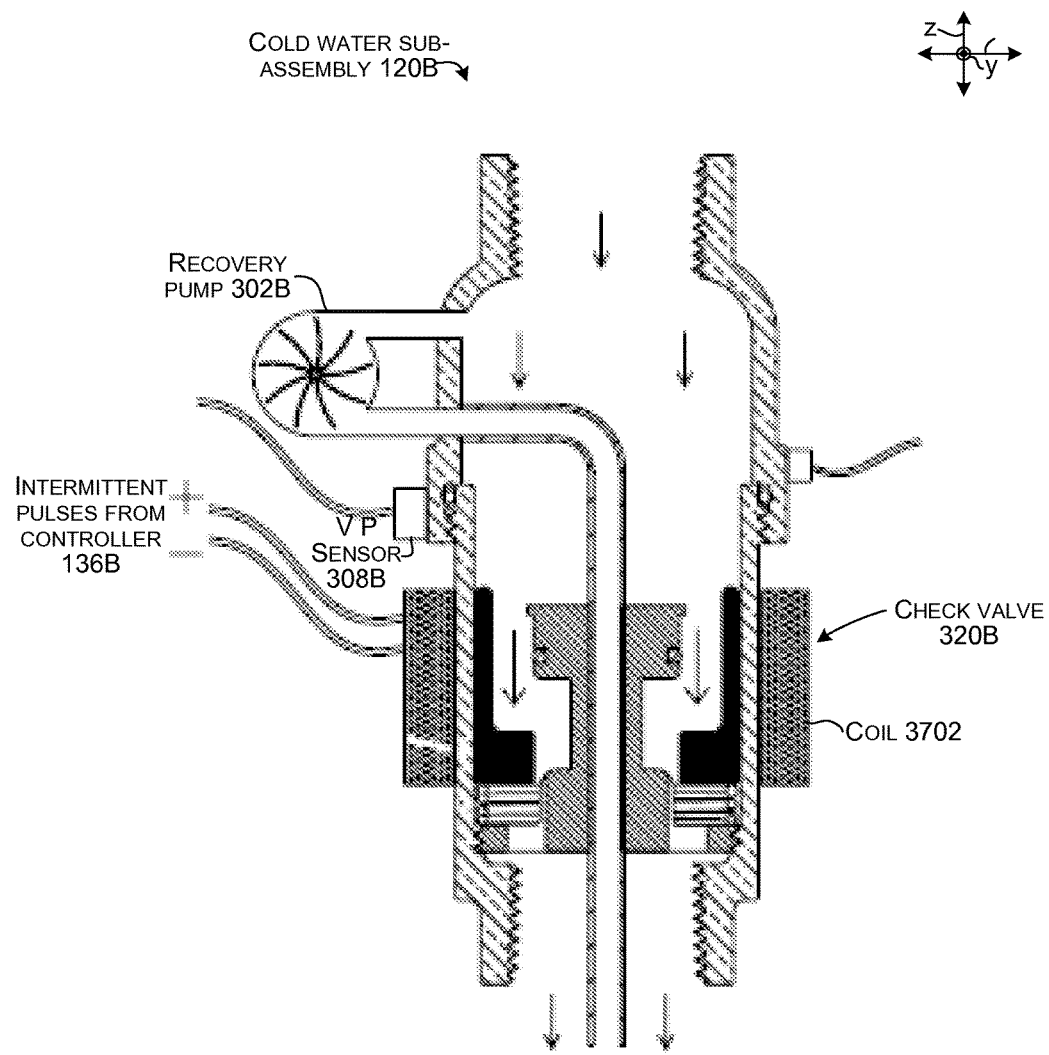

When someone uses hot water at a sink or other fixture 106B(1) while another person is showering at another fixture 106B(2), a basic cross-over valve may remain open when the sink faucet is turned off. Within one minute cold water from the cross-over under the sink can reach the shower. In some implementations, the SHWID 110B(1) can be closed by creating a momentary pressure drop in the hot water line 104B (not discernible to the user) by using check valve 320B mounted at the water heater inlet port. As shown in FIG. 57, while the flow sensor 119B or valve position sensor 308B indicates that hot water is being used, the controller 136B can send short pulses of current, each a fraction of a second in duration, at one minute intervals, to the coil 3702 surrounding the check valve 320B (recall that check valve 320B is a controllable type check valve). The coil creates a magnetic field that pulls the piston downward and momentarily restricts the flow to close all of the isolation valves in the system to cross-over flow. This momentary pressure drop can cause the implementation of SHWID 110B(1) shown in FIG. 36 to stop cold water cross-over. If a household uses 50 gallons of hot water per day at the average rate of 1.5 gallons per minute, the check valve 320B may create about 33 short pressure reduction spikes per day, for example.

The functioning of system 100B is now described through an operational cycle. Beginning at a resting or static state, the check valves, such as 320B and/or 420B, that prevent reverse flow through the water heater 108B, except through the small cold water dip tube 124B and the hot water dip tube 126B, are closed. The recovery pump 302B and the circulation pump 402B are off. The cross-over path through the SHWID, for instance SHWID 110B(1), that was last used is open, all others are closed.

Next, hot water is turned on at a fixture, for example 106B(2) and both check valves 320B and/or 420B open to let water flow through the water heater 108B. Cold water flows into the bottom of the water heater through the large cold water dip tube 122B. Hot water is drawn from the top of the water heater through the outlet port mixed with a small amount of cooler water from the bottom of the water heater. Cold water can flow through the SHWID 110B(1) that was used during the last hot water draw. Hot water flows through the SHWID 110B(2) at the fixture being used forces the piston 2818 to the top, preventing cold water cross-over at that point of use. The controller 136 senses from the valve position sensor or a flow meter that hot water is being used and stops both recovery pump 302B and circulation pump 402B if they are running.

Within seconds after sensing hot water flow, the control module 136B sends a short pulse of current to the coil 3702 of the check valve 320B of the cold water sub-assembly 120B, forcing the piston 304B to move downward and restrict the flow through the hot water line 104B creating a pressure differential great enough to close all SHWID 110B to cross-over flow. Additional pulses can be sent thereafter during hot water flow.

Figure 58:
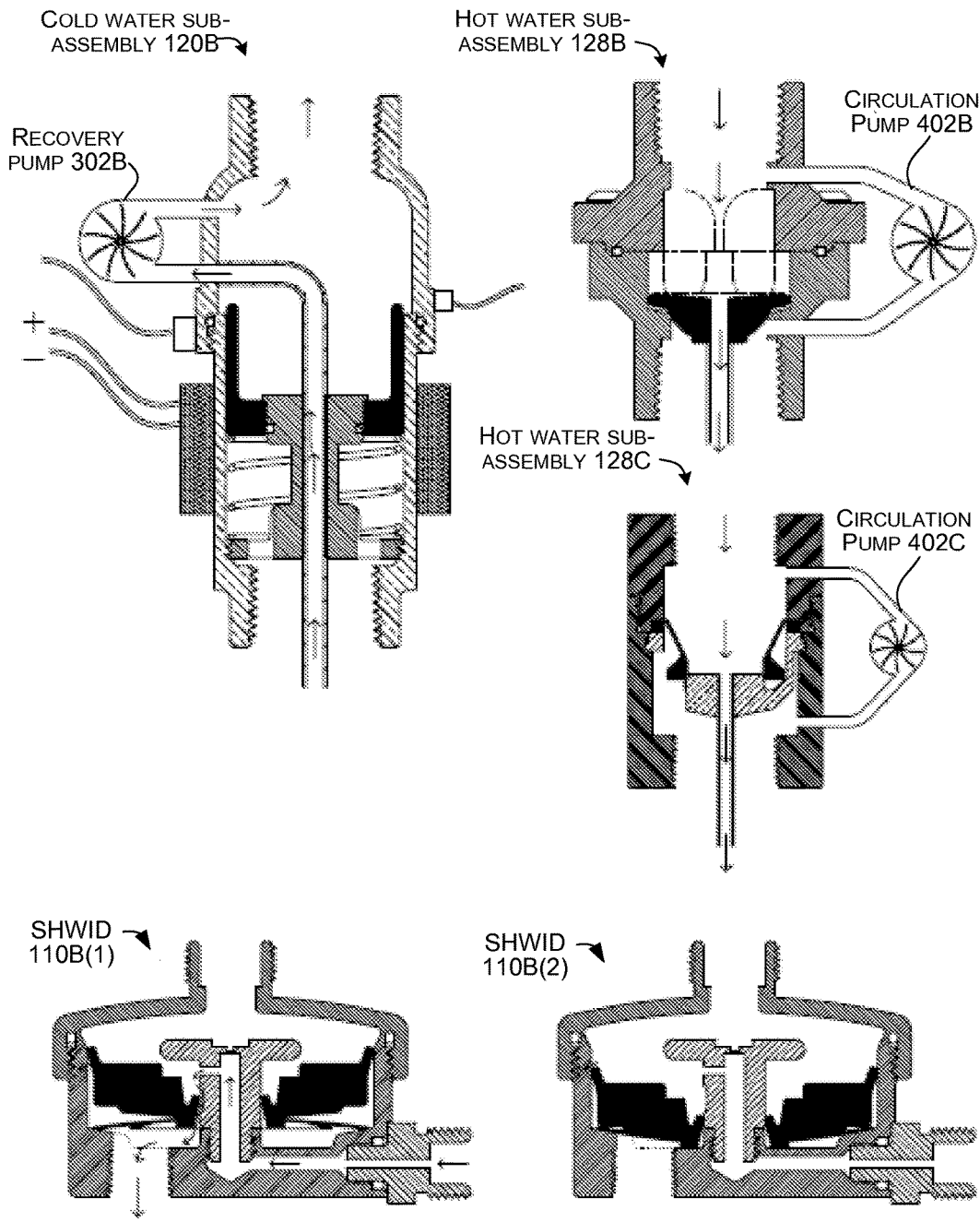
Figure 59:
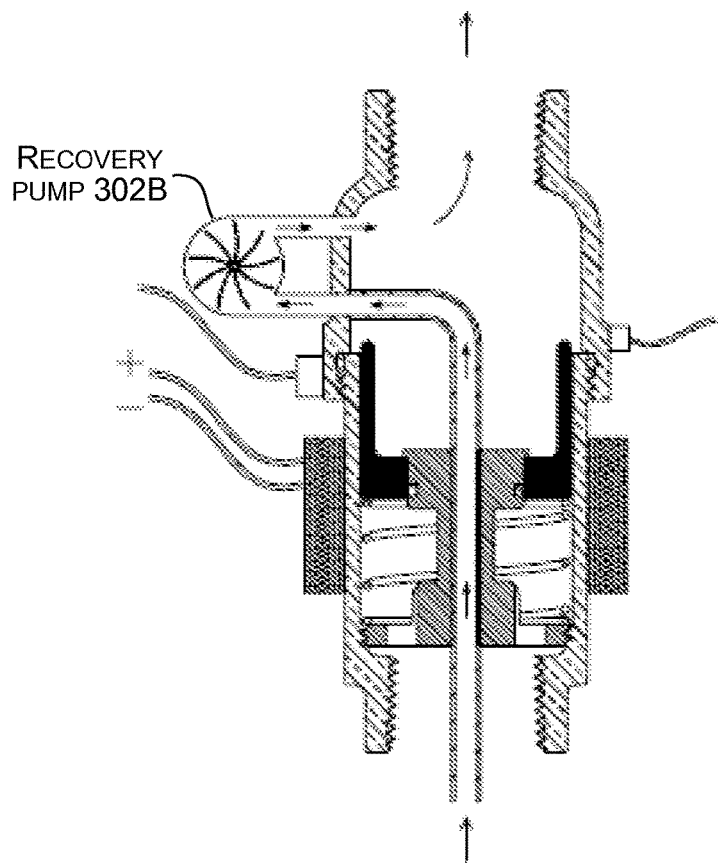

The controller 136B senses when the hot water is turned off and begins timing the delay period before starting hot water recovery. FIGS. 58 and 59 show hot water recovery caused by the controller 136B. The controller 136B can also sense the temperature at the outlet port 412B of the water heater 108B to determine if it is hotter that the lower thermostat setting; if so, the controller can activate the circulation pump 402B. After the timed delay period, the recovery pump 302B can be activated and cold water is drawn through the small cold water dip tube 124B inside of the large cold water dip tube 122B. The pressure increases in the cold water line 102B and forces the piston 2818B in the isolation valve 110B downward to allow cold water cross-over and the recovery of the hot water trapped in the hot water line 104B. As the hot water reverses directions and enters the water heater 108B, it is prevented from entering the top of the tank 109B by the check valve 420B and is forced through the hot water dip tube 126B to the bottom of the water heater 108B. When the controller 136B senses the temperature of the returning water to be near the temperature of the water being drawn out of the inlet port 2324B, it stops the recovery pump 302B.

Figure 60:
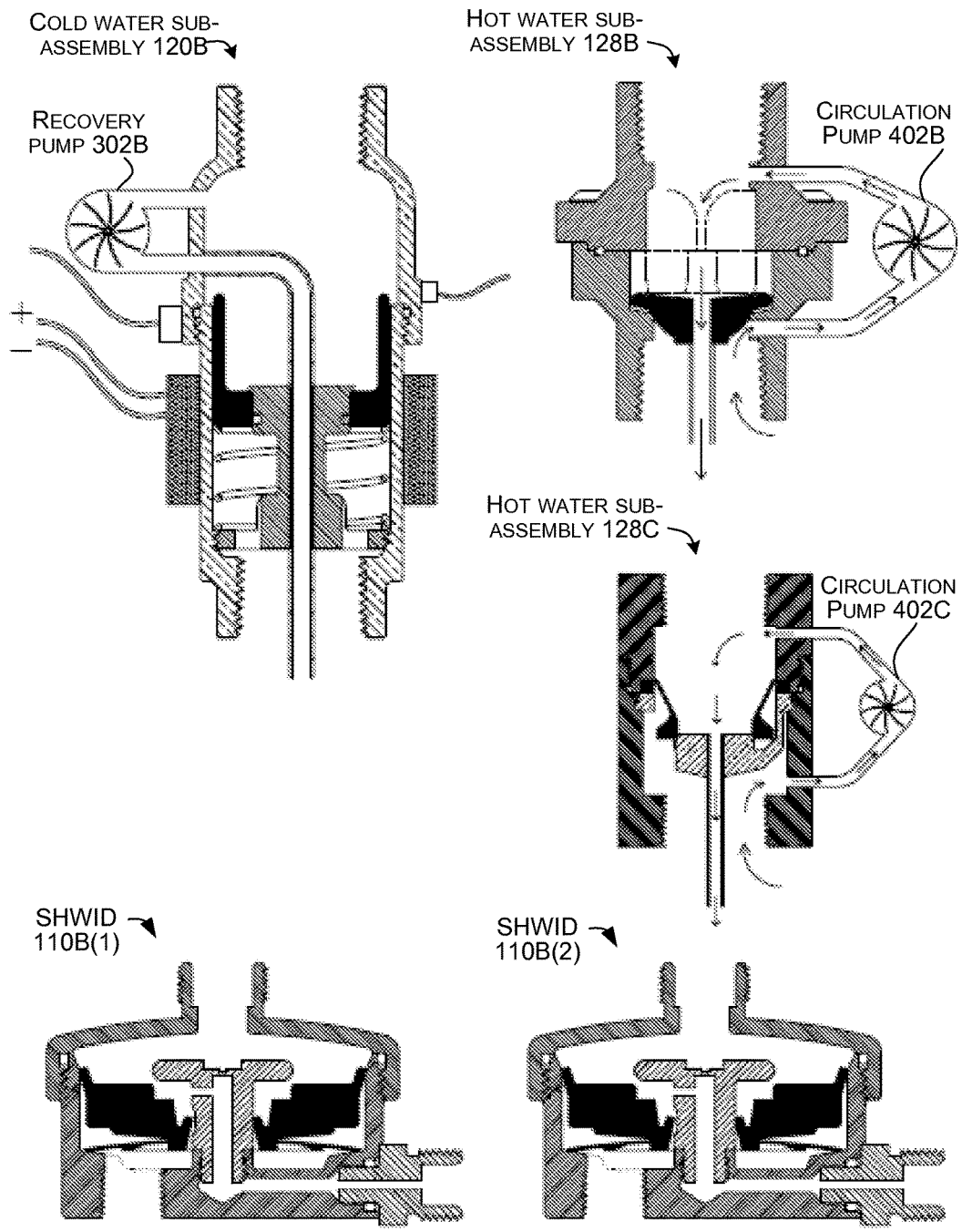

The system reaches rest position. During rest position the circulation pump 402B can be activated in response to elevated temperature at the outlet port 412B as shown in FIG. 60 to destratisfy the water in the water heater 108B.

Multiple system examples and component examples are described above. The skilled artisan should recognize that the components and/or similar components can be utilized to create alternative systems to accomplish the inventive concepts.

Example Hot Water Recovery Methods

Figure 61:
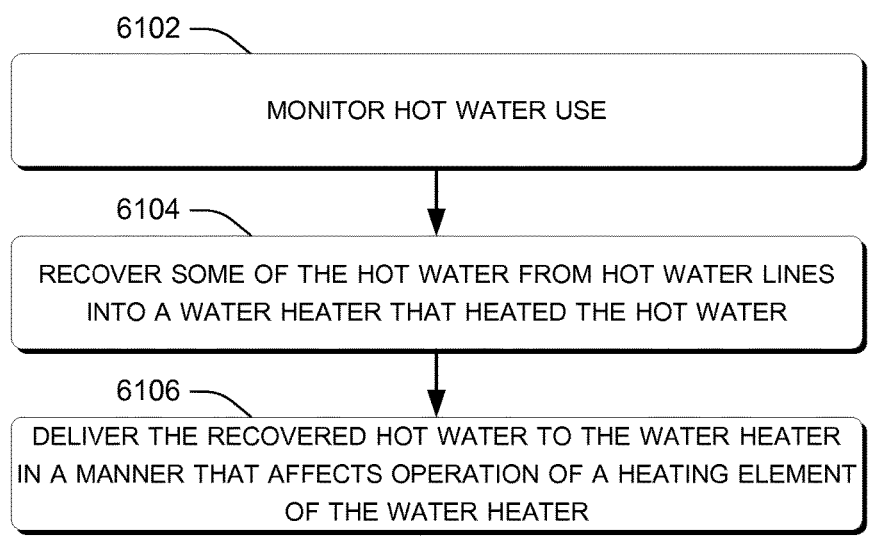
FIGS. 61 and 62 are flowcharts of example energy recovery techniques in accordance with some implementations of the present concepts.

FIG. 61 illustrates an example hot water management method 6100. At 6102, the method can monitor hot water use. At 6104, upon completion of the hot water use, the method can recover some of the hot water from hot water lines into a water heater that heated the hot water. At 6106, the method can deliver the recovered hot water to the water heater in a manner that affects operation of a heating element of the water heater. In one case, the hot water can be delivered to a position in the water heater proximate to a thermostat associated with the heating element. In another case, the hot water can be returned to the water heater and water in the water heater can be circulated so that a temperature sensed by the thermostat reflects the recovered hot water. In other cases, the heating element may be automatically controlled in a manner that recognizes the presence of the recovered hot water. For instance, the automatically controlling can entail temporarily overriding the thermostat so that the thermostat cannot activate the heating element.

Figure 62:
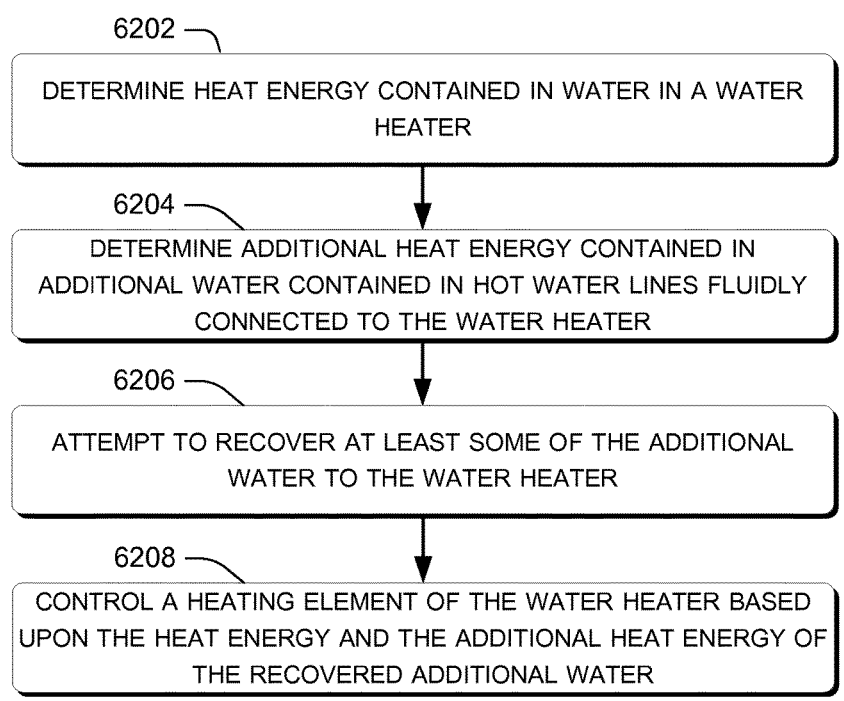

FIG. 62 illustrates another example hot water management method 6200. In this case, at 6202, the method can determine heat energy contained in water in a water heater. At 6204, the method can determine additional heat energy contained in additional water contained in hot water lines fluidly connected to the water heater. At 6206, the method can attempt to recover at least some of the additional water to the water heater. At 6208, the method can control a heating element of the water heater based upon the heat energy and the additional heat energy of the recovered additional water. For instance, the method can compare a total of the heat energy and the additional heat energy of the recovered additional hot water to an energy level threshold assigned to the system. The method can activate the heating element in an instance where the total heat energy is below the energy level threshold and otherwise keep the heating element powered off.

The described methods can be performed by the systems and/or devices described above relative to FIGS. 1 through 60, and/or by other devices and/or systems. For instance, the methods could be stored as computer-readable instructions on a computer-readable storage device that when processed by the controller cause the method to be performed.

To summarize, the present techniques can offer hot water recovery and management for a system with a water heater. The techniques can control the water heater in a manner that more effectively reflects system energy rather than localized energy, such as proximate to a thermostat controlling a heating element. One solution can recover hot water stranded in hot water lines. The solution can deliver the recovered hot water to the thermostat so that the local conditions reflect the system energy.

Additional Examples

Various examples are described above. Additional examples are described below. One example can be manifest as a system that includes a water heater having a tank and a cold water inlet to the tank and a hot water outlet from the tank that are positioned relative to an upper region of the tank. The system can also include a heating element positioned proximate to a lower region of the tank, a recovery pump positioned on the cold water inlet and fluidly coupled to a cold water dip tube extending from the cold water inlet proximate to the lower region of the tank. The system can also include a circulation pump positioned on the hot water outlet and fluidly coupled to a hot water dip tube extending from the hot water outlet proximate to the lower region of the tank. The system can also include a controller configured to sense hot water being drawn from the tank and to control the recovery pump and the circulation pump responsively after the hot water is drawn from the tank to recover at least some of the hot water and to deliver the recovered hot water to the lower region of the tank via the hot water dip tube.

Another example can include any combination of the above and/or below examples where the recovery pump is configured to draw water through the cold water dip tube and force the water out of the tank.

Another example can include any combination of the above and/or below examples where the circulation pump is configured to draw water from the hot water outlet and force the water down the hot water dip tube.

Another example can include any combination of the above and/or below examples further comprising a recovery apparatus associated with the cold water inlet and the cold water dip tube.

Another example can include any combination of the above and/or below examples where the recovery apparatus is external to the tank or wherein the recovery apparatus is positioned in the tank and wherein the cold water dip tube comprises a cold water dip tube that is positioned within a large cold water dip tube that couples the recovery apparatus to the cold water inlet.

Another example can include any combination of the above and/or below examples further comprising a thermostat that is controllably coupled to the heating element and is positioned proximate to the heating element and wherein the hot water dip tube ends below the heating element.

Another example can include any combination of the above and/or below examples where the heating element comprises a gas burner that is positioned below the tank or wherein the heating element comprises an electrical heating element that is positioned in the lower region of the tank.

Another example can include any combination of the above and/or below examples further comprising a cold water line fluidly coupled to the cold water inlet and a hot water line coupled to the hot water outlet and a fixture fluidly coupled to an opposite end of the hot water line and the cold water line and further comprising a selective hot water isolation device positioned between the hot water line and the cold water line proximate to the fixture.

Another example can include any combination of the above and/or below examples further comprising a controller communicatively coupled to the circulation pump, the recovery pump, and the selective hot water isolation device and configured to activate the circulation pump, the recovery pump, and the selective hot water isolation device to recover hot water from the hot water line to the lower region of the tank via the hot water dip tube.

Another example can include any combination of the above and/or below examples where the controller is configured to measure heat energy in the water heater and in the hot water line and to control the heating element based upon both the heat energy in the water heater and the heat energy in the hot water line.

Another example can include a tank extending between upper and lower regions and a cold water inlet at the upper region of the tank and a hot water outlet at the upper region of the tank and a heating element positioned proximate the lower region of the tank. The example can also include a cold water dip tube extending from the cold water inlet to the lower region of the tank and a hot water dip tube extending from the hot water outlet to the lower region of the tank. The example can also include a check valve at the hot water outlet that is configured to allow water to travel out of the upper region of the tank through the hot water outlet but that is configured to allow water flow from the hot water outlet through the hot water dip tube into the lower region of the tank and to prevent water flow from the hot water outlet into the upper region of the tank.

Another example can include any combination of the above and/or below examples where the heating element comprises a gas burner that is positioned below the tank or wherein the heating element comprises an electrical heating element that is positioned in the lower region of the tank.

Another example can include any combination of the above and/or below examples where the cold water dip tube comprises a small cold water dip tube and a large cold water dip tube.

Another example can include any combination of the above and/or below examples where the small cold water dip tube is positioned within the large cold water dip tube or outside the large cold water dip tube.

Another example can include any combination of the above and/or below examples further comprising a recovery assembly fluidly coupled to both the hot water dip tube and the cold water dip tube and wherein the recovery assembly is configured to store mechanical energy when water flows through the large cold water dip tube in a first direction and wherein the recovery assembly is configured to release that mechanical energy after water flow stops in the first direction to force water to move in the opposite direction through the small cold water dip tube.

Another example can include a tank extending between upper and lower regions and a cold water inlet at the upper region of the tank and a hot water outlet at the upper region of the tank. The example can also include a hot water dip tube fluidly coupled to the hot water outlet and terminating at the lower region of the tank. The example can further include a check valve positioned on the hot water outlet that allows water to exit through the hot water outlet from the upper region of the tank and through the hot water dip tube but blocks water from entering the upper region of the water heater through the hot water outlet and allows water to enter the water heater through the hot water dip tube to the lower region.

Another example can include a processor and computer-readable storage. The storage can have instructions stored thereon that can be executed by the processor to perform a method. The method can determine heat energy contained in water in a water heater and can determine additional heat energy contained in additional water contained in hot water lines fluidly connected to the water heater. The method can attempt to recover at least some of the additional water to the water heater and can control a heating element of the water heater based upon the heat energy and the additional heat energy of the recovered additional water.

Another example can include any combination of the above and/or below examples where the instructions cause the processor to compare a total of the heat energy and the additional heat energy of the recovered additional hot water to a defined energy level threshold.

Another example can include any combination of the above and/or below examples where the instructions cause the processor to activate the heating element in an instance where the total heat energy is below the defined energy level threshold and otherwise keep the heating element powered off.

Another example can include any combination of the above and/or below examples manifest as a general purpose computer, or as dedicated circuitry, or as a microcontroller.

Another example can monitor hot water use in a system. Upon completion of the hot water use, the example can recover some of the hot water from hot water lines into a water heater that heated the hot water and can deliver the recovered hot water to the water heater in a manner that affects operation of a heating element of the water heater.

Another example can include means for monitoring hot water use in a system, means for, upon completion of the hot water use, recovering some of the hot water from hot water lines into a water heater that heated the hot water, and means for delivering the recovered hot water to the water heater in a manner that affects operation of a heating element of the water heater.

Another example can include means for determining heat energy contained in water in a water heater and means for determining additional heat energy contained in additional water contained in hot water lines fluidly connected to the water heater. This example can also include means for attempting to recover at least some of the additional water to the water heater and means for controlling a heating element of the water heater based upon the heat energy and the additional heat energy of the recovered additional water.

CONCLUSION

Although specific examples of hot water energy savings are described in language specific to structural features, it is to be understood that the subject matter defined in the appended claims is not intended to be limited to the specific features described. Rather, the specific features are disclosed as example forms of implementing the claimed statutory classes of subject matter.

The invention claimed is:

1. A system, comprising:
a water heater having a tank and a cold water inlet to the tank and a hot water outlet from the tank that are positioned relative to an upper region of the tank, a heating element positioned proximate to a lower region of the tank, a recovery pump positioned on the cold water inlet and fluidly coupled to a cold water dip tube extending from the cold water inlet proximate to the lower region of the tank, a circulation pump positioned on the hot water outlet and fluidly coupled to a hot water dip tube extending from the hot water outlet proximate to the lower region of the tank, and, a controller configured to sense hot water being drawn from the tank and to control the recovery pump and the circulation pump responsively after the hot water is drawn from the tank to recover at least some of the hot water and to deliver the recovered hot water to the lower region of the tank via the hot water dip tube.

2. The system of claim 1, wherein the recovery pump is configured to draw water through the cold water dip tube and force the water out of the tank via the cold water inlet.

3. The system of claim 1, wherein the circulation pump is configured to draw water from the hot water outlet and force the water down the hot water dip tube.

4. The system of claim 1, further comprising a recovery apparatus associated with the cold water inlet and the cold water dip tube.

5. The system of claim 4, wherein the recovery apparatus is external to the tank or wherein the recovery apparatus is positioned in the tank and the cold water dip tube comprises a cold water dip tube that is positioned within a large cold water dip tube that couples the recovery apparatus to the cold water inlet.

6. The system of claim 1, further comprising a thermostat that is controllably coupled to the heating element and is positioned proximate to the heating element and wherein the hot water dip tube ends below the heating element.

7. The system of claim 1, wherein the heating element comprises a gas burner that is positioned below the tank or wherein the heating element comprises an electrical heating element that is positioned in the lower region of the tank.

8. The system of claim 1, further comprising a cold water line fluidly coupled to the cold water inlet and a hot water line coupled to the hot water outlet and a fixture fluidly coupled to an opposite end of the hot water line and the cold water line and further comprising a selective hot water isolation device positioned between the hot water line and the cold water line proximate to the fixture.

9. The system of claim 8, wherein the controller is communicatively coupled to the circulation pump, the recovery pump, and the selective hot water isolation device and configured to activate the circulation pump, the recovery pump, and the selective hot water isolation device to recover hot water from the hot water line to the lower region of the tank via the hot water dip tube.

10. The system of claim 9, wherein the controller is configured to measure heat energy in the water heater and in the hot water line and to control the heating element based upon both the heat energy in the water heater and the heat energy in the hot water line.

* * * * *